United States Patent
LeMay et al.

(10) Patent No.: US 11,620,391 B2
(45) Date of Patent: *Apr. 4, 2023

(54) DATA ENCRYPTION BASED ON IMMUTABLE POINTERS

(71) Applicant: Intel Corporation, Santa Clara, CA (US)

(72) Inventors: Michael LeMay, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 484 days.

This patent is subject to a terminal disclaimer.

(21) Appl. No.: 16/724,026

(22) Filed: Dec. 20, 2019

(65) Prior Publication Data

US 2020/0125770 A1     Apr. 23, 2020

Related U.S. Application Data

(60) Provisional application No. 62/868,884, filed on Jun. 29, 2019.

(51) Int. Cl.
    *G06F 21/60*        (2013.01)
    *G06F 12/0897*    (2016.01)
    (Continued)

(52) U.S. Cl.
    CPC ........ *G06F 21/602* (2013.01); *G06F 9/30043* (2013.01); *G06F 9/30101* (2013.01);
    (Continued)

(58) Field of Classification Search
    None
    See application file for complete search history.

(56) References Cited

U.S. PATENT DOCUMENTS

| 6,570,989 B1 | 5/2003 | Ohmori et al. |
| 7,043,016 B2 | 5/2006 | Roelse |

(Continued)

FOREIGN PATENT DOCUMENTS

| DE | 102018125786 A1 | 5/2019 |
| EP | 2073430 A1 | 6/2009 |

(Continued)

OTHER PUBLICATIONS

"Armv8.5—A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.

(Continued)

*Primary Examiner* — Jared I Rutz
*Assistant Examiner* — Marwan Ayash
(74) *Attorney, Agent, or Firm* — Alliance IP, LLC

(57) ABSTRACT

Technologies disclosed herein provide cryptographic computing. An example processor includes a core to execute an instruction, where the core includes a register to store a pointer to a memory location and a tag associated with the pointer. The tag indicates whether the pointer is at least partially immutable. The core also includes circuitry to access the pointer and the tag associated with the pointer, determine whether the tag indicates that the pointer is at least partially immutable. The circuitry is further, based on a determination that the tag indicates the pointer is at least partially immutable, to obtain a memory address of the memory location based on the pointer, use the memory address to access encrypted data at the memory location, and decrypt the encrypted data based on a key and a tweak, where the tweak including one or more bits based, at least in part, on the pointer.

22 Claims, 25 Drawing Sheets

(51) Int. Cl.

| | | |
|---|---|---|
| G06F 9/30 | (2018.01) | |
| G06F 9/48 | (2006.01) | |
| G06F 21/72 | (2013.01) | |
| H04L 9/06 | (2006.01) | |
| G06F 12/06 | (2006.01) | |
| G06F 12/0875 | (2016.01) | |
| G06F 21/79 | (2013.01) | |
| G06F 9/455 | (2018.01) | |
| G06F 12/0811 | (2016.01) | |
| G06F 21/12 | (2013.01) | |
| H04L 9/08 | (2006.01) | |
| G06F 12/14 | (2006.01) | |
| G06F 9/32 | (2018.01) | |
| G06F 9/50 | (2006.01) | |
| G06F 12/02 | (2006.01) | |
| H04L 9/14 | (2006.01) | |
| G06F 21/62 | (2013.01) | |

(52) U.S. Cl.
CPC .......... *G06F 9/30178* (2013.01); *G06F 9/321* (2013.01); *G06F 9/45558* (2013.01); *G06F 9/48* (2013.01); *G06F 9/5016* (2013.01); *G06F 12/0207* (2013.01); *G06F 12/0646* (2013.01); *G06F 12/0811* (2013.01); *G06F 12/0875* (2013.01); *G06F 12/0897* (2013.01); *G06F 12/1408* (2013.01); *G06F 12/1458* (2013.01); *G06F 12/1466* (2013.01); *G06F 21/12* (2013.01); *G06F 21/6227* (2013.01); *G06F 21/72* (2013.01); *G06F 21/79* (2013.01); *H04L 9/0637* (2013.01); *H04L 9/0822* (2013.01); *H04L 9/0861* (2013.01); *H04L 9/0869* (2013.01); *H04L 9/0894* (2013.01); *H04L 9/14* (2013.01); *G06F 2009/45587* (2013.01); *G06F 2212/1052* (2013.01); *H04L 2209/125* (2013.01)

(56) References Cited

U.S. PATENT DOCUMENTS

| | | | |
|---|---|---|---|
| 7,254,718 | B2 | 8/2007 | Kaminaga et al. |
| 7,907,723 | B2 | 3/2011 | Rubin |
| 8,085,934 | B1 | 12/2011 | Bhooma |
| 8,675,868 | B1 | 3/2014 | Yearsley et al. |
| 8,798,263 | B2 | 8/2014 | Pasini et al. |
| 9,213,653 | B2 | 12/2015 | Durham et al. |
| 9,350,534 | B1 | 5/2016 | Poo et al. |
| 9,436,847 | B2 | 9/2016 | Durham et al. |
| 9,514,285 | B2 | 12/2016 | Durham et al. |
| 9,811,661 | B1 | 11/2017 | Golovkin et al. |
| 9,830,162 | B2 | 11/2017 | LeMay |
| 9,990,249 | B2 | 6/2018 | Durham et al. |
| 10,216,522 | B2 | 2/2019 | LeMay |
| 10,387,305 | B2 | 8/2019 | Durham et al. |
| 10,536,266 | B2 | 1/2020 | Courtney |
| 10,585,809 | B2 | 3/2020 | Durham et al. |
| 10,706,164 | B2 | 7/2020 | LeMay et al. |
| 10,769,272 | B2 * | 9/2020 | Durham .............. G06F 9/45554 |
| 10,860,709 | B2 | 12/2020 | LeMay et al. |
| 2002/0094081 | A1 | 7/2002 | Medvinsky |
| 2003/0091185 | A1 | 5/2003 | Swindlehurst et al. |
| 2003/0101362 | A1 | 5/2003 | Dia |
| 2003/0126349 | A1 | 7/2003 | Nalawadi et al. |
| 2003/0149869 | A1 | 8/2003 | Gleichauf |
| 2004/0123288 | A1 | 6/2004 | Bennett et al. |
| 2004/0215895 | A1 | 10/2004 | Cypher |
| 2004/0268057 | A1 | 12/2004 | Landin et al. |
| 2007/0152854 | A1 | 7/2007 | Copley |
| 2007/0201691 | A1 | 8/2007 | Kumagaya |
| 2008/0080708 | A1 | 4/2008 | McAlister et al. |
| 2008/0130895 | A1 | 6/2008 | Jueneman et al. |
| 2008/0140968 | A1 | 6/2008 | Doshi et al. |
| 2008/0263117 | A1 | 10/2008 | Rose et al. |
| 2009/0172393 | A1 | 7/2009 | Tanik et al. |
| 2009/0220071 | A1 | 9/2009 | Gueron et al. |
| 2009/0254774 | A1 | 10/2009 | Chamdani et al. |
| 2010/0023707 | A1 | 1/2010 | Hohmuth et al. |
| 2011/0099429 | A1 | 4/2011 | Varma et al. |
| 2011/0161680 | A1 | 6/2011 | Grube et al. |
| 2011/0296202 | A1 | 12/2011 | Henry et al. |
| 2012/0163453 | A1 | 6/2012 | Horowitz |
| 2012/0284461 | A1 | 11/2012 | Larin et al. |
| 2013/0275766 | A1 | 10/2013 | Plainecassagne et al. |
| 2014/0173293 | A1 | 6/2014 | Kaplan |
| 2014/0270159 | A1 | 9/2014 | Youn et al. |
| 2015/0234728 | A1 | 8/2015 | Coleman et al. |
| 2015/0244518 | A1 | 8/2015 | Koo et al. |
| 2015/0378941 | A1 | 12/2015 | Rozas et al. |
| 2016/0056954 | A1 | 2/2016 | Lee et al. |
| 2016/0092702 | A1 | 3/2016 | Durham et al. |
| 2016/0094552 | A1 | 3/2016 | Durham et al. |
| 2016/0104009 | A1 | 4/2016 | Henry et al. |
| 2016/0154963 | A1 | 6/2016 | Kumar et al. |
| 2016/0188889 | A1 | 6/2016 | Trivedi et al. |
| 2016/0285892 | A1 | 9/2016 | Kishinevsky et al. |
| 2016/0364707 | A1 | 12/2016 | Varma |
| 2017/0063532 | A1 | 3/2017 | Bhattacharyya et al. |
| 2017/0177368 | A1 | 6/2017 | DeHon et al. |
| 2017/0285976 | A1 | 10/2017 | Durham et al. |
| 2018/0095812 | A1 | 4/2018 | Deutsch et al. |
| 2018/0095906 | A1 | 4/2018 | Doshi et al. |
| 2018/0109508 | A1 | 4/2018 | Wall et al. |
| 2018/0287785 | A1 | 10/2018 | Pfannenschmidt et al. |
| 2018/0365069 | A1 | 12/2018 | Nemiroff et al. |
| 2019/0026236 | A1 * | 1/2019 | Barnes .................. G06F 9/3013 |
| 2019/0042369 | A1 | 2/2019 | Deutsch et al. |
| 2019/0042481 | A1 | 2/2019 | Feghali et al. |
| 2019/0042734 | A1 | 2/2019 | Kounavis et al. |
| 2019/0042766 | A1 | 2/2019 | Pappachan et al. |
| 2019/0042796 | A1 | 2/2019 | Bokern et al. |
| 2019/0042799 | A1 | 2/2019 | Durham et al. |
| 2019/0044954 | A1 | 2/2019 | Kounavis et al. |
| 2019/0045016 | A1 | 2/2019 | Dewan et al. |
| 2019/0050558 | A1 | 2/2019 | LeMay et al. |
| 2019/0095350 | A1 | 3/2019 | Durham et al. |
| 2019/0097794 | A1 | 3/2019 | Nix |
| 2019/0102567 | A1 * | 4/2019 | Lemay .................. G06F 21/44 |
| 2019/0102577 | A1 | 4/2019 | Gueron et al. |
| 2019/0227951 | A1 | 7/2019 | Durham et al. |
| 2019/0319781 | A1 | 10/2019 | Chhabra et al. |
| 2019/0347445 | A1 | 11/2019 | Chen |
| 2019/0354726 | A1 | 11/2019 | Critelli et al. |
| 2020/0004953 | A1 | 1/2020 | LeMay et al. |
| 2020/0007332 | A1 | 1/2020 | Girkar et al. |
| 2020/0076585 | A1 | 3/2020 | Sheppard et al. |
| 2020/0117810 | A1 | 4/2020 | Kounavis et al. |
| 2020/0125501 | A1 | 4/2020 | Durham et al. |
| 2020/0125502 | A1 | 4/2020 | Durham et al. |
| 2020/0125742 | A1 | 4/2020 | Kounavis et al. |
| 2020/0125769 | A1 | 4/2020 | Kounavis et al. |
| 2020/0125770 | A1 | 4/2020 | LeMay et al. |
| 2020/0134234 | A1 | 4/2020 | LeMay et al. |
| 2020/0145187 | A1 | 5/2020 | Kounavis et al. |
| 2020/0145199 | A1 | 5/2020 | Kounavis et al. |
| 2020/0159676 | A1 | 5/2020 | Durham et al. |
| 2020/0169383 | A1 | 5/2020 | Durham et al. |
| 2020/0201789 | A1 | 6/2020 | Durham et al. |
| 2020/0257827 | A1 | 8/2020 | Kounavis et al. |
| 2020/0380140 | A1 | 12/2020 | Medwed et al. |
| 2020/0382289 | A1 | 12/2020 | Xue et al. |
| 2021/0004470 | A1 | 1/2021 | Babic et al. |
| 2021/0058379 | A1 | 2/2021 | Bursell et al. |
| 2021/0117340 | A1 | 4/2021 | Trikalinou et al. |
| 2021/0117342 | A1 | 4/2021 | Durham |
| 2021/0149825 | A1 | 5/2021 | Durham et al. |
| 2021/0150040 | A1 | 5/2021 | Durham et al. |

(56) References Cited

U.S. PATENT DOCUMENTS

| | | | |
|---|---|---|---|
| 2021/0218547 A1 | 7/2021 | Weiler et al. | |
| 2022/0019698 A1* | 1/2022 | Durham | G06F 21/71 |

FOREIGN PATENT DOCUMENTS

| | | |
|---|---|---|
| EP | 3326102 A1 | 5/2018 |
| JP | 2009139899 A | 6/2009 |
| WO | 2017014885 A1 | 1/2017 |

OTHER PUBLICATIONS

BiiN, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.

Chen, Tony, et al., "Pointer Tagging for Memory Safety", accessed at https://www.microsoft.com/en-us/research/uploads/prod/2019/07/Pointer-Tagging-for-Memory-Safety.pdf, Jul. 2019, 23 pages.

Liljestrand, Hans, et al., "PAC it up: Towards Pointer Integrity using ARM Pointer Authentication", accessed at https://arxiv.org/pdf/1811.09189.pdf, last updated May 24, 2019, 21 pages.

Qualcomm Technologies, Inc., "Pointer Authentication on ARMv8.3: Design and Analysis of the New Software Security Instructions", accessed at https://www.qualcomm.com/media/documents/files/whitepaper-pointer-authentication-on-armv8-3.pdf, Jan. 2017, 12 pages.

Watson, Robert N.M., et al., "An Introduction to CHERI", Technical Report UCAM-CL-TR-941, University of Cambridge Computer Labratory, Cambridge, United Kingdom, Sep. 2019, 43 pages.

Watson, Robert N.M., et al., "CHERI: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.

Serebryany, Kostya, "ARM Memory Tagging Extension and How It Improves C/C++ Memory Safety", ;login: The USENIX Magazine, vol. 44, No. 2, Summer 2019, pp. 12-16.

USPTO Notice of Allowance in U.S. Appl. No. 16/723,927 dated Dec. 24, 2021 (13 pages).

USPTO Non-Final Office Action in U.S Appl. No. 16/723,977 dated Aug. 3, 2021 (37 pages).

Savry, Olivier, et al., "Intrinsec, an Intrinsically Secure Processor", RISC V Workshop, Dec. 6, 2019, accessed at: http://riscv.org/wp-content/uploads/2019/06/16.15-CEA-RISC-V-Workshop-Zurich.pdf, 15 pages.

The Electronics Resurgence Initiative, "SSITH: TA1 (Hardware) Performers", accessed at: https://eri-summit.darpa.mil/docs/ERIPoster_Applications_SSITH_DARPA.pdf, Mar. 20, 2020, 1 page.

USPTO Supplemental Notice of Allowance in U.S. Appl. No. 16/722,707 dated Apr. 8, 2022 (5 pages).

Boivie, Rick, IBM Research Report, SecureBlue++: CPU Support for Secure Execution, May 23, 2012, available online at https://domino.research.ibm.com/library/cyberdig.nsf/papers/E605BDC5439097F085257A13004D25CA/$File/rc25287.pdf, (10 pages).

Dworkin, Morris,"Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).

Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).

Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).

Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).

Liljestrand, Hans et al. "PACStack: an Authenticated Call Stack," Sep. 3, 2019, retrieved from https://arxiv.org/pdf/1905.10242.pdf, (20 pages).

Qualcomm Technologies, Inc., "Pointer Authentication on ARMv8.3, Design and Analysis of the New Software Security Instructions," Jan. 2017, retrieved from https://www.qualcomm.com/media/documents/files/whitepaper-pointer-authentication-on-armv8-3.pdf, (12 pages).

Serebryany, Kostya, "ARM Memory Tagging Extension and How it Improves C/C++ Memory Safety," Summer 2019, (5 pages).

USPTO Non-Final Office Action in U.S. Appl. No. 16/723,927 dated Jun. 8, 2021 (32 pages).

USPTO Non-Final Office Action in U.S. Appl. No. 16/724,105 dated Jul. 13, 2021 (10 page).

Kwon, Albert et al., "Low-Fat Pointers: Compact Encoding and Efficient Gate-Level Implementation of Fat Pointers for Spatial Safety and Capability-based Security," CCS' 13: Proceedings of the 2013 ACM SIGSAC Conference on Computer & Communications Security, Nov. 4-8, 2013, Berlin Germany (12 pages).

Pyo, Changwoo, "Encoding Function Pointers and Memory Arrangement Checking against Buffer Overflow Attack," In Proceedings of the 4th International Conference on Information and Communications Security (ICICS 2002) (12 pages).

USPTO Final Office Action in U.S. Appl. No. 16/720,059 dated Jan. 21, 2022 (20 pages).

USPTO Non-Final Office Action in U.S. Appl. No. 17/134,406 dated Jan. 21, 2022 (11 pages).

USPTO Notice of Allowance in U.S. Appl. No. 16/723,977 dated Feb. 3, 2022 (13 pages).

Yang, Jun et al., "Improving Memory Encryption Performance in Secure Processors," IEEE Transactions on Computers, vol. 54, No. 5, May 2005 (11 pages).

EPO; Extended European Search Report issued in EP Patent Application No. 21195529.9, dated Mar. 1, 2022; 6 pages.

EPO; Extended European Search Report issued in EP Patent Application No. 21196104.0, dated Feb. 15, 2022; 10 pages.

USPTO Non-Final Office Action in U.S. Appl. No. 16/709,612 dated Feb. 17, 2022 (17 pages).

USPTO Notice of Allowance in U.S. Appl. No. 16/722,707 dated Mar. 28, 2022 (10 pages).

USPTO Notice of Allowance in U.S. Appl. No. 16/724,105 dated Mar. 31, 2022 (8 pages).

USPTO Notice of Allowance in U.S. Appl. No. 16/740,359 dated Mar. 22, 2022 (9 pages).

USPTO Notice of Allowance in U.S. Appl. No. 16/724,105 dated Nov. 16, 2021 (9 pages).

USPTO Notice of Allowance in U.S. Appl. No. 16/723,468 dated Oct. 18, 2021 (11 pages).

USPTO Non-Final Office Action in U.S. Appl. No. 16/740,359 dated Sep. 27, 2021 (8 pages).

Avanzi, Roberto, "The QARMA Block Ciper Family, Almost MDS Matrices Over Rings With Zero Divisors, Nearly Symmetric Even-Mansour Constructions With Non-lnvolutory Central Rounds, and Search Heuristics for Low-Latency S-Boxes," Qualcomm Product Security, Munich Germany, IACR Transactions on Symmetric Cryptology, 2017 (1) (40 pages).

Beaulieu, Ray et al., "Simon and Spec: Block Ciphers for the Internet of Things," National Security Agency, Jul. 2015 (15 pages).

Bernstein, Daniel J., "Gimli," Sep. 27, 2019, retrieved from https://csrc.nist.gov/CSRC/media/Projects/lightweight-cryptography/documents/round-2/spec-doc-rnd2/gimli-spec-round2.pdf, (48 pages).

Borghoff, Julia et al., "PRINCE—A Low-Latancy Block Ciper for Pervasive Computing Applications," Advances in Cryptology—ASIACRYPT 2012—18th International Conference on the Theory and Application of Cryptology and Information Security, Beijing, China, Dec. 2-6, 2012. Proceedings (pp. 208-225).

(56) References Cited

OTHER PUBLICATIONS

Carr, Scott A. et al., "DataShield: Configurable Data Confidentiality and Integrity," Purdue University, ASIA CCS, '17, Apr. 2-6, 2017, Abu Dhabi, United Arab Emirates (12 pages).
EPO; Extended European Search Report issued in EP Patent Application No. 20163534.9, dated Sep. 24, 2020; 8 pages.
EPO; Extended European Search Report issued in EP Patent Application No. 20163546.3, dated Sep. 28, 2020; 8 pages.
EPO; Extended European Search Report issued in EP Patent Application No. 20163670.1, dated Sep. 29, 2020; 8 pages.
EPO; Extended European Search Report issued in EP Patent Application No. 20163907.7, dated Oct. 6, 2020; 9 pages.
EPO; Extended European Search Report issued in EP Patent Application No. 20164326.9, dated Oct. 2, 2020; 9 pages.
EPO; Extended European Search Report issued in EP Patent Application No. 20164636.1, dated Oct. 6, 2020; 8 pages.
EPO; Extended European Search Report issued in EP Patent Application No. 20168972.6, dated Jul. 3, 2020; 9 pages.
EPO; Extended European Search Report issued in EP Patent Application No. 20181907.5, dated Nov. 2, 2020; 9 pages.
EPO; Extended European Search Report issued in EP Patent Application No. 20193625.9, dated Feb. 22, 2021; 7 pages.
EPO; Extended European Search Report issued in European Patent Application No. EP 20163095.1, dated Aug. 10, 2020; 9 pages.
EPO; Extended European Search Report issued in Patent Application No. EP 20163518.2, dated Aug. 19, 2020; 10 pages.
EPO; Extended European Search Report issued in Patent Application No. EP 20163661.0, dated Aug. 17, 2020; 9 pages.
Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).
Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).
Neagu, Madalin, et al.; "Increasing Memory Security Through Data Scrambling and Information Entropy Models," 2014 IEEE 15th International Symposium on Computational Intelligence and Informatics; Nov. 2014; 5 pages.
Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).
USPTO Non-Final Office Action in U.S. Appl. No. 17/134,405 dated Aug. 1, 2022 (15 pages).
USPTO Notice of Allowance in U.S. Appl. No. 16/776,467 dated Jul. 18, 2022 (10 pages).
USPTO Non-Final Office Action in U.S. Appl. No. 16/723,871 dated Nov. 10, 2022 (11 pages).
USPTO Notice of Allowance in U.S. Appl. No. 16/776,467 dated Nov. 9, 2022 (8 pages).
Andreatos et al., "A comparison of random number sequences for image encryption", Mathematical Methods in Science and Engineering, 2014, pp. 146-151 (Year: 2014) (7 pages).
Nasahl, Pascal et al., "CrypTag: Thwarting Physical and Logical Memory Vulnerabilities using Cryptographically Colored Memory", https://doi .org/10.48550/arXiv.2012.06761, ARXIV ID: 2012.06761, Dec. 12, 2020. (13 pages).
Tuck, Nathan et al., "Hardware and Binary Modification Support for Code Pointer Protection From Buffer Overflow," 37th International Symposium on Microarchitecture (MICRO-37'04), 2004, pp. 209-220 (12 pages).
USPTO Final Office Action in U.S. Appl. No. 16/724,059 dated Sep. 2, 2022 (34 pages).
USPTO Non-Final Office Action in U.S. Appl. No. 16/722,342 dated Aug. 29, 2022 (14 pages).
USPTO Notice of Allowance in U.S. Appl. No. 16/709,612 dated Aug. 23, 2022 (18 pages).
USPTO Notice of Allowance in U.S. Appl. No. 17/134,406 dated Oct. 5, 2022 (10 pages).
Whelihan, David et al., "A Key-Centric Processor Architecture for Secure Computing," 2016 IEEE International Symposium on Hardware Oriented Security and Trust (HOST), 2016, pp. 173-178. (6 pages).
Zhu, Ge et al., "Protection against indirect overflow attacks on pointers," Second IEEE International Information Assurance Workshop, 2004. Proceedings., 2004, pp. 97-106 (10 pages).
USPTO Notice of Allowance in U.S. Appl. No. 16/709,612 dated Nov. 25, 2022 (10 pages).

\* cited by examiner

DATA ENCRYPTION BASED ON IMMUTABLE POINTERS

CROSS REFERENCE TO RELATED APPLICATIONS

This Application claims the benefit under 35 U.S.C. § 119 of U.S. Provisional Application No. 62/868,884 filed Jun. 29, 2019 and entitled "Cryptographic Computing". The disclosure of the prior application is considered part of and is hereby incorporated by reference in its entirety in the disclosure of this application.

TECHNICAL FIELD

This disclosure relates in general to the field of computer systems, more particularly, to data encryption based on immutable pointers.

BACKGROUND

Protecting memory in computer systems from software bugs and security vulnerabilities is a significant concern. A buffer overflow, which can affect memory safety, occurs when a program writes data to a buffer and overruns a boundary of the buffer such that adjacent memory locations are overwritten. Similarly, reading past the end of a buffer into another page may trigger an access violation or fault. Another memory safety violation is referred to as a dangling pointer. A dangling pointer is a reference that is not resolved to a valid destination. This may occur when memory is deallocated without modifying the value of an existing pointer to the deallocated (or freed) memory. If the system reallocates the freed memory and the dangling pointer is used to access the reallocated memory, unpredictable behavior, including system failure, may occur. Current computing techniques have used architecture and metadata to provide data protection. For example, in previous solutions, a processor would use lookup tables to encode policy or data about the data for ownership, memory size, location, type, version, etc. However, this metadata requires additional storage (memory overhead) and negatively impacts performance, particularly for implementations with fine-grain metadata. Thus, different approaches are needed to provide memory safety to computing systems.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION

Figure 1:
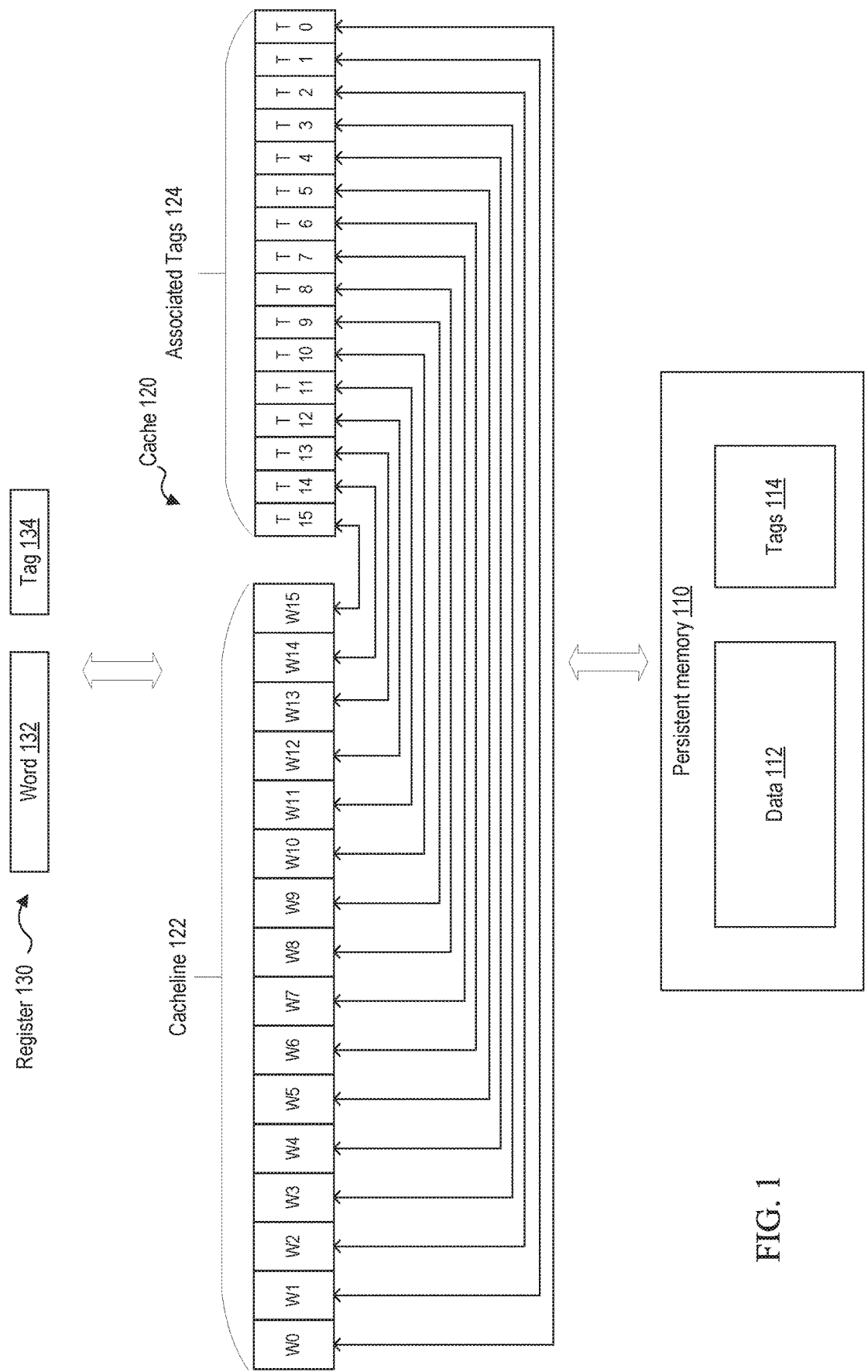
FIG. 1 is a diagram showing an example of tag storage and propagation for words in a memory hierarchy.

The following disclosure provides various possible embodiments, or examples, for implementation of cryptographic computing. Cryptographic computing is an important trend in the computing industry, with the very foundation of computing itself becoming fundamentally cryptographic. Cryptographic computing represents a sea change, a fundamental rethinking of systems security with wide implications for the industry.

Memory safety vulnerabilities (e.g., buffer overflow and use-after-free) are the most frequently-reported vulnerabilities in software. In addition, speculative side channels can be used to leak information based on object plaintext. Preventing unauthorized pointer mutations and binding data encryption to immutable pointers can mitigate such vulnerabilities and enable per data object granular protections. For example, data may be encrypted using an encryption key and a tweak value, where the tweak value is based on an address at which the encrypted data is to be stored. The encrypted data may be subsequently decrypted using a decryption key and a tweak value, where the tweak value is based on a pointer to the address at which the encrypted data is stored. In particular embodiments, a tag may be associated with the pointer (making it a "tagged pointer"), with the tag indicating whether the pointer is immutable or at least partially immutable. A variety of possible encodings may be used for tagged pointers to enforce memory safety and associated instructions for updating tagged pointers. Binding data encryption to tagged pointers may allow for defense-in-depth and mitigation of temporal safety vulnerabilities, e.g., use-after-free. Certain embodiments may accordingly efficiently enforce memory safety for both 32- and 64-bit pointers with deterministic detection of pointer corruption.

There are two primary categories of memory safety vulnerabilities: spatial and temporal. Spatial safety vulnerabilities include buffer overflows and underruns in the heap, stack, and global data areas, while temporal safety vulnerabilities include use-after-free and uninitialized use. Type safety vulnerabilities are a related category labeled as type confusion. Binding data encryption to tagged pointers can mitigate each of these categories of vulnerabilities.

For instance, in certain embodiments, pointers are extended to specify a tag value in an unused slice of pointer bits and that tag value is incorporated into the encryption of the data referenced by the pointer. Adjacent objects are assigned different tag values so that adjacent buffer overflows may be detected with high probability or deterministically. Non-adjacent overflows may be detected with a lower probability, since only a small number of bits are used to encode the tag, and an adversary need only guess the tag value for the targeted object to succeed in accessing it. Use-after-free vulnerabilities may be mitigated, since allocations sharing the same location at different times are likely to be assigned different tag values. In further embodiments, additional information may be encoded beyond a tag in the pointer, such as the size of the object. By binding this encoding to the data encryption, the amount of information that the adversary must learn or guess to succeed in accessing an object increases. In some implementations, the pointer itself can be encrypted in a way that is bound to parameters such as the tag and object size to further reduce the probability of an adversary successfully forging a pointer to access data.

Pointer tagging can further protect the integrity and confidentiality of pointers used for binding data encryption. For example, one or more tag bits may be associated with each word of memory while it is in swapped memory, persistent memory, DRAM, cache, and registers to indicate whether that word contains a pointer. Only words with set tag bits (e.g., indicating that the pointer is immutable) can be used as pointers. Operations that corrupt pointers result in the corresponding tag bit being unset, so that subsequent attempts to use the pointer generate a fault. In certain embodiments, 32-bit words can be tagged to support 32-bit pointer storage. This may result in wasted tag bits for applications that store 64-bit pointers; however, in some instances, two tag bits can be usefully combined to provide more deterministic memory safety enforcement in such a configuration while still only requiring a single tag bit in the register file.

Pointer tagging may provide a number of benefits, including, but not limited to the following. First, it may potentially eliminate the requirement to encrypt all or a portion of pointers to prevent forgery, since the tag bit serves that role. This may have the benefit of reducing overheads for processing pointers. Second, it may mitigate certain spatial safety vulnerabilities more effectively than data encryption alone. Third, it may eliminate the requirement to encode any additional data into pointer bits, especially if combined with tweaked encryption of the entire pointer, which may be important for compatibility or for supporting full 64-bit address spaces. Other benefits may be realized through the use of pointer tagging and binding data encryption/decryption to tagged pointers. In embodiments of the present disclosure, all general purpose registers that may contain a pointer are tagged as described herein.

FIG. 1 is a diagram showing an example of tag storage and propagation for words in a memory hierarchy. In the example shown, each word in memory is associated with a tag that includes one or more tag bits, and the tags propagate through the memory hierarchy along with their associated words. For instance, tags 114 are associated with respective words in data 112. The tags 114 and data 112 are stored together in persistent memory 110. As words of the data 112 is moved from the persistent memory 110 into the cache 120, a cacheline 122 is populated with the words of the data 112 (e.g., W0, W1, . . . , W15) along with the set of tags 124 associated with each word loaded into the cache 120. Further, as a word in the cacheline 122 is loaded into the register 130 (as word 132), its associated tag 134 is also loaded into the register. For instance, if word W0 in the cacheline 120 is moved into the register as word 132, then the tag T0 in the set of tags 124 will be moved into the register as tag 734. The words and their associated tags move together in a similar manner as they propagate the other direction in the memory hierarchy.

Although the example shown in FIG. 1 illustrates an example embodiment where tags are stored outside the same cacheline as their associated words, some embodiments may incorporate tags within the same cacheline as the associated words. Co-locating tags in the same cacheline as its associated data so that they are immediately available may provide security features while enabling processors to continue using and benefiting from performing speculative operations in a cache coherent manner. In certain embodiments, the tags may be hidden from software, which may allow legacy compatibility to be maintained as software may access virtual/linear memory contiguously without needing to ignore or skip over metadata regions, while the hardware may still enforce the metadata policies on the data. The co-located tag metadata may be referred to as hidden inline metadata. The hidden inline metadata may be hidden at the linear address/virtual address level as memory is seen by software in a contiguous manner, but the metadata is available for the purposes of memory tagging (such as tag compare with a pointer tag value in a linear address), capabilities (such as data structure length, permissions), and/or fine grain memory access control as enforced by the hardware.

Figure 2:
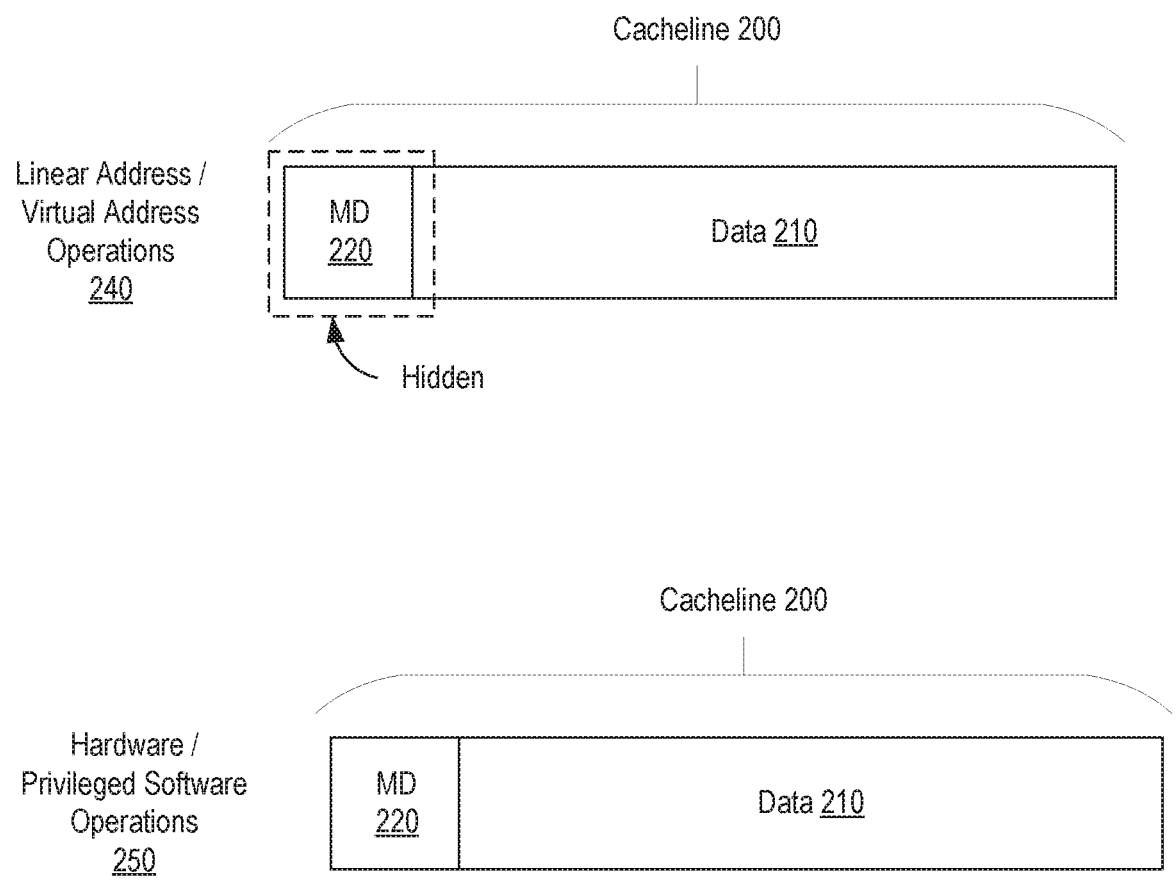
FIG. 2 is a diagram of example hidden inline metadata in a cacheline.

For instance, referring to FIG. 2, a diagram of example hidden inline metadata in a cacheline is shown. As shown in FIG. 2, a cacheline 200 includes a data portion 210 and a metadata portion 220, which includes a set of tags each associated with a respective word in the data portion 210. The metadata portion 220 is hidden for purposes of contiguous linear address/virtual address operations 240, but may be conditionally visible and available to the physical hardware and privileged software operations 250 (e.g., memory tagging, capabilities, and fine grain memory control).

The use of the hidden inline metadata may provide multiple advantages in the operation of an apparatus, system, or process in comparison with conventional technology to provide metadata, including improved performance with a single cycle required to access data and hidden inline metadata; cache efficiency, with no additional metadata being required in the cache area; memory efficiency with metadata only being included when required; precision with both load and store checks being provided; and side channel protection with the parallel metadata being present to avoid speculation in data attacks.

In some embodiments, memory tagging allows software to select the tag bits within a linear address by setting non-canonical bits to the tag value (e.g., utilizing a C or C++ pointer). The linear address tags are then compared with the metadata tags stored in the hidden memory to determine if the memory access is authorized. For example, to detect use-after-free exploits, a memory allocation routine (e.g., malloc) is to set the authorized memory tag(s) (StoreMetadata) for the allocated memory location(s), and then provide software with a pointer value containing the matching tag value (color) addressing the allocated memory buffer. When the software executes and causes the allocated memory to be loaded (e.g., into a processor register or GPR) or stored to memory, the processor will first compare the tag value in the pointer (non-canonical bits of the linear address) with the metadata tag value stored in hidden memory for the specified memory location (linear address). Because the metadata tags are co-located with the data (hidden from software), no additional memory lookups or caching is required to fetch and compare the stored tag values. In this manner, an efficient solution for memory tagging and access control is provided. Meanwhile, OS kernel/VMM (Virtual Machine Monitor) is provided access to memory without the metadata page table bit set in its memory mapping to page-in/page-out memory pages including the tag metadata (metadata physical memory is larger than in LA space). Finally, an overflow memory region is used to store both extra data and metadata that goes beyond a physical page size.

Figure 3:
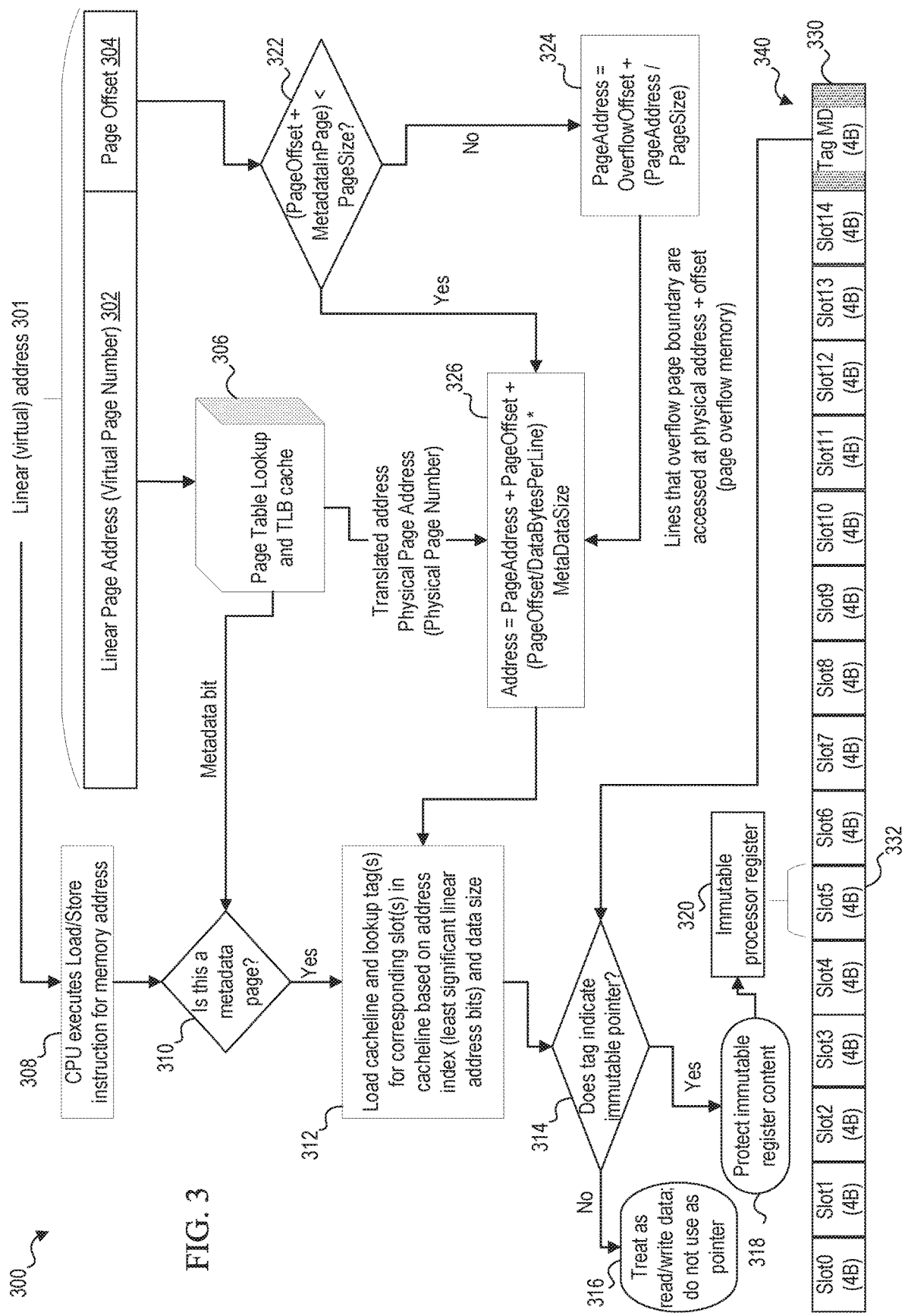
FIG. 3 is a diagram of an example process for handling data with hidden inline metadata in accordance with embodiments of the present disclosure.

Referring now to FIG. 3, an example process 300 for handling data with hidden inline metadata in accordance with embodiments of the present disclosure is shown. In particular, the example process illustrates hidden inline tag metadata 330 that maintains one or two tag bits per each 32-bit/4-byte word slot (e.g., 332) on cacheline 340, with extended paging to hold page overflow content based on page offset. In the example shown, the pointer tags in the tag metadata 330 are hidden (inaccessible to software) by the hardware and stored with the associated data (e.g., the words in each slot) inside every cacheline. This allows the processor to simultaneously load a pointer from memory and (in parallel) check the tag metadata to determine if the register access is an immutable pointer (or partially immutable encoded pointer). The parallelism of the tag and data access may prevent speculative side channels as the processor is aware that memory contents are expected to be used as a pointer (memory reference) or are normal program data (not to be used as a memory reference). Likewise, the loads are faster (when compared to loading from a separate table in memory), as there is no need to perform a separate memory read to access the metadata after the data as both reside on the same cacheline. In some cases, same-cycle access to metadata may also be offered via other mechanisms, e.g., storing tag bits in dedicated DRAM storage similarly to how ECC bits are stored; however, such approaches may still have some other drawbacks, e.g., requiring extra silicon area in caches for storing tag bits regardless of whether the data in the caches is actually tagged (as was noted above) and similarly wasting DRAM capacity if the stored data is untagged.

As illustrated in FIG. 3, a pointer/linear address 301 (e.g., a 64-bit address) is utilized for a page table lookup and TLB (Translation Lookaside Buffer) cache 306. The linear address 301 includes a linear page address 302 and a page offset 304. In an operation, a CPU (or other processor) is to execute at 308 a load or store instruction for the memory address (the linear address/location portion). At 310, it is determined whether the memory address is a metadata page. In some embodiments, a determination whether the memory address is a metadata page may be determined by checking an identifier in a memory or storage, including, for example, checking whether one or more bits in a page table entry (which may be referred to as a metadata bit) are set to indicate the presence of metadata in a cacheline for the cachelines corresponding to the associated page. If the memory address is determined to be a metadata page at 310, then the cacheline 340 and lookup tags(s) from the tag metadata 330 for corresponding slots in the cacheline 340 are loaded at 312 based on an address index.

The actual data location may be calculated based on the page offset 304. For example, the address may be calculated (e.g., at 326) according to the following: Address=PageAddress+PageOffset+(PageOffset/DataBytesPerLine)*MetaDataSize, if it is determined (e.g., at 322) that (PageOffset+MetadataPage) is less than PageSize. Otherwise, there is an overflow condition and lines that overflow are accessed at 324 at PhysicalAddress plus Offset, and thus PageAddress=OverflowOffset+(PageAddress/PageSize).

At 314, it is determined whether the tag value indicates an immutable pointer. If so, then the immutable register content is protected at 318, and the immutable processor register accesses at 320 a slot (e.g., 332 in the example shown) of the cacheline 340 (e.g., slot 332 (Slot5) in the example shown). In particular, if the load is for an immutable pointer, the associated register also tracks the immutable state, preventing modification of the register content as it is immutable, copying such state on register moves. Such a processor register may then be used as a memory operand (e.g., used by software as a pointer). If the tag indicates the slot contains program data (not an immutable pointer), then the register is loaded and may be modified by software, but may not be used as a pointer to reference memory. If not, then the data is treated as read/write data at 316. It will be understood that different embodiments may use different tag metadata and slot sizes. Further, the location of the tag metadata 330 in the cacheline 340 and the format of the tag metadata may vary in different embodiment.

The pointer/linear address 301 shown in FIG. 3 is in a non-encoded, non-encrypted format. In embodiments using plaintext pointers, the input operand to an instruction for initializing a pointer (e.g., an instruction called "InitPointer") may include an integer value that is to be converted directly to the pointer without being transformed. The destination operand is the register or memory location to which the pointer should be stored.

Figure 4:
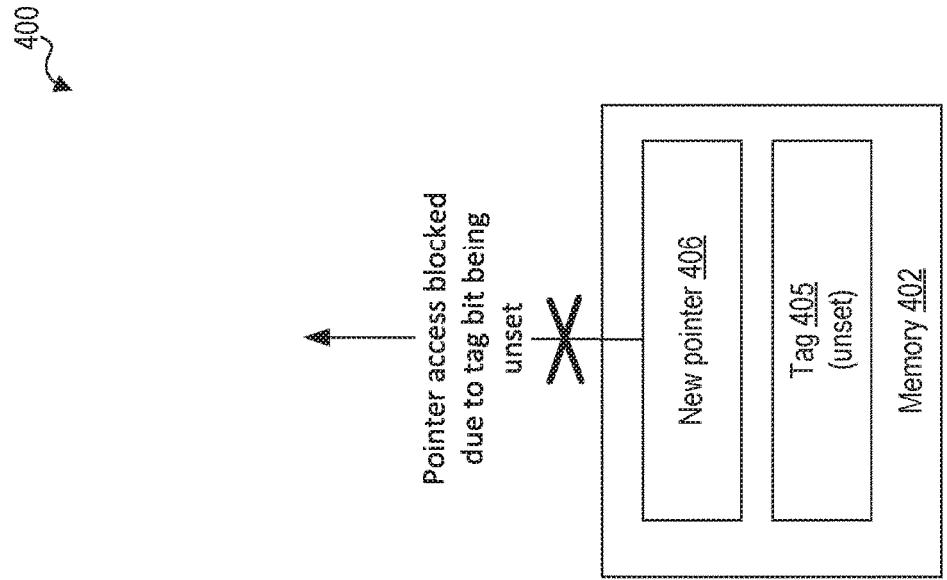
FIG. 4 is a diagram of an example pointer overwrite scenario where tagged pointers are utilized.
Figure 4:
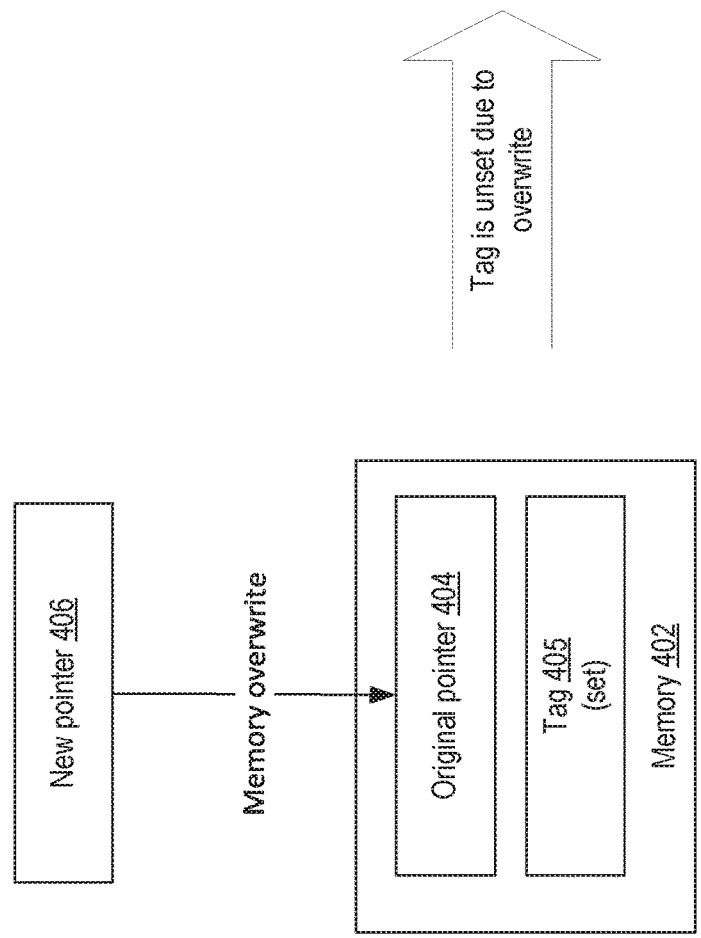

To set a tag bit in a register or word of memory, a particular instruction (e.g., InitPointer) for initializing pointers may be used. The typical threat model for memory safety enforcement assumes that the adversary is unable to insert new instructions into the code stream, so this implies that only authorized instructions for generating pointers are executed. However, the threat model may assume that an adversary can form a gadget to misuse an authorized instruction to generate pointers in an unauthorized manner as part of an exploit. Accordingly, in certain embodiments, overwriting a pointer with data lacking a set tag bit clears the tag bit in the destination location, which may be sufficient to block some exploits that depend on overwriting a pointer with a maliciously-crafted data value and then causing the program to use that crafted value as a pointer later, since the tag bit for the crafted value would then be unset. An example of this is shown in FIG. 4, which depicts an example pointer overwrite scenario where tagged pointers are utilized. In the example shown, a new pointer 406 is installed in memory 402 during a memory overwrite (e.g., a buffer overflow operation) to replace an original pointer 404, which is tagged by way of the tag 405 being set. The overwrite with untagged data causes the tag 405 to be unset, such that when a software program later attempts to use the pointer 406 the program is blocked from accessing the memory location to which the pointer points.

However, in some instances, an adversary may still use a pointer initialization gadget that can perform such an exploit. Thus, in some embodiments, randomizing data locations may be used to make it more difficult for an adversary to locate the pointer to be overwritten as well as to craft a value with which to overwrite the pointer that will permit the exploit to proceed. Yet, memory disclosure vulnerabilities may still enable an adversary to gather enough information to construct a working exploit.

Accordingly, embodiments, of the present disclosure may bind data encryption/decryption to the pointer value to further harden a system by disrupting memory disclosure. For example, in some embodiments, data encryption can be bound to the base address for the object by incorporating the base address as a tweak in a tweakable cipher. Example techniques for binding data encryption and decryption to base addresses are shown in FIGS. 5 and 6, respectively.

Figure 5:
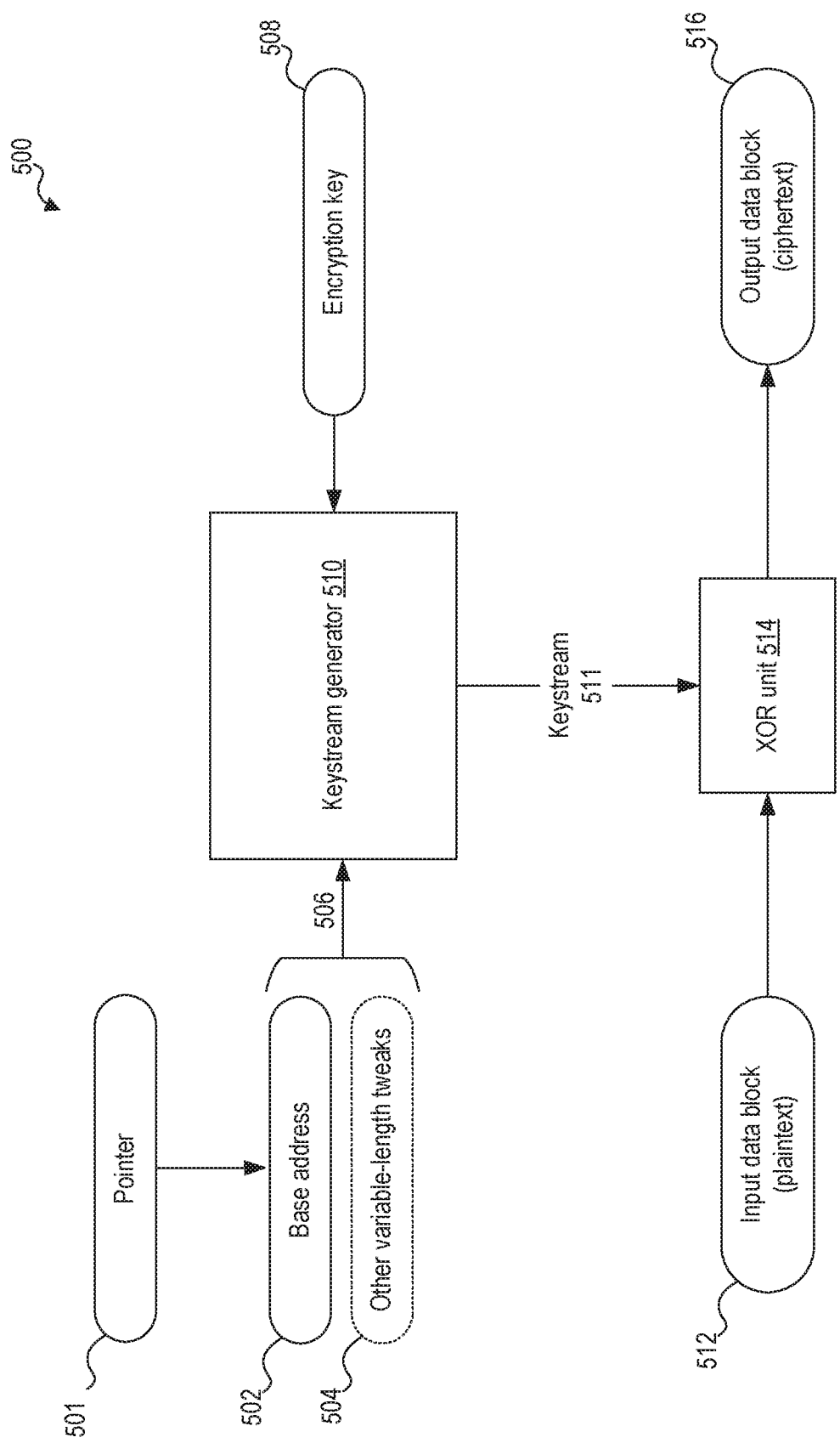
FIG. 5 is a diagram of an example pointer-based encryption process.

FIG. 5 is a diagram of an example pointer-based encryption process 500. In the example shown, a keystream generator 510 accepts as inputs an encryption key 508 and a tweak 506, which is based at least in part on a base address 502 (which may be obtained from a pointer 501 as shown) for the data to be encrypted. In some embodiments, the tweak 506 is further based on other variable-length tweak values 504, which may include a block-aligned, pointer-derived offset within the allocation for the current access. The keystream generator 510 generates a keystream 511 based on the inputs. An XOR unit 514 performs an XOR operation on plaintext input data 512 and the keystream 511 to generate output ciphertext data 516. A portion of the keystream 511 may be discarded and the keystream generator 510 may be invoked multiple times to align the keystream 511 with the output data block 516.

Figure 6:
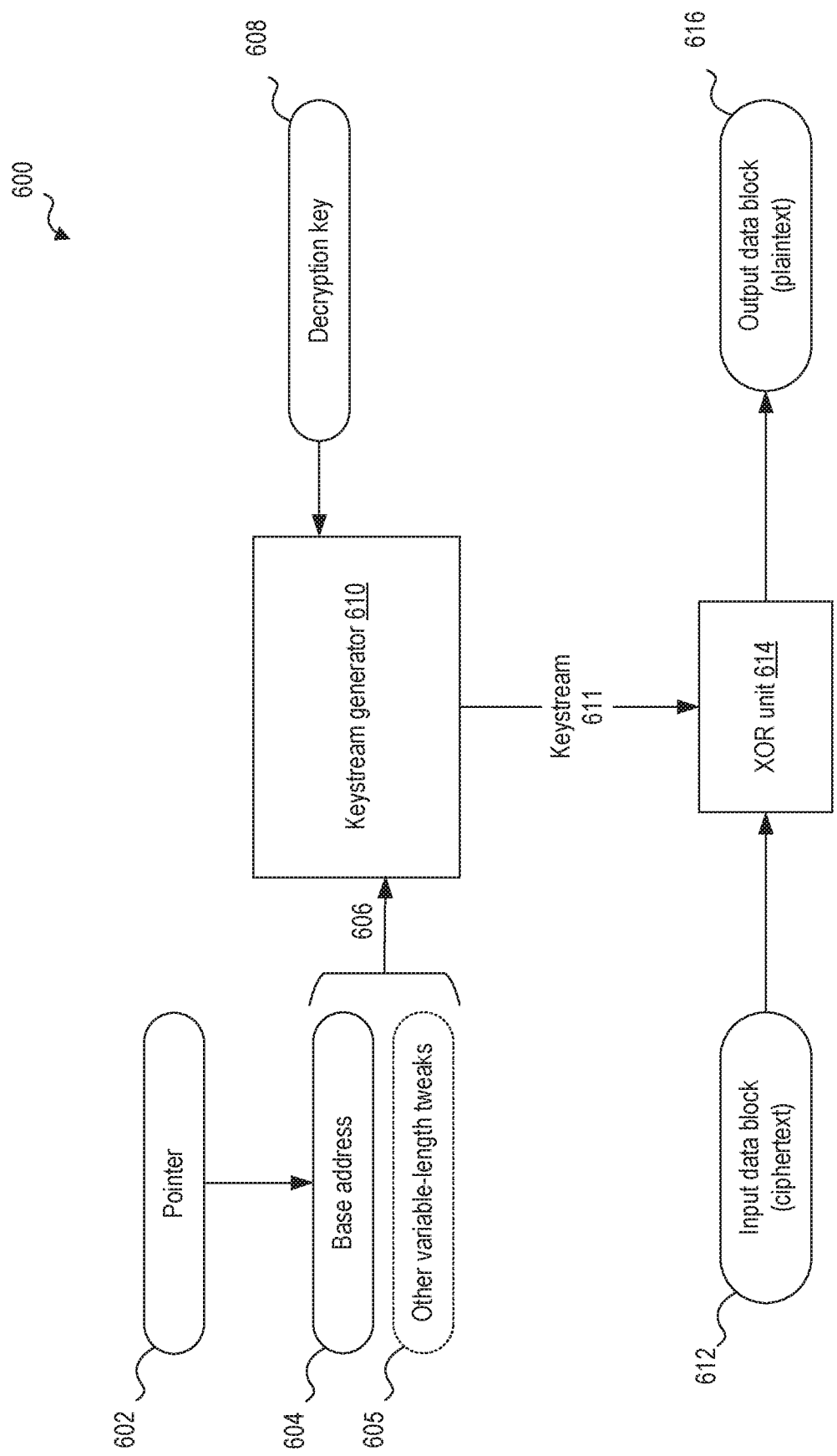
FIG. 6 is a diagram of an example pointer-based decryption process.

FIG. 6 is a diagram of an example pointer-based decryption process 600. The example process 600 may correspond to the encryption process 500 of FIG. 5. In the example shown, a keystream generator 610 accepts as inputs a decryption key 608 and a tweak 606, which is based at least in part on a base address 604 for the encrypted data to be decrypted. The base address 604 is derived from the pointer 602 for the memory location at which the encrypted data is stored. The base address 604 may be derived directly from a plaintext address of the pointer 602, or by decoding the pointer 602 to obtain the address (e.g., by decoding an encoded pointer such as pointer 1000 of FIG. 10). In some embodiments, the tweak 606 is further based on other variable-length tweak values 605, which may include a block-aligned, pointer-derived offset within the allocation for the current access. The keystream generator 610 generates a keystream 611 based on the inputs. An XOR unit 614 performs an XOR operation on the ciphertext data 612 (i.e., the data to be decrypted) and the keystream 611 to generate output plaintext data 616. A portion of the keystream 611 may be discarded and the keystream generator 610 may be invoked multiple times to align the keystream 611 with the input data block 612.

If an adversary attempted to disclose memory by performing a buffer overread, the base address for the buffer would be used as the tweak for all of the data read. Since data outside of the buffer would have been encrypted using a different tweak value (i.e. the base addresses for each portion of that data), the data read from those regions would be garbled. In fact, this does not even depend on pointer tagging; it is a property of binding the data encryption to the base pointer value.

Figure 7:
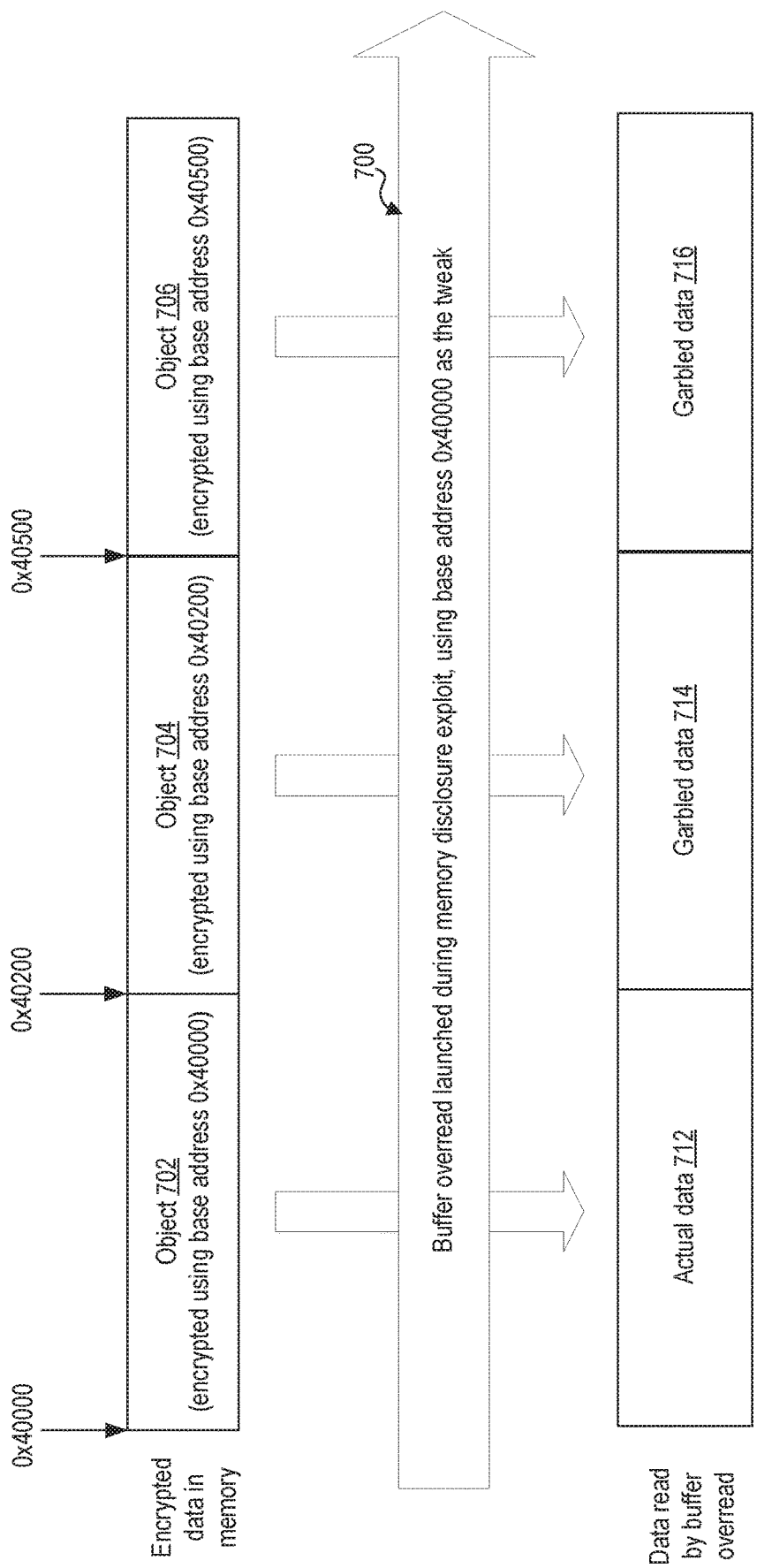
FIG. 7 is a diagram of an example buffer overread scenario where encryption is bound to pointer values.

FIG. 7 is a diagram of an example buffer overread scenario where encryption is bound to pointer values. In the example shown, memory contains objects 702, 704, 706, which are encrypted using their respective base addresses (i.e., 0x40000, 0x40200, and 0x40500 respectively in the example shown). A buffer overread 700 is performed during a memory disclosure exploit attempt using the base address for the object 702 (i.e., 0x40000) as the tweak, whereby the adversary is attempting to gain access to the data of objects 702, 704, 706. The adversary will be able to obtain the actual data 712 for object 702 (since the data is encrypted using the base address 0x40000). However, since the objects 704, 706 are encrypted using different tweak values, the data obtained from the decryption attempt using the base address for object 702 will result is garbled data 714, 716 as shown. In embodiments where integrity checking is utilized, an integrity violation may be signaled by the garbled data, halting the exploit at the point that an incorrect tweak value is first used.

Data corruption exploits may also be disrupted by binding data encryption to base addresses, since different base addresses would likely be used when maliciously overwriting data and pointers versus reading it out later. Further, binding data encryption to base addresses can also mitigate temporal safety vulnerabilities such as Use-After-Free (UAF) as well as type confusion. UAF and type confusion may involve writing to objects with the wrong size to corrupt an adjacent object, which would again result in the overwritten data/pointers being garbled when used later. Even if that's not the case, simply quarantining object base addresses (not object storage, just base addresses, i.e. the same storage could be reused for an object with a different base) may suffice for mitigating UAF.

Figure 8:
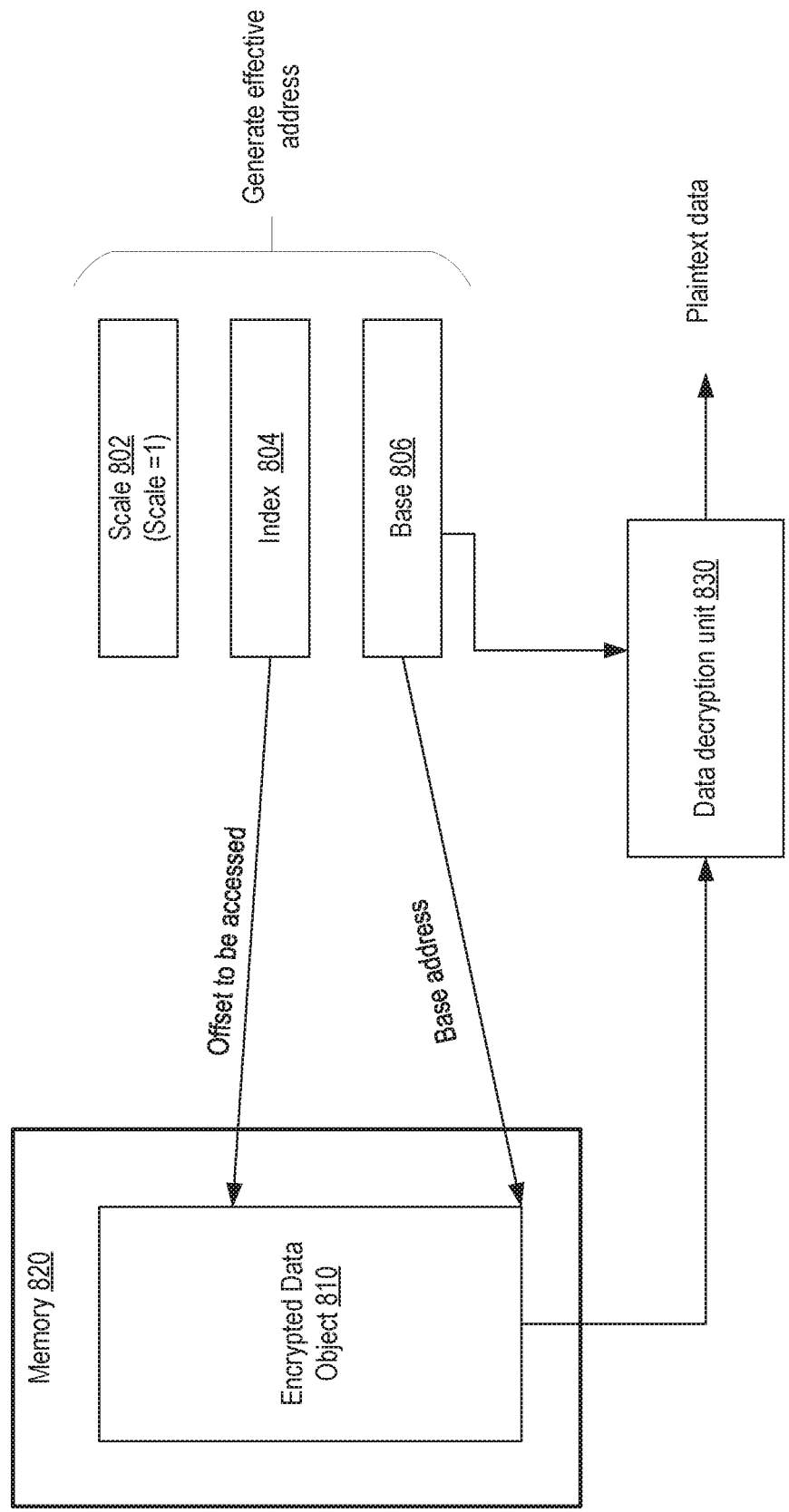
FIG. 8 is a diagram of an example scenario for passing base address information to a data encryption unit of a processor when memory is accessed.

One challenge inherent in this approach is communicating the correct base address to the processor whenever memory is accessed. At the point of access, the base address can be passed through a register in a memory operand, and the memory operand may also accept one or more additional inputs that can be combined to compute the final effective address. Since the base address is provided in a separate register, it can be forwarded to the data encryption/decryption unit. For example, Intel Architecture already supports a "Scale Index Base" (SIB) format for memory operands, which permits the base address to be supplied in a distinct register. An example of this is shown in FIG. 8, which illustrates an example scenario for passing base address information to a data decryption unit of a processor when memory is accessed. In the example shown, an encrypted data object 810 in memory 820 is accessed based on generating an effective address for the object 810 using the scale 802 (where scale=1 in the example shown), index 804, and base 806 as operands. The base 806 is passed to the decryption unit 830 along with the encrypted data from the encrypted data object 810, and the decryption unit 830 decrypts the encrypted data to provide the plaintext data.

Figure 10:
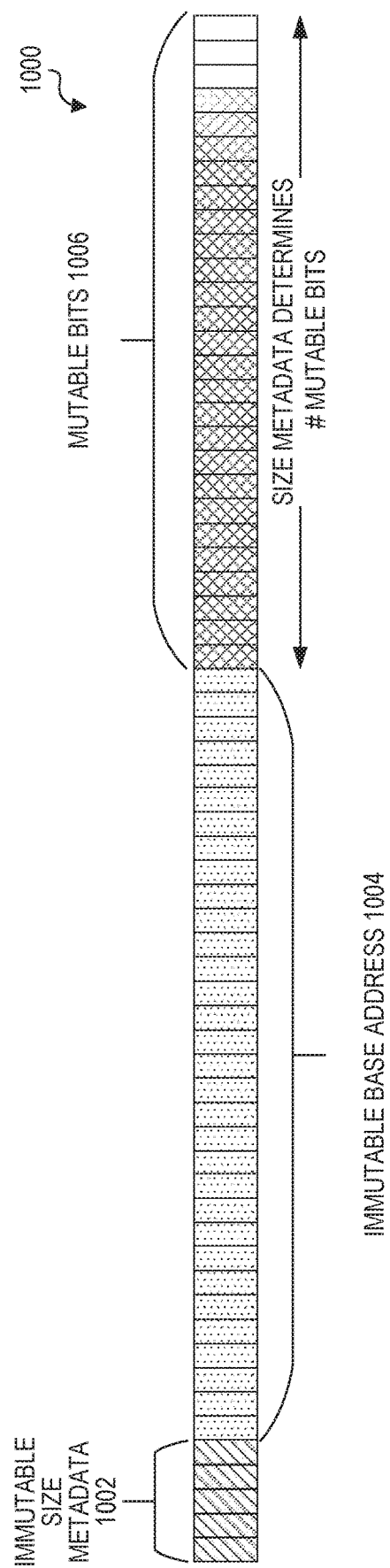
FIG. 10 is a diagram of an example encoded pointer that may be used in embodiments of the present disclosure.

A related approach may be used in certain embodiments to convey the base address for a code region in embodiments where code encryption is utilized. To support code encryption, a new register (e.g., a "RIPBASE" register) could be defined in addition to an existing register (e.g., a RIP register, also sometimes referred to as an instruction pointer, which contains a pointer to the memory location of the next instruction to execute) to hold the base address for the current code region. The RIPBASE register may be initialized using a new branch instruction (e.g., JBASE for "Jump and change Base") that accepts two register operands: 1) the base address for the code region, and 2) the branch destination. The JBASE instruction may update both the RIPBASE register and RIP register with those operands, respectively. In another embodiment, a single-operand variant of JBASE may set both the RIPBASE register and the RIP register to the same value, or existing indirect branch instructions could be redefined to operate in that manner. In other embodiments, the base address can be encoded directly in the address itself to provide maximum legacy software compatibility, as shown in FIG. 10 and described further below. RIPBASE may be saved to the stack alongside RIP (the return address) during calls and restored from the stack as the return address is reloaded into RIP during returns.

Figure 9:
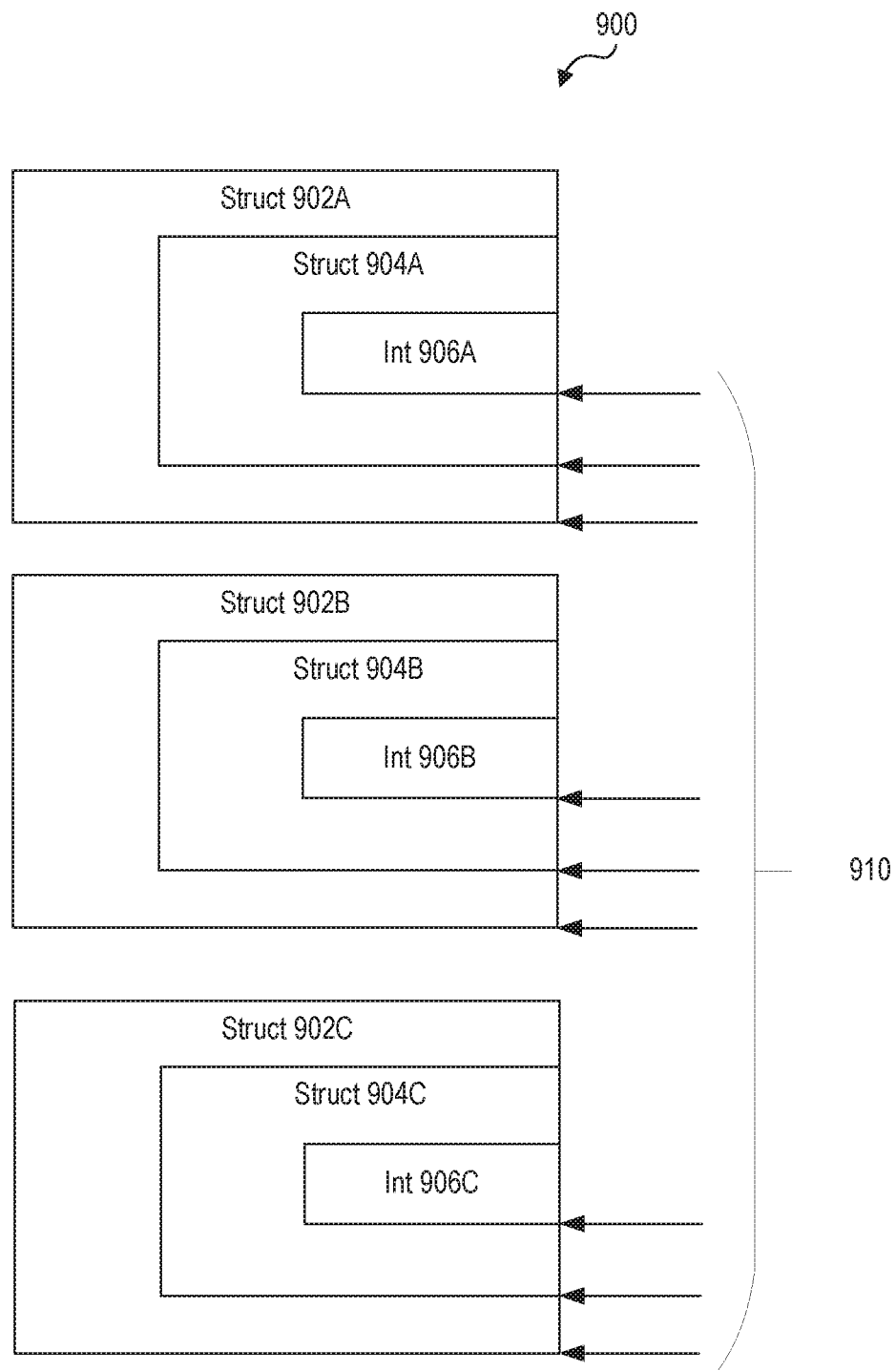
FIG. 9 is a diagram of example data layout with associated base addresses used for data binding.

Another challenge may include passing the base address through the program to all of the memory operands, since it is common for programs to pass pointers referencing individual array entries or fields within larger structures to subroutines. A compiler may be able to accomplish this by identifying cases in which a pointer to the interior of an object is passed to a subroutine and encrypting the interior portion with the base address of just that portion. This identification can be performed recursively, such that interior portions of previously-identified interior portions can be encrypted with the base address of that finest-grained portion. An example data layout with associated base addresses used for data binding is illustrated in FIG. 9. In the example shown, an array 900 of structures 902 is shown. Each structure 902 includes a structure 904, within which is stored an int 906. The base addresses 910 may be used for data binding so that pointers to any array element and to any field within an array element (that may be passed as a distinct pointer to a subroutine) can be generated.

A compiler may be able to determine necessary base addresses for data binding by analyzing the flow of pointers through the program and which structure elements are passed by reference to subroutines along particular flows or anywhere in the program if it is infeasible to statically determine all possible flows. However, it is not always possible to perform whole-program static analysis, e.g., due to the compiler being invoked separately for different source files with link-time optimization disabled. In that case, the compiler may need to conservatively assume that any field within any structure that may be passed to a different compilation unit may have pointers generated to any of its fields and passed to subroutines. Where the compiler can statically verify that structures are not passed to other compilation units, it may be able to reduce the number of distinct data binding base addresses used. Some benefits of reducing the number of distinct data binding addresses may include helping to preserve available base addresses to be used for future allocations and making it more difficult for adversaries to guess a valid base address. It is important to avoid reusing base addresses for different allocations, since reusing base addresses may enable an adversary to exploit a use-after-free vulnerability. In some embodiments, the memory allocator maintains a list of quarantined base addresses that should not be reused, at least for a certain period of time.

While tagged plaintext pointers may provide adequate protection against certain vulnerabilities, in certain embodiments, the pointer may be encoded with certain context information, providing one or more additional security benefits. FIG. 10 is a diagram of an example encoded pointer 1000 that may be used in embodiments of the present disclosure. In the example shown, the encoded pointer 1000 is a partially immutable pointer. Partially immutable encoded pointers may contain immutable regions and modifiable regions indicated by a size field within the pointer format, with the size field always being immutable. For instance, as shown, the encoded pointer 1000 includes a size metadata region 1002, an immutable base address region 1004, and a mutable region 1006. The size metadata indicates a number of mutable bits in the mutable region 1006, with the remainder of the bits of the pointer in the immutable region 1004 being immutable. However, in other embodiments, the size metadata indicates a number of immutable bits in the immutable region 1004, with the remainder of the bits of the pointer being in the mutable region 1004. In embodiments of the present disclosure, the encoded pointer 1000 has one or more tag bits associated therewith that indicate the encoded pointer is at least partially immutable. In certain embodiments, the size metadata region 1002 is immutable (along with the immutable base address region 1004), as determined by a tag associated with the pointer 1000. In some embodiments, the information in the size metadata region 1002 may be incorporated into hidden inline metadata instead of being part of the pointer 1000 as shown.

The size metadata region 1002 may indicate the number of bits in the pointer 1000 that are immutable. For example, a size value of 0 may indicate that the entire pointer address is immutable (i.e., all bits other than the size metadata 1002 bits are in the immutable region 1004, with no bits in the mutable region 1006). As other examples, a size value of 1 may indicate only the least significant bit of the pointer is part of the mutable region 1006, and a size value of 2 may indicate the last two least significant bits of the pointer are part of the mutable region 1006. While FIG. 10 only shows 5 bits in the size metadata region 1002, in some embodiments, a 64 bit address may include a 6 bit size field (e.g., to enable this for every bit position).

In some embodiments, other immutable fields may be included in the pointer 1000 as well. As one example, a version field (e.g., 4 bits) may be included in the pointer

1000 as additional pointer metadata, where the version may be matched with tag metadata (e.g., 330 in FIG. 3) corresponding to a data access (e.g., 332 in FIG. 3). In such embodiments, the pointer version field value is expected to match the same metadata value (e.g., in tag metadata 330) for the data access (e.g., 332) referenced by said pointer. This would be used to detect when a pointer to an allocation (from a memory allocator such as malloc) that was previously freed (e.g., free in glibc) is used to access data allocated to a new function (where the 330 metadata would be updated with a new version that no longer matches the freed immutable pointer), which may be referred to as a use-after-free attack. In this way, tagging may extend to indicating mutable and versioned data as well as indicating immutable pointers.

Encryption of data based on a pointer such as pointer 1000 of FIG. 10 will produce encrypted pointers that are encrypted when accessed as encrypted data. For example, if there is a linked list structure with a next pointer in it, the current pointer 1000 will decrypt the linked list node structure including the next pointer (struct Node {int data; struct Node*next}). The next pointer will be tagged as an immutable pointer (e.g., indicated via the tag metadata (e.g., 330) hidden metadata tag) while the data portion will be marked as data/mutable. When the processor decrypts the node using the current pointer, it will also decrypt the next pointer based on the base address and size of the current pointer 1000. Then it will have the next pointer, which the processor will use to decrypt the next node and so on.

Further, in some embodiments, the entire pointer may be encrypted. Encryption of entire pointers may be tweaked by the type of the pointers in certain implementations, which may obviate the need to have metadata encoded into the pointer. One benefit of cryptographically binding pointers to particular types is that no extra metadata storage is needed to distinguish different types of pointers. Storage of a single tag bit that distinguishes pointers from non-pointer data may accordingly suffice in certain instances.

Figure 11:
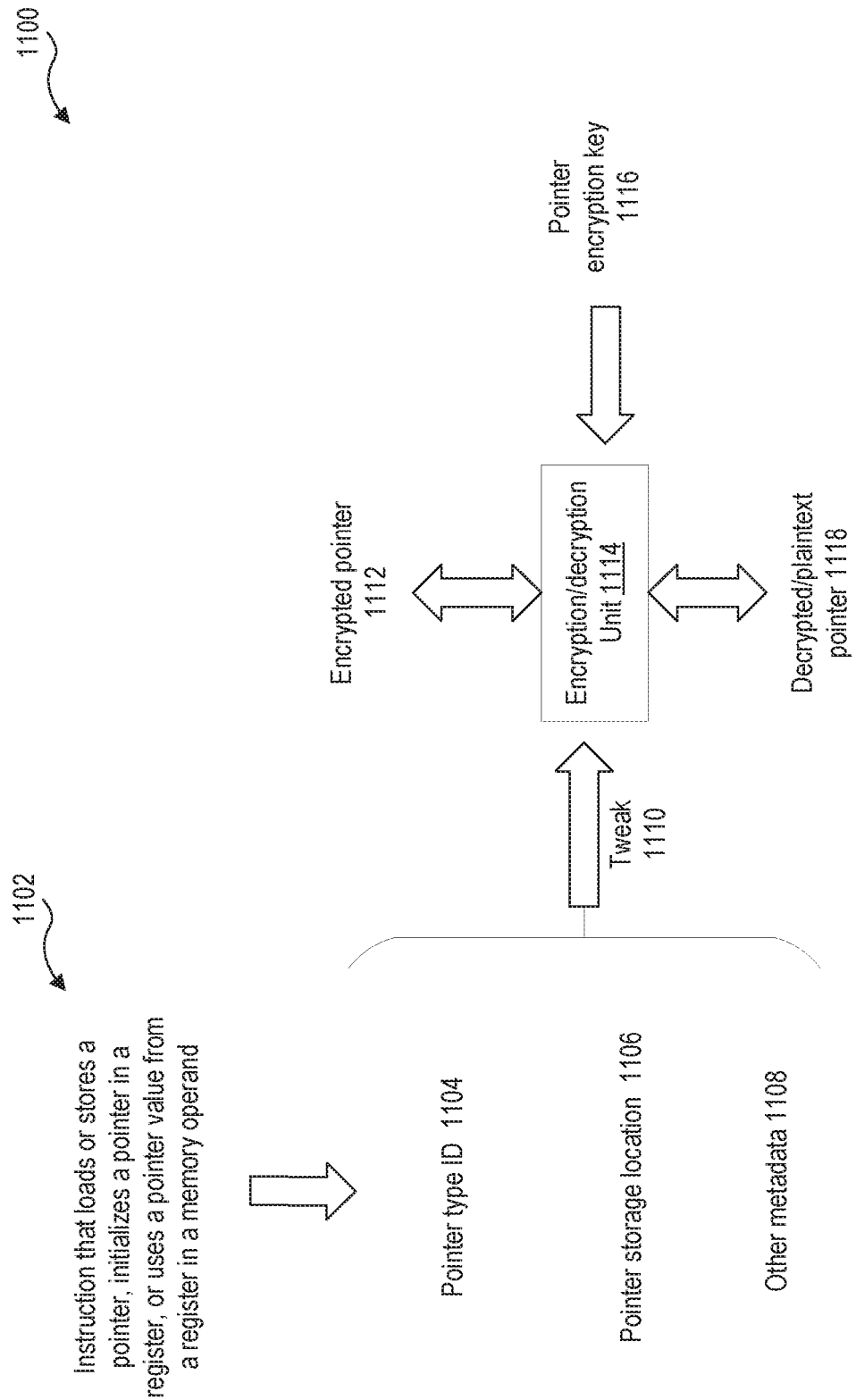
FIG. 11 is a diagram of an example process of encrypting and decrypting pointers.

FIG. 11 is a diagram of an example process 1100 of encrypting and decrypting pointers according to such embodiments. In the example shown, an instruction 1102 is accessed. The instruction 1102 may be an instruction to load or store a pointer, initialize a pointer in a register, or use a pointer value from a register in a memory operand. Based on the instruction 1102, certain metadata for the pointer is obtained. For instance, in the example shown, a pointer type identifier (ID) 1104 is derived from the instruction type (e.g., a RET instruction expects an "Unclonable reverse code pointer after store" pointer type), instruction operand, or a prefix indicating a pointer type. In addition, in the example shown, a pointer storage location 1106 is determined if the pointer is locked to a storage location (e.g., stack pointer value for return addresses). In some embodiments, other metadata 1108 is also obtained. The metadata 1104, 1106, 1108 are provided as a tweak 1110 to an encryption/decryption unit 1114 along with a pointer encryption key 1116 to either encrypt or decrypt a pointer. For instance, the encryption/decryption unit 1114 may use the key 1116 and tweak 1110 to encrypt a plaintext (decrypted) pointer 1118 to yield an encrypted pointer 1112. Conversely, the encryption/decryption unit 1114 may use the key 1116 and tweak 1110 to decrypt an encrypted pointer 1112 to yield plaintext pointer 1118. Pointer encryption in this manner may be used to distinguish between different types of pointers and to bind them to storage locations. In some embodiments, part or all of the metadata 1104, 1106, 1108 may be used to select key 1116 from multiple possible keys instead of being supplied as a tweak. For example, a separate key may be used for each pointer type, and pointer type ID 1104 may be used to select key 1116 from a set of different keys. Remaining metadata that is not used to select key 1116 may still be supplied as part of tweak 1110.

In some embodiments, program errors and exploits may be detected through the use of specific instructions for accessing pointers. For example, instructions can be defined to manipulate tagged pointers (e.g., to change the offset of the pointer within the object to which it points, to load it from memory into a register, to store it from a register to memory, etc.). If an ordinary data write overwrites a pointer value, the processor can either clear the tag bit in memory (as described above) or generate a fault, depending on how the processor has been configured. One benefit of generating a fault is that it may ease debugging of program errors that inadvertently overwrite pointers. Conversely, some programs may wish to conveniently overwrite pointers without needing to use a separate instruction to clear the tag bit first. A way to reduce overhead and complexity from using a separate instruction to clear tag bits is to define an instruction that clears all tag bits in a range of memory.

Since tag bits propagate through registers and back into memory when a register is stored, an adversary may attempt to forge a pointer by modifying a register containing a pointer and then writing it out to memory to be used later. The adversary may only be able to find a code gadget to write it back that is intended to write a data field. Thus, such an exploit may be mitigated by only permitting pointers to be written to memory using designated instructions, e.g., STPTR for "Store Pointer". Compilers are aware of program locations in which pointers are intended to be written to memory, so they can use STPTR instructions at those locations. Attempting to store a register tagged as a pointer using an instruction other than STPTR would generate a fault. Alternatively, an instruction prefix could be defined to indicate whether an instruction that has already been defined is permitted to store a pointer. Furthermore, attempting to store a register not tagged as a pointer using a STPTR instruction or a previously-defined instruction with a prefix indicating that it is permitted to store a pointer may generate a fault to prevent an adversary from constructing a gadget that uses a STPTR instruction to tag a non-pointer data value in a register as a pointer as it is being written to memory. Alternatively, software may wish to use a previously-defined instructions to overwrite a pointer in memory, but to generate a fault if the source register is not tagged as containing a pointer. Similarly, software may wish for a fault to be generated if a previously-defined instruction is used to attempt to overwrite non-pointer data in memory with a source register that is tagged as containing a pointer, or if a STPTR instruction is used to attempt to overwrite non-pointer data in memory. A prefix, additional instruction operand, or instruction variant may be defined to indicate whether a fault should be generated in the aforementioned circumstances.

In some instances, instructions may modify data in place in memory (e.g., by adding some value) without first loading it into a register, and an adversary may find a gadget that can be redirected to modify a pointer instead of data. This exploit attempt can be blocked by requiring that a prefix be supplied to modify a pointer, or that a specific new type of instruction (e.g., PTRADD) be used. The compiler can determine which instructions need to modify pointers, so it can select the appropriate instruction or prefix. If an instruction that is not authorized in such a way to modify a pointer is applied to a pointer, a fault may be generated or the tag bit in the register may be cleared.

In some instances, code sequences may copy a block of data larger than a single word between two memory locations. An adversary may attempt to use such a code sequence to copy pointers as part of an exploit attempt. This portion of the exploit can be disabled by defining a new copy instruction, e.g., MOVSPTR for "Move String containing Pointers", or an instruction prefix to indicate whether pointers are allowed to be copied by the instruction. If an instruction that is not authorized to copy pointers encounters a source word with a set tag bit, it may generate a fault or clear the tag bits in the destination data region. The fault generation or tag clearing behavior may be selected using a prefix, additional instruction operand, or instruction variant.

In some cases, a single tag bit may be insufficient to distinguish between multiple possible types of word values. For example, consider the following set of word types (which are distinct from programming language datatypes): (1) Unprotected data: Data that is not particularly sensitive; (2) Protected data: Sensitive data that should only be accessible from a small portion of the program; (3) Data pointer; (4) Clonable forward code pointer: A pointer that can be used in indirect branches and that can be copied freely within the program; (5) Unclonable forward code pointer after store: A pointer that can be used in indirect branches, but that cannot be copied to a different location in memory; and (6) Unclonable reverse code pointer after store: A pointer that can be used as a return destination, and that cannot be copied to a different location in memory.

Additional word types may be needed for unclonable forward and reverse code pointers before store, but those might not need to be represented in memory, rather only in registers or implicitly in call instructions as a return address is being generated. Encrypted words will be decrypted while in registers in certain embodiments, and a set of three tag bits in each register may indicate the type of the word in the register. If 32-bit words are used to store pointers, each word may be expanded to 64 bits while in a register. An instruction that initializes a register with a pointer value may accept the full range of representable pointer types as indicated by an additional operand, a prefix, or an instruction variant. An instruction that initializes a memory location with a pointer value may accept just the range of pointer types that can be represented in memory as indicated by an additional operand, a prefix, or an instruction variant. In certain embodiments, immediately upon decryption, an address canonicality check may be performed. Some architectures and modes perform a canonicality check on linear addresses during memory operations to verify that an appropriate number of upper address bits all have the same value. Incorrect decryption, e.g., decrypting a pointer as though it is a different pointer type than it actually is, may cause a canonicality check to fail in such implementations. However, arithmetic operations performed on the corrupted plaintext representation of the pointer may cause it to pass canonicality checks performed while using the pointer later to access memory, which may be undesirable. Performing an extra canonicality check immediately after decryption may eliminate that possibility. In alternative embodiments, e.g., those that permit software to store metadata in upper pointer bits that software removes prior to using pointers, canonicality checks may be delayed until the pointers are used. In certain embodiments, to reduce register tag bit storage, pointers may be kept in encrypted form in registers associated with fewer tag bits than are needed to represent all possible pointer types and decrypted upon use. It will be understood that if pointer encryption is bound to the pointer's storage location and pointer decryption is delayed until the time that the pointer is used in a memory access, then the storage location and any other metadata incorporated into the tweak may need to be provided at the time the pointer is used. The pointer storage location is readily available for return instructions that implicitly load return addresses from the stack (e.g., the RET instruction) and indirect forward branches that load their destinations from memory operands (e.g., the JMP and CALL instructions) and then immediately use the addresses, but it may not be readily available for other types of instructions.

In some embodiments, word types to be represented in stored words can be bound to those words using tweakable encryption, supplying a different tweak value for each type as shown in Table 1. This may reduce the needed metadata storage. As shown in Table 1, in some embodiments unclonability is enforced in the example shown in Table 1 by binding pointers to their storage locations via the tweak.

TABLE 1

Tag bits and tweak values for indicating different pointer types

| Tag type | Tag bit | Tweak value |
| --- | --- | --- |
| Unprotected data | 0 | N/A - not encrypted |
| Protected data | 0 | None |
| Data pointer | 1 | 1 |
| Clonable forward code pointer | 1 | 2 |
| Unclonable forward code pointer after store | 1 | {3, storage location} |
| Unclonable reverse code pointer after store | 1 | {4, storage location} |

In certain embodiments, when a register is stored, the tag type in the register determines whether and how the register contents are encrypted prior to being written to memory, as well as how the in-memory tag bit is set. Specific load instructions can be utilized for each of the word types besides unprotected data, and the compiler may perform static analysis to determine which type to use at every point in the program. The variant of the load instruction would indicate the appropriate tweak value and settings for the loaded register's tag type bits. Previously defined instructions may implicitly access certain types of pointers, and that would indicate the appropriate tweak value. For example, call instructions (e.g., CALL) implicitly store an "unclonable reverse code pointer after store" pointer to the top of the stack and return instructions (e.g., RET) implicitly load a pointer with that type from the top of the stack.

In some embodiments, a memory copy may only preserve the tag bit and copy the mix of plaintext and ciphertext as-is. The MOVSPTR instruction and other related instructions described above may still be used for this purpose when copying memory containing pointers. Memory consisting entirely of unprotected and protected data would use standard memory move instructions (e.g., REP MOVS).

Overwriting a pointer with the wrong type of pointer or cloning an unclonable pointer would probabilistically protect against misuse, since the mismatched tweak would garble the address. One potential weakness is that replay of unclonable pointers (e.g., return addresses) is possible at the same storage location. Additional context that identifies a particular stack frame may be incorporated into the tweak to mitigate this, in certain embodiments.

If physical tag storage is allocated to support 32-bit words with one tag bit per word, but 64-bit words are used, then there will effectively be two tag bits per word. That can be used to deterministically distinguish some of the word types without relying on cryptography. Table 2 illustrates an example tag assignment scheme in such scenarios.

TABLE 2

Tag bits and tweak values for indicating different pointer types

| Tag type | Tag bits | Tweak value |
|---|---|---|
| Unprotected data | 00 | N/A - not encrypted |
| Protected data | 00 | None |
| Data pointer | 01 | N/A - not encrypted |
| Clonable forward code pointer | 10 | N/A - not encrypted |
| Unclonable forward code pointer after store | 11 | {1, storage location} |
| Unclonable reverse code pointer after store | 11 | {2, storage location} |

Tag bits may traditionally be stored in dedicated memory alongside each cacheline of a cache. For example, to store a single tag bit for each 32-bit word of memory, the cache arrangement may be as shown in the cache 120 of FIG. 1. However, for applications with sparse pointer storage (e.g., applications that store many long stretches of pure data with no interleaved pointers), tag bit storage in the cache can be wasteful of silicon area. Memory can also be wasted when tags are stored for memory regions that do not need to be tagged, as they do not contain pointers (e.g., code regions that are free of pointers). Aspects of the present disclosure may minimize such wastage in one of the following ways: (1) use of hidden inline metadata, and (2) configuring a cache in a particular way.

Hidden inline metadata may be used in particular embodiments to store tag bits in a repurposed portion of each tagged cacheline (only for cachelines containing tag data) so that memory regions that do not contain tag data do not incur any cache area overhead. Examples of hidden inline metadata storage are shown in cacheline 200 FIG. 2 and cacheline 340 of FIG. 3. The presence of tag data in a cacheline may be determined in such embodiments by consulting a specification of which memory pages or regions may contain tags. For example, extended page tables could be used to mark code pages as execute-only and implicitly consider those to be free of tag data. As another example, a new bit may be defined in extended page table entries to explicitly indicate which pages may contain pointers. This may reduce wastage compared to implicitly treating just execute-only code pages as untagged, since there may be many data pages that do not contain any set tag bits. Since a single physical page may be aliased in one or more linear address spaces, an attempt to access a page as both tagged and untagged should generate a fault.

Figure 12:
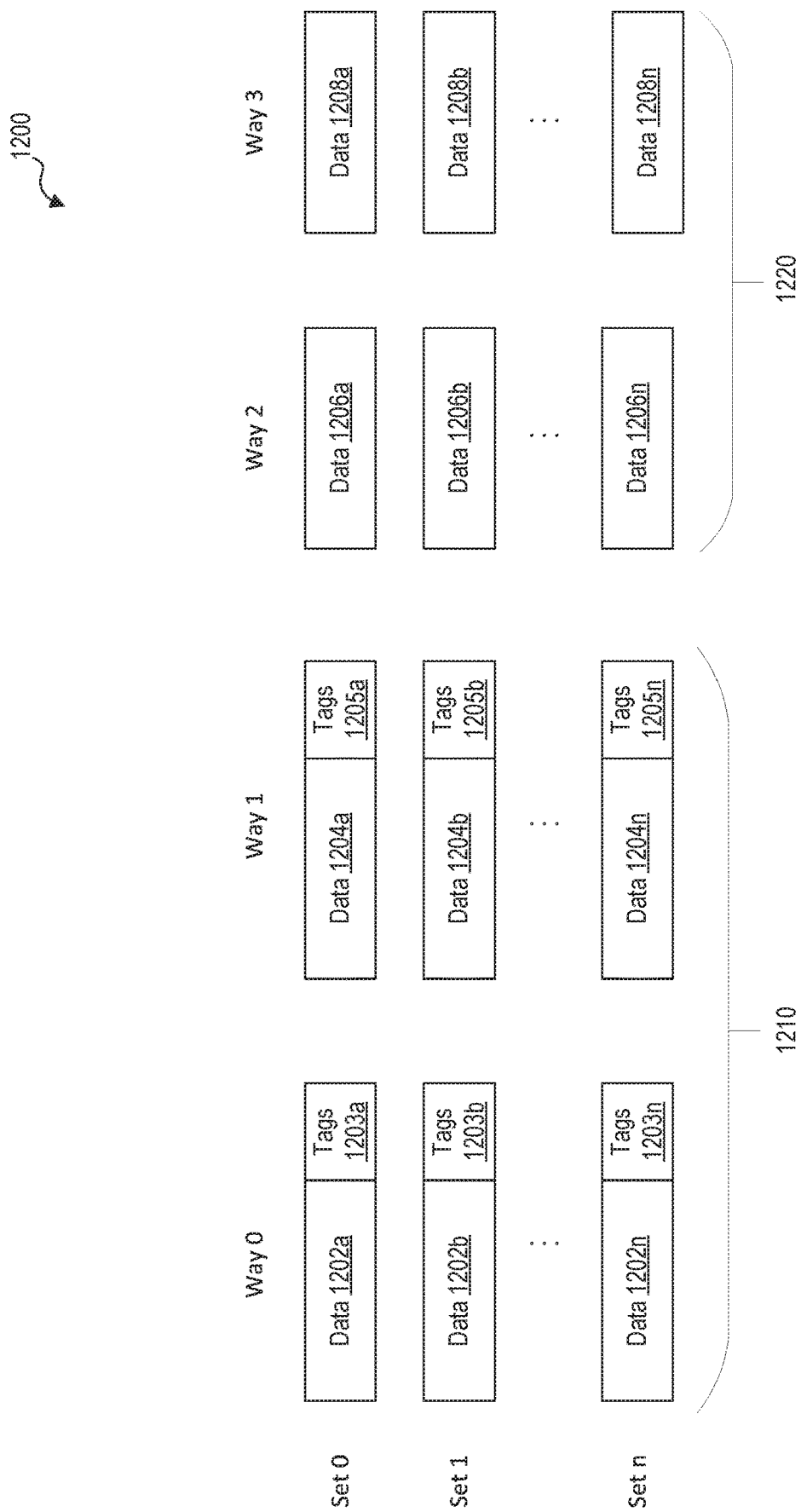
FIG. 12 is a diagram of an example cache arrangement with particular ways for storing tagged data.

In particular embodiments, only certain cache ways are configured to contain tag information. The tag information may be stored in the conventional way using dedicated memory alongside each cacheline such that cachelines with no set tags can be stored in cache ways with no tag storage. An example cache organization like this is shown in FIG. 12, which illustrates an example cache arrangement with particular ways for storing tagged data. In the example shown, the cache 1200 includes a number of sets of ways. Each way is configured to store data, but only ways 1210 (i.e., Way 0 and Way 1, also referred to as "tagged ways") are configured to store tags alongside their associated data, while ways 1220 (i.e., Way 2 and Way 3, also referred to as "untagged ways") may only store data without associated tags. For instance, Way 0 is configured to store tags 1203 alongside data 1202 and Way 1 is configured to store tags 1205 alongside data 1204, while Way 2 is configured to store only data 1206 and Way 3 is configured to only store data 1208. By configuring only certain ways to store tagged data in this manner, an overall silicon area of the cache may be more efficiently utilized or optimized.

Relatedly, it may be wasteful to allocate tag bit storage for untagged memory while it is not in the cache. The approaches described above for implicitly treating execute-only code pages as untagged or including an explicit page attribute to indicate whether the page is tagged can be used to determine whether to allocate tag storage for memory. When combined with hidden inline metadata, this approach can save memory by avoiding the need to allocate storage for inline metadata in untagged pages. If untagged pages can be coalesced to be stored in contiguous physical memory, then the corresponding hidden inline metadata regions can be reclaimed to store data. This can further be combined with the cache organization described above with respect to FIG. 12, where a cache contains a mix of tagged and untagged ways to indicate which ways can be used for memory from a particular page. The following illustrates how an attempt by software to store a pointer to a particular cacheline may be handled in certain embodiments, depending on how that cacheline is marked and where it is stored for a cache organized as a mix of tagged and untagged ways. When hidden inline metadata is used to store tag bits, tag storage may be allocated for every cacheline in a tagged region to preserve expected data alignment.

Figure 13:
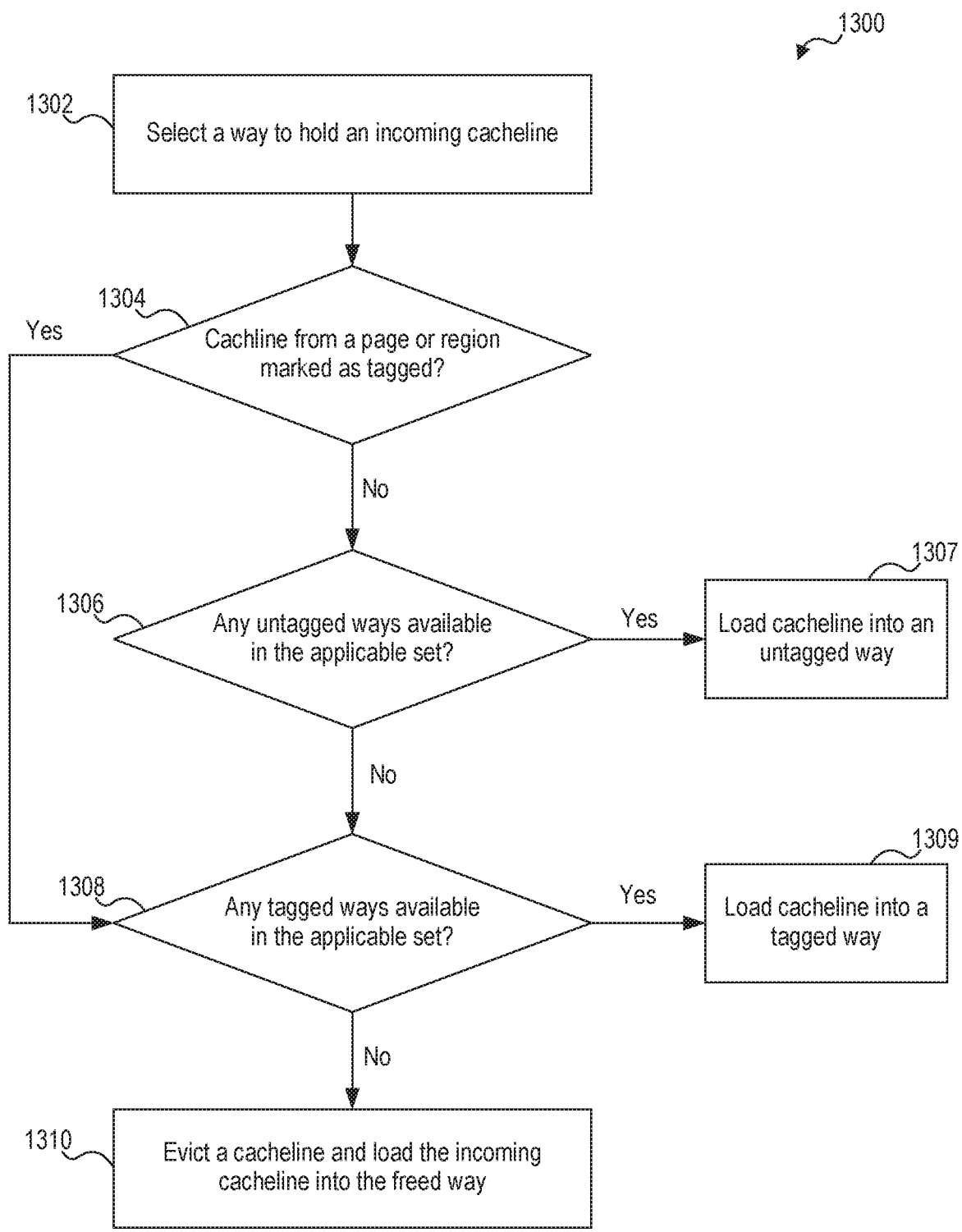
FIG. 13 is a flow diagram of an example process of storing a cacheline in a cache according to certain embodiments.

FIG. 13 is a flow diagram of an example process 1300 of storing a cacheline in a cache according to certain embodiments. The process 1300 may be implemented to store data (including tagged data) to a cache implemented similarly to the cache 1200. At 1302, a way of the cache is selected to hold an incoming cacheline from memory. At 1304, it is determined whether the cacheline is from a page or region of memory marked as tagged (i.e., that the page/region contains tags and their associated data). If so, then the process proceeds to 1308, which is described below.

If the cacheline is not from a page or region of memory marked as tagged, then it is determined at 1306 whether there are any untagged ways available in the applicable set of the cache. If so, then the cacheline is stored in one of the available untagged ways of the cache (e.g., ways 1220 of FIG. 12) at 1307.

If there are no untagged ways available in the applicable set of the cache, then it is determined at 1308 whether there are any tagged ways available in the applicable set. If so, then the cacheline is stored into one of the available tagged ways of the cache (e.g., ways 1210 of FIG. 12) at 1309.

If the cacheline is not from a page or region marked as tagged, and there are no tagged or untagged ways available in the cache, then a cacheline is evicted from the cache and the incoming cacheline is stored in the freed cacheline at 1310. The cacheline to be evicted may be preferentially selected to either have tag storage or lack tag storage depending on whether the incoming cacheline requires tag storage. Independent factors such as the last time the cacheline was accessed may also influence the selection of the cacheline to evict.

Figure 14:
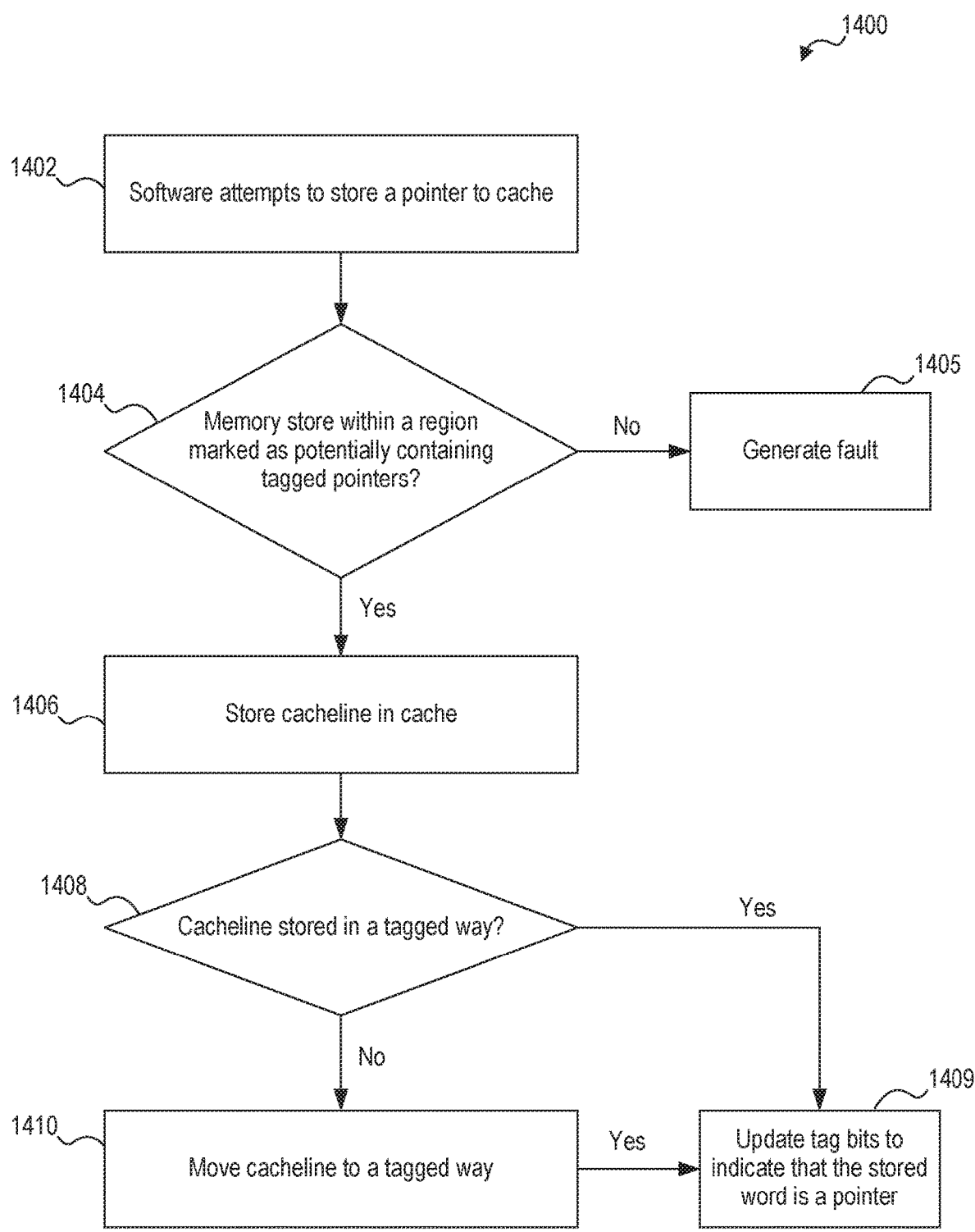
FIG. 14 is a flow diagram of another example process of storing a cacheline in a cache according to certain embodiments.

FIG. 14 is a flow diagram of another example process 1400 of storing a cacheline in a cache according to certain embodiments. At 1402, a software instruction attempts to store a pointer to a cache. At 1404, it is determined whether a memory store for the pointer is within a region marked as potentially containing tagged pointers. If it is not within such a region, then a fault is generated at 1405. However, if the memory store is within such a region, then the cacheline is stored in the cache at 1406. At 1408, it is determined whether the cacheline is in a tagged way of the cache. If so, then the tag bits of the tagged way are updated at 1409 to indicate that the stored word is a pointer. If the cacheline is not in a tagged way of the cache, then the cacheline is moved to a tagged way (evicting a cacheline if necessary) at 1410 before updating the tag bits of the tagged way at 1409 to indicate that the stored word is a pointer.

Figure 15:
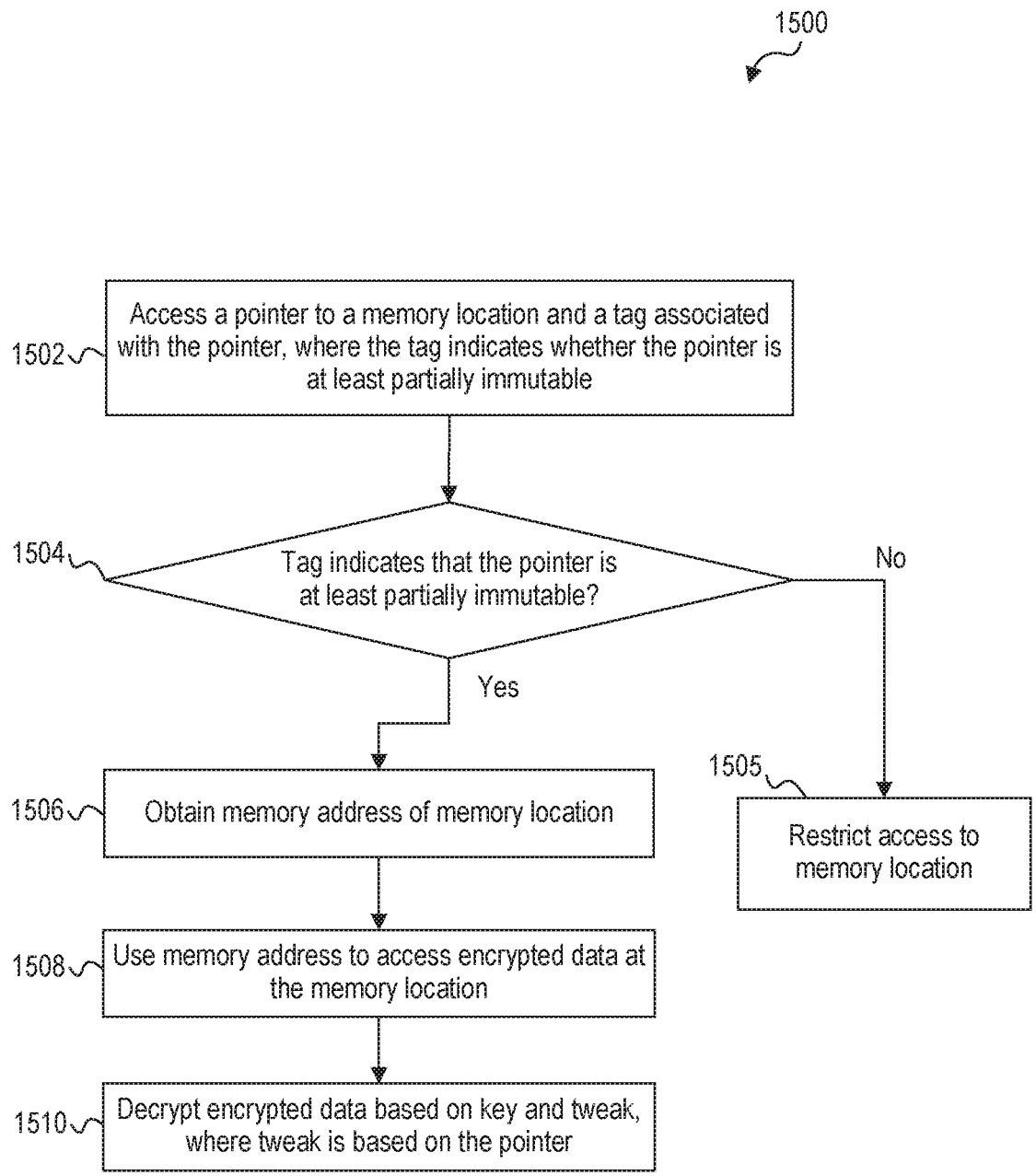
FIG. 15 is a flow diagram of an example process of accessing encrypted data based on a tagged pointer.

FIG. 15 is a flow diagram of an example process 1500 of accessing encrypted data based on a tagged pointer. At 1502, a pointer to a memory location is accessed along with a tag associated with the pointer. The tag indicates whether the pointer is at least partially immutable. The tag could be fully or partially immutable. At 1504, it is determined whether the tag indicates that the pointer is at least partially immutable (e.g., that the tag is set). If not, then the access to the memory location is restricted.

However, if the tag indicates that the pointer is at least partially immutable, then the memory address of the memory location is obtained at 1506. Obtaining the memory address may include obtaining the address directly from the pointer, where the pointer is in a plaintext format. In other embodiments, obtaining the memory address may include decoding the pointer, where the pointer is encoded. In some cases, the pointer may be cryptographically encoded as described herein, and decoding the pointer may include cryptographically decoding the pointer (e.g., as shown in FIG. 11 and described above).

At 1508, the memory address obtained at 1506 is used to access encrypted data stored at the memory location, and at 1510, the encrypted data is decrypted using a key and a tweak. The tweak is based, at least partially, on the pointer itself.

The example processes described above may include additional or different operations, and the operations may be performed in the order shown or in another order. In some cases, one or more of the operations shown in the flow diagrams are implemented as processes that include multiple operations, sub-processes, or other types of routines. In some cases, operations can be combined, performed in another order, performed in parallel, iterated, or otherwise repeated or performed in another manner.

Example Cryptographic Computing Embodiments

Current computing techniques (e.g., page tables for process/kernel separation, virtual machine managers, managed runtimes, etc.) have used architecture and metadata to provide data protection. For example, in previous solutions, a processor would use lookup tables to encode policy or data about the data for ownership, memory size, location, type, version, etc. Dynamically storing and loading metadata requires additional storage (memory overhead) and impacts performance, particularly for fine grain metadata (such as function as a service (FaaS) workloads or object bounds information).

Cryptographic computing can resolve many of the aforementioned issues (and more). Cryptographic computing may make redundant the legacy modes of process separation, user space, and kernel with a fundamentally new fine-grain protection model. With cryptographic computing, protections are cryptographic, with processors and accelerators alike utilizing secret keys and ciphers to provide access control and separation at increasingly finer granularities. Further, instead of virtual machine and process separation in current systems, with cryptographic computing, individual functions may become the boundary, allowing address spaces to be shared via pointers that are encrypted, with the encrypted pointers and keys providing controlled access down to individual data objects.

Cryptographic computing embodiments disclosed herein may leverage the concept of a cryptographic addressing layer where the processor decrypts software allocated memory addresses (linear/virtual address space, sometimes referred to as "pointers") based on implicit and explicit metadata (e.g., context information, a cryptographic context identifier, etc.) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key (e.g., secret key 1616(1)). A tweak comprises one or more bits that represent a value. In one or more embodiments, a tweak may compose all or part of an initialization vector (IV) for a block cipher. When decryption of an address is performed, if the information used to create the tweak (e.g., implicit and explicit metadata, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor. These cryptographic addresses (or address slices) may be further used by the processor as a tweak to the data encryption cipher used to encrypt/decrypt data they refer to (data referenced by the cryptographically encoded pointer), creating a cryptographic binding between the cryptographic addressing layer and data/code encryption. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

By cryptographically encoding metadata into addresses and their referenced data, cryptographic computing may reduce or remove the need for extra separate memory/storage to provide policy and context information/metadata. This can save up to billions of dollars in the computing industry (e.g., in dynamic random access memory (DRAM) expenses) due to the reduction of metadata alone. Customers can reap these savings in memory costs while still getting the security, safety and error-free functionality they want with cryptographic computing. By allowing safe speculation, the fundamentally cryptographic separation policies of cryptographic computing may allow the processor to speculate freely and provide increased performance.

In cryptographic computing, where data security is fundamentally linked to cryptographic memory addressing, processing and fine grain cryptographic access controls to data are important. Cryptographic computing transforms all compute vectors from the CPU to GPU, accelerators to FPGAs, etc. With cryptographic computing, protections may be cryptographic, where processors and accelerators alike utilize secret keys and ciphers to provide access control and separation at increasingly fine granularities. Further, instead of virtual machine and process separation, individual functions may become the boundary, address spaces are shared while pointers are encrypted, with keys providing controlled access down to individual data objects. Capabilities may thus become entwined in the cryptographic operations to provide granular access control to data objects while preventing buffer overflows, type confusion and temporal (e.g., use-after-free) vulnerabilities at every level of the system. Cryptographic code may execute natively, safely, and without the need for interpreters or managed runtimes to provide memory and type safety. Memory may move from isolated domains and containers to globally shared memory models where data is accessible based on cryptographic access control mechanisms and gone are difficult-to-scale distributed permissions, paging and associated control structures. Even files may be safely stored directly in memory (e.g., in non-volatile memory modules, such as non-volatile dual-inline memory modules (NVDIMMs)), being individually encrypted, cryptographically sized, and incorruptible from software errors. This may have implications for functional safety, reliability, and multi-tenancy, potentially allowing for more speculation for improving processing performance.

Cryptography continues to become faster and lighter. For instance, the Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, PRINCE or any other block cipher).

Lightweight ciphers suitable for pointer encryption have emerged recently. The PRINCE cipher, for example, can be implemented in 3 clocks requiring as little as 799 $\mu m^2$ of area in the 10 nm process, providing half the latency of AES in a tenth the Silicon area. Cryptographic computing may utilize these new ciphers, as well as others, introducing novel computer architecture concepts including, but not limited to: (i) cryptographic addressing, i.e., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the reference data, or any suitable combination thereof as tweaks for the data encryption. A variety of encryption modes that are tweakable can be used for this purpose of including metadata (e.g., counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation) with an input block to produce the encrypted or decrypted block. In some block ciphers, the keystream is fed into the next block cipher to perform encryption or decryption.

The "Metadata Wall" may refer to the problem of additionally fetching metadata about memory operations such as access control, object type/size, and version. Today's computer architecture requires the processor to lookup metadata, or data about data, to determine if memory accesses are allowed. The additional memory accesses for metadata can impact performance, additional storage for the metadata is required, and the metadata itself needs to be protected in order to provide security. Some current solutions that add metadata in the form of bounds tables that the hardware would use to detect buffer overflows have been shown to have up to 4× performance impact with 400% memory overheads for some workloads. Similarly, shadow stack metadata enables Control-flow Enforcement Technology, and memory tagging uses metadata for versioning and capabilities add metadata for verifying data types. Memory tagging is not suitable for mitigating type confusion and protecting against uninitialized use variables. In addition, although the overhead of memory tagging may be reduced using error-correcting code bits, it can nevertheless require additional devices, which can increase costs. Capability machines may also use fat pointers to embed security metadata in-line with pointers, imposing substantial memory overheads (e.g., 25% in pointer heavy applications) due to doubling the pointer size.

In contrast, cryptographic computing may provide metadata codified as tweaks to cryptographic addressing and data, cryptographic addressing and code, or a combination thereof, removing potential performance and memory overheads caused by the inclusion of such metadata. The resulting ciphertext may need no additional protections beyond the secret key, allowing reuse of the same memory as the data. As further discussed herein, cryptographic computing may solve a myriad of vulnerabilities with the same unified mechanism, using computation instead of memory.

Figure 16:
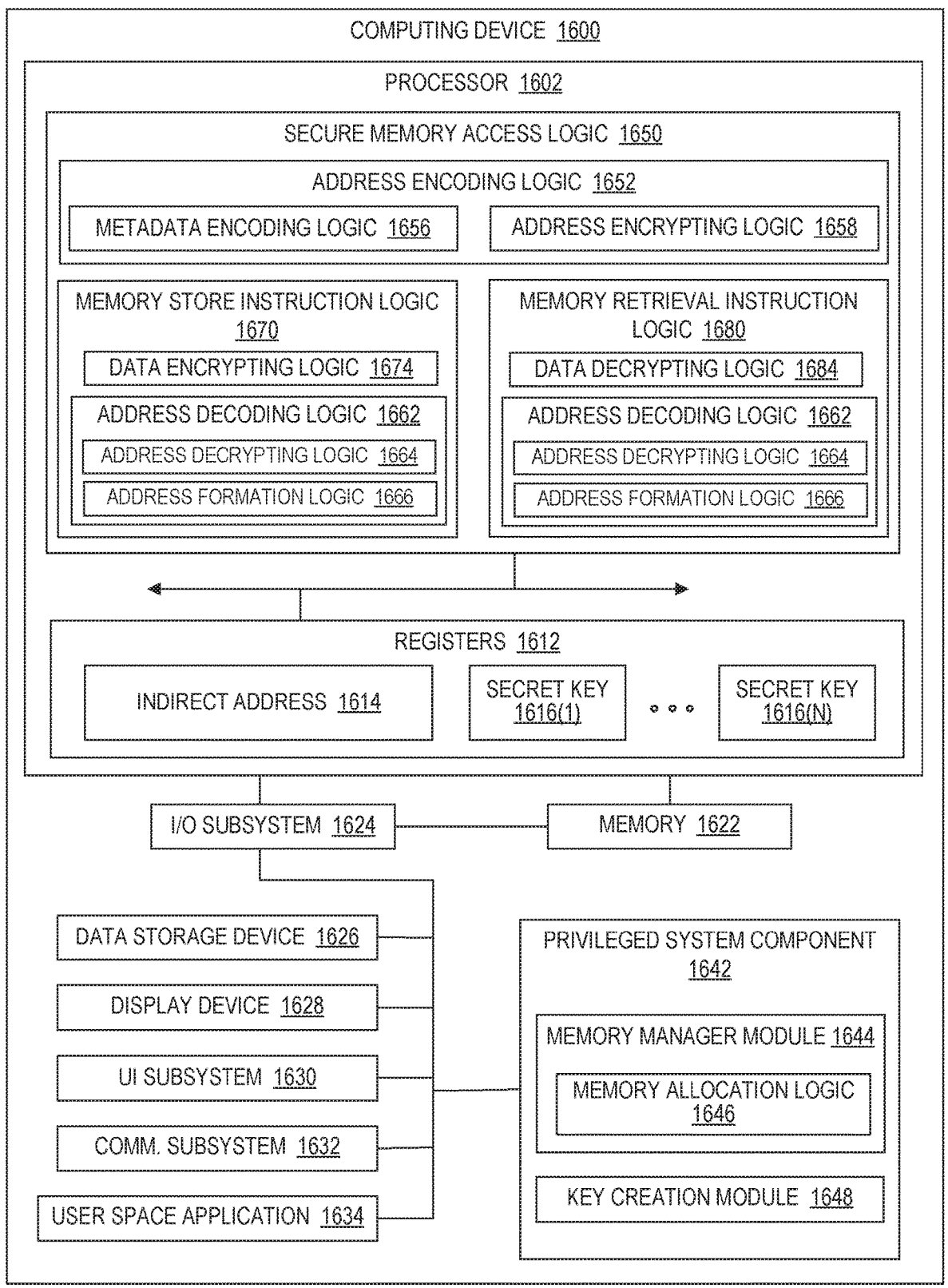
FIG. 16 is a simplified block diagram of an example computing device configured with secure memory access logic according to at least one embodiment of the present disclosure.

FIG. 16 is a simplified block diagram of an example computing device 1600 configured with secure memory access logic according to at least one embodiment of the present disclosure. In the example shown, the computing device 1600 includes a processor 1602 having a set of secure memory access logic 1650 and a number of registers 1612. The secure memory access logic 1650 utilizes metadata about an indirect address 1614, which is encoded into unused bits of the indirect address 1614 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the indirect address 1614. For example, the metadata encoding and decoding provided by the secure memory access logic 1650 can prevent the indirect address 1614 from being manipulated to cause a buffer overflow, and/or can prevent program code from accessing memory that it does not have permission to access. Address encoding logic 1652 of the secure memory access logic 1650 is invoked when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the indirect address 1614, which points to the allocated memory, is encoded with the address metadata.

The address metadata can include valid range metadata. The valid range metadata allows executing programs to manipulate the value of the indirect address 1614 within a valid range, but will corrupt the indirect address 1614 if the memory is accessed using the indirect address 1614 beyond the valid range. Alternatively or in addition, the valid range metadata can be used to identify a valid code range, e.g., a range of memory that program code is permitted to access (e.g., the encoded range information can be used to set explicit ranges on registers). Other information that can be encoded in the address metadata includes access (or permission) restrictions on the indirect address 1614 (e.g., whether the indirect address 1614 can be used to write, execute, or read the referenced memory).

In at least some other embodiments that will be further described herein, other metadata (or context information) can be encoded in the unused bits of indirect address 1614 such as a size of plaintext address slices (e.g., number of bits in a plaintext slice of a memory address embedded in the indirect address), a memory allocation size (e.g., bytes of allocated memory referenced by the indirect address), a type of the data or code (e.g., class of data or code defined by programming language), and/or permissions (e.g., read, write, and execute permissions of the indirect address), a location of the data or code (e.g., where the data or code is stored), the memory location where the pointer itself is to be stored, an ownership of the data or code, a version of the indirect address (e.g., a sequential number that is incremented each time an indirect address is created for newly allocated memory, determines current ownership of the referenced allocated memory in time), a tag of randomized bits (e.g., generated for association with the indirect address), a privilege level (e.g., user or supervisor), a cryptographic context identifier (or crypto context ID) (e.g., randomized or deterministically unique value for each indirect address), etc.

For example, in one embodiment, the address metadata can include size metadata that encodes the size of a plaintext address slice in the indirect address. The size metadata may specify a number of lowest order bits in the indirect address that can be modified by the executing program. The size metadata is dependent on the amount of memory requested by a program. Accordingly, if 16 bytes are requested, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the indirect address to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating the tag value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

Address decoding logic 1662 verifies the encoded metadata on memory read and write operations that utilize processor instructions such as MOV, where a general purpose register is used as a memory address to read a value from memory (e.g., load) or to write a value to memory (e.g., store), as well as on other operations that involve the "use" of memory (such as arithmetic instructions with memory operands, e.g., ADD, and control transfer instructions, e.g., CALL/JMP etc.). These are considered memory operands, which may specify a location in memory at which the destination address for the control transfer is stored. The example secure memory access logic 1650 is embodied as part of processor instructions (e.g., as part of the processor instruction set architecture), or microcode (e.g., instructions that are stored in read-only memory and executed directly by the processor 1602). In other embodiments, portions of the secure memory access logic 1650 may be embodied as hardware, firmware, software, or a combination thereof (e.g., as programming code executed by a privileged system component 1642 of the computing device 1600). For example, the secure memory access logic 1650 may be embodied in software as an instruction set emulator (e.g., a binary instrumentation tool such as a PIN Tool) that emulates the instruction logic utilizing the encoded addresses as disclosed herein.

The secure memory access logic 1650 is executable by the computing device 1600 to provide security for indirect addresses "inline," e.g., during execution of a program (such as a user space software application) by the computing device 1600. As used herein, the terms "indirect address" and "pointer" may each refer to, among other things, an address (e.g., virtual address or linear address) of a memory location at which other data or instructions are stored. In an example, a register that stores an encoded memory address of a memory location where data or code is stored may act as a pointer. As such, the indirect address 1614 may be embodied as, for example, a data pointer (which refers to a location of data), a code pointer (which refers to a location of executable code), an instruction pointer, or a stack pointer. Indirect addresses may be referred to by other terminology, such as "pointer," "address pointer," or "pointer address." As used herein, "metadata" may refer to, among other things, information about or relating to an indirect address 1614, such as a valid data range, a valid code range, pointer access permissions, a size of plaintext address slice (e.g., encoded as a power in bits), a memory allocation size, a type of the data or code, a location of the data or code, an ownership of the data or code, a version of the indirect address, a tag of randomized bits, version, a privilege level of software, a cryptographic context identifier, etc.

As used herein, "memory retrieval instruction" may refer to, among other things, a "MOV" or "LOAD" instruction or any other instruction that causes data to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware), or any instruction that accesses or manipulates memory. Also as used herein, "memory store instruction" may refer to, among other things, a "MOV" or "STORE" instruction or any other instruction that causes data to be read, copied, or otherwise accessed at one storage location, e.g., register, and moved into another storage location, e.g., memory, or any instruction that accesses or manipulates memory.

However, the indirect address encoding/decoding technology disclosed herein is not limited to MOV or load/store instructions. For example, control transfer instructions such as call and jump instructions can be adapted to handle encoded indirect addresses in a similar manner as described herein with respect to MOV instructions, wherein code is to execute within a valid address range. Likewise, the instruction pointer (e.g., register) may be range bound given the encoded address specified by the control transfer instruction (e.g., JMP/CALL) results in an encoded address being used for the instruction pointer, thus restricting valid program execution to within a valid address range (effectively, the program counter can increment correctly until it reaches the end of the encoded range). Furthermore, in some architectures, any number of processor instructions may have a memory operand in the form of an indirect address (e.g., arithmetic operations such as ADD, SUB, MUL, AND, OR, XOR, etc. may have a source/destination memory reference in the form of an indirect address and/or a source/destination register operand). In other architectures, however, the format of memory operands may vary. For example, registers may be combined in some way (e.g., by addition) to produce an effective address. Additionally, other parameters may optionally be included, such as a scaling factor that multiplies one of the register values (e.g., the index) and/or a constant displacement value embedded in the instruction that is directly added. Further, it should be noted that while the illustrative embodiments refer to "instructions," such instructions may be embodied as, e.g., processor instructions, operating system routines, or other forms of computer program code.

The example secure memory access logic 1650 includes address encoding logic 1652 (which includes metadata encoding logic 1656 and address encrypting logic 1658), memory store instruction logic 1670 (which includes data encrypting logic 1674 and address decoding logic 1662), and memory retrieval instruction logic 1680 (which includes data decrypting logic 1684 and address decoding logic 1662). Illustratively, the address decoding logic 1662, which includes address decrypting logic 1664 and address formation logic 1666, is embodied in memory store instruction logic 1670 and memory retrieval instruction logic 1680, but may be embodied in other processor instructions, or as a separate instruction or series of instructions, or as higher-level code executed by a privileged system component such as an operating system kernel or virtual machine monitor, or as an instruction set emulator. As described in more detail below, the address encoding logic 1652 and the address decoding logic 1662 each operate on an indirect address 1614 using metadata (e.g., one or more of valid range, permission metadata, size (power), memory allocation size, type, location, ownership, version, tag value, privilege level (e.g., user or supervisor), crypto context ID, etc.) and a secret key (e.g., secret key 1616(1)), in order to secure the indirect address 1614 at the memory allocation/access level. Also as described in more detail below, the data encrypting logic 1674 and data decrypting logic 1684 each operate on data (referenced by indirect address 1614) using at least a portion of the indirect address and a secret key (e.g., secret key 1616(2)), in order to secure the data at the memory location referenced by the indirect address 1614 by binding the data encryption to the indirect address.

The example indirect address 1614 is embodied as a register 1612 (e.g., a general purpose register of the processor 1602). The example secret keys 1616(1)-1616(N) may be generated by a key creation module 1648 of a privileged system component 1642, and stored in one of the registers 1612 (e.g., a special purpose register or machine specific register (MSR)), or another memory location that is readable by the processor 1602. In some embodiments, the secret keys 1616(1)-1616(N) may be stored in a location that is readable only by the processor. In other embodiments, the secret keys 1616(1)-1616(N) used to secure indirect addresses, data, and code can be stored in another memory location, such as in firmware, in a secure portion of the data storage device 1626 or another data storage device, or another form of memory suitable for performing the functions described herein. In some embodiments, the secret keys 1616(1)-1616(N) may be transmitted across a secure communications channel and restored by an executive (such as an operating system or a virtual machine monitor, e.g., the privileged system component 1642 described below). In virtualized environments in which virtual machines are migrated from one machine to another, and/or in cases in which a virtual machine, process or program running on the computing device 1600 begins a sleeping/hibernating mode after an indirect address and the referenced data and/or code are secured using secret keys, and then later resumes, the secret keys will need to be recovered and restored. In these cases, the secret keys can be stored or possibly transmitted across a (secure) communications channel prior to a sleeping/hibernating mode, and then retrieved/restored by an executive (such as an operating system or a virtual machine monitor, e.g., the privileged system component 1642).

It should be noted that embodiments described herein allow for any number of secret keys to be used for a particular program. In one example, the same secret key may be used for all indirect addresses used in a program. In another example, a different secret key may be used for each indirect address associated with a different memory allocation or for each predefined group of memory addresses associated with different memory allocations. In yet further embodiments, the same secret key used for an address encryption/decryption may also be used for encrypting the data bound to that address. In other embodiments, one secret key may be used for address encryption/decryption, while a different secret key may be used for data encryption/decryption bound to that address. For ease of explanation, embodiments further described herein refer to "secret address key" or "address key" to refer to the use of a secret key in encryption and decryption operations of memory addresses and "secret data key" or "data key" to refer to the use of a secret key in operations to encrypt and decrypt data.

On (or during) a memory allocation operation (e.g., a "malloc"), memory allocation logic 1646 allocates a range of memory for a buffer and returns the indirect address 1614 and the metadata (e.g., one or more of range, permission metadata, size (power), memory allocation size, type, location, ownership, version, tag, privilege level, crypto context ID, etc.). For example, the memory allocation logic 1646 may encode plaintext range information in the indirect address 1614 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation logic 1646 is embodied in a memory manager module 1644 of the privileged system component 1642. The memory allocation logic 1646 initiates the address encoding logic 1652. The address encoding logic 1652 includes metadata encoding logic 1656, which encodes the indirect address 1614 with the metadata (e.g., range, permission metadata, size (power), memory allocation size, type, location, ownership, version, tag value, privilege level, crypto context ID, some suitable combination thereof, etc.) and potentially an "adjustment," for example if range metadata is encoded, as described below. The address encoding logic 1652 stores the metadata in an unused portion of the indirect address 1614 (e.g., non-canonical bits of a 64-bit address). For some metadata or combinations of metadata, the indirect address 1614 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the indirect address 1614. Address adjustment logic adjusts the valid range metadata as needed so that the upper address bits (e.g., most significant bits) of the addresses in the address range do not change as long as the indirect address 1614 refers to a memory location that is within the valid range indicated by the range metadata. This enables the indirect address 1614 to be manipulated (e.g., by software performing arithmetic operations, etc.) but only so long as the manipulations do not cause the indirect address 1614 to go outside the valid range (e.g., overflow the buffer).

In an embodiment, address encoding logic 1652 uses the valid range metadata to select a portion (or slice) of the indirect address 1614 to be encrypted. In other embodiments, the slice of the indirect address 1614 to be encrypted may be known a priori (e.g., upper 32 bits, lower 32 bits, etc.). The address encrypting logic 1658 encrypts the selected slice of the indirect address 1614 (and the adjustment, in some embodiments), using the secret address key 1616(1) and an address tweak, as described further below. On a memory access operation (e.g., a read, write, or execute operation), the address decoding logic 1662 decodes the previously-encoded indirect address 1614. To do this, the address decrypting logic 1664 decrypts the encrypted slice of the indirect address 1614 (and in some embodiments, the encrypted adjustment) using the secret key 1616(1) and the address tweak, as described further below.

The indirect address 1614 is returned to its original (e.g., canonical) form, based on appropriate operations (e.g., address formation logic 1666) in order to restore the original value of the indirect address 1614 (e.g., the true, original linear memory address). To do this in at least one possible embodiment, the address formation logic 1666 may remove the address metadata encoded in the unused bits of the indirect address 1614, e.g., return the unused bits to their original form). If the indirect address 1614 decodes successfully, the memory access operation completes successfully. However, if the encoded indirect address 1614 has been manipulated (e.g., by software, inadvertently or by an attacker) so that its value falls outside the valid range indicated by the range metadata (e.g., overflows the buffer), the indirect address 1614 will be corrupted as a result of the decrypting process performed by the address decrypting logic 1664. A corrupted indirect address will raise a fault (e.g., a general protection fault or a Page Fault if the address is not mapped as present from the paging structures/page tables). One condition that may lead to a fault being generated is a sparse address space. In this scenario, a corrupted address is likely to land on an unmapped page and generate a page fault. In this way, the secure memory access logic 1650 enables the computing device 1600 to provide indirect address security against buffer overflow attacks and similar exploits. Embodiments of the indirect address security technologies disclosed herein can also be used for software debugging purposes or as an access control mechanism to prevent software from accessing areas of memory for which the software does not have permission. Additionally, in comparison to other buffer overflow mitigation techniques, embodiments of the disclosed indirect address security technologies can operate without any additional memory reads/writes, or without any additional instructions, or without any binary modifications, or without the need to recompile legacy code. Moreover, embodiments of the disclosed technologies are responsive to adversaries that can read memory and overwrite pointer values, as well as adversaries that can create/select arbitrary pointer values. Further, embodiments of the disclosed technologies can scale from very small memory ranges to very large memory ranges, or can cascade memory ranges within other memory ranges by using different encoded pointers. Still further, embodiments of the disclosed technologies are effective with dynamic memory allocation (e.g., due to the ability to programmatically create range encoded pointers inline). Additionally, embodiments of the disclosed technologies can be extended to provide code block (code location) access controls to data. Further, embodiments of the disclosed technologies are compatible with 64-bit versions of the x86 instruction set, as well as ARM, MIPS, PowerPC and other processor architectures, including wider (e.g., greater than 64-bit) address bit architectures and smaller (e.g., 32-bit) architectures by reserving address ranges for the metadata containing addresses.

Some embodiments of the disclosed technologies utilize aspects of address adjustment logic and address restoration logic to support legacy code compatibility, as described below. As used herein, "legacy code" may refer to a version of computer code that was designed to work on an earlier, or now-obsolete, or no-longer-supported computer architecture. For example, legacy code may include software that was originally developed for a 32-bit processor, but which is now running on a 64-bit processor. "Legacy code" also refers to a version of computer code designed without using or being adapted to use dedicated instructions for encoding and encrypting indirect addresses as described herein. At least some embodiments disclosed herein can be implemented without using new program instructions and accordingly, without the need for recompiling legacy code.

Referring now in more detail to FIG. 16, the computing device 1600 may be embodied as any type of electronic device for performing the functions described herein. For example, the computing device 1600 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 16, the example computing device 1600 includes at least one processor 1602 embodied with the secure memory access logic 1650.

The computing device 1600 also includes memory 1622, an input/output subsystem 1624, a data storage device 1626, a display device 1628, a user interface (UI) subsystem 1630, a communication subsystem 1632, at least one user space application 1634, and the privileged system component 1642 (which, illustratively, includes the memory manager module 1644 and the key creation module 1648). The computing device 1600 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 1600 may be embodied as software, firmware, hardware, or a combination of software and hardware.

The processor 1602 may be embodied as any type of processor capable of performing the functions described herein. For example, the processor 1602 may be embodied as a multi-core processor, other multiple-CPU processor or processing/controlling circuit, or multiple diverse processing units or circuits (e.g., CPU and GPU, etc.). The processor 1602 has a number of registers 1612, which include general purpose registers and special purpose registers. The indirect address 1614 and the secret keys 1616(1)-1616(N) are stored in registers 1612. The memory 1622 of the computing device 1600 may be embodied as any type of volatile or non-volatile memory or data storage capable of performing the functions described herein. In operation, the memory 1622 may store various data and software used during operation of the computing device 1600, as well as operating systems, applications, programs, libraries, and drivers.

The memory 1622 is communicatively coupled to the processor 1602, e.g., via the I/O subsystem 1624. The I/O subsystem 1624 may be embodied as circuitry and/or components to facilitate input/output operations with the processor 1602, the memory 1622, and other components of the computing device 1600. For example, the I/O subsystem 1624 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1624 may form a portion of a system-on-a-chip (SoC) and be incorporated, along with the processor 1602, the memory 1622, and/or other components of the computing device 1600, on a single integrated circuit chip.

The data storage device 1626 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices.

The display device 1628 may be embodied as any type of display capable of displaying digital information such as a liquid crystal display (LCD), a light emitting diode (LED), a plasma display, a cathode ray tube (CRT), or other type of display device. In some embodiments, the display device 1628 may be coupled to a touch screen or other human computer interface device to allow user interaction with the computing device 1600. The display device 1628 may be part of the user interface (UI) subsystem 1630. The user interface subsystem 1630 may include a number of additional devices to facilitate user interaction with the computing device 1600, including physical or virtual control buttons or keys, a microphone, a speaker, a unidirectional or bidirectional still and/or video camera, and/or others. The user interface subsystem 1630 may also include devices, such as motion sensors, proximity sensors, and eye tracking devices, which may be configured to detect, capture, and process various other forms of human interactions involving the computing device 1600.

The computing device 1600 further includes a communication subsystem 1632, which may be embodied as any communication circuit, device, or collection thereof, capable of enabling communications between the computing device 1600 and other electronic devices. The communication subsystem 1632 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 1632 may be embodied as a network adapter, including a wireless network adapter.

The example computing device 1600 also includes a number of computer program components, such as the user space application 1634 and the privileged system component 1642. The user space application 1634 may be embodied as any computer application (e.g., software, firmware, hardware, or a combination thereof) that interacts directly or indirectly with an end user via, for example, the display device 1628 or the UI subsystem 1630. Some examples of user space applications 1634 include word processing programs, document viewers/readers, web browsers, electronic mail programs, messaging services, computer games, camera and video applications, etc. Among other things, the privileged system component 1642 facilitates the communication between the user space applications 1634 and the hardware components of the computing device 1600. Portions of the privileged system component 1642 may be embodied as any operating system capable of performing the functions described herein, such as a version of WINDOWS by Microsoft Corporation, ANDROID by Google, Inc., and/or others. Alternatively or in addition, a portion of the privileged system component 1642 may be embodied as any type of virtual machine monitor capable of performing the functions described herein (e.g., a type I or type II hypervisor).

The example privileged system component 1642 includes a number of computer program components, such as the memory manager module 1644 and the key creation module 1648. Each of the components of the privileged system component 1642 may be embodied as software, firmware, hardware, or a combination of software and hardware. For example, the components of the privileged system component 1642 may be embodied as modules of an operating system kernel, a virtual machine monitor, or a hypervisor. The memory manager module 1644 allocates portions of memory 1622 to the various processes running on the computing device 1600 (e.g., as ranges of virtual memory addresses). The memory manager module 1644 is embodied as, for example, a loader, a memory manager service, or a heap management service. The key creation module 1648 creates the secret keys 1616(1)-1616(N) (e.g., secret address keys and secret data keys) and writes them to a register or registers to which the processor 1602 has read access (e.g., a special purpose register). To create a secret key, the key creation module 1648 may execute, for example, a random number generator or another algorithm capable of generating a secret key that can perform the functions described herein.

It should be noted that a myriad of approaches could be used to generate or obtain a key for embodiments disclosed herein. For example, although the key creation module 1648 is shown as being part of computing device 1600, one or more secret keys could be obtained from any suitable external source using any suitable authentication processes to securely communicate the key to computing device 1600, which may include generating the key as part of those processes. Furthermore, privileged system component 1642 may be part of a trusted execution environment (TEE), virtual machine, processor 1602, a co-processor (not shown), or any other suitable hardware, firmware, or software in computing device 1600 or securely connected to computing device 1600. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 17:
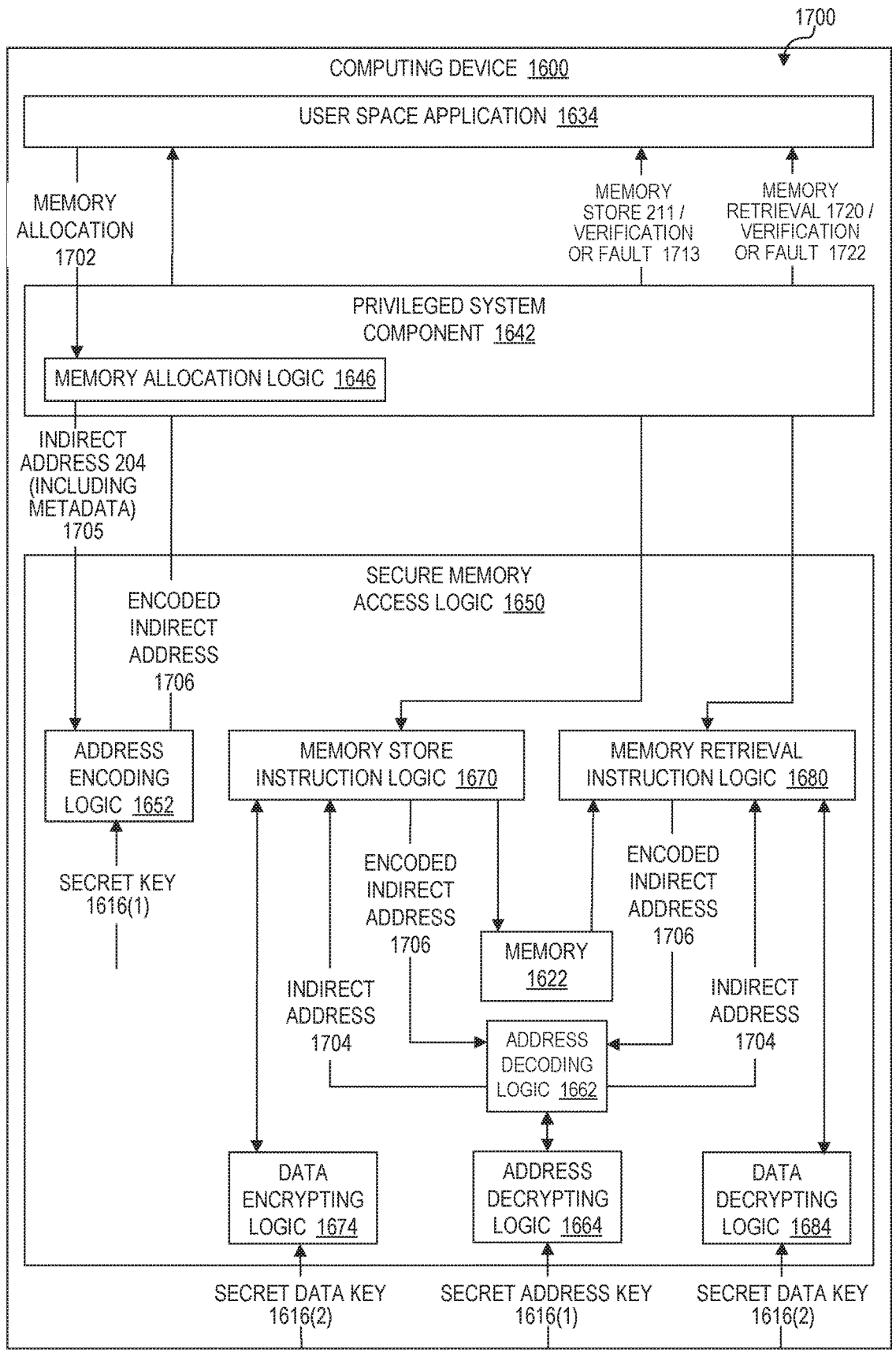
FIG. 17 is a simplified environment diagram illustrating an application of the secure memory access logic of FIG. 16 according to at least one embodiment of the present disclosure.

FIG. 17 is a simplified environment diagram illustrating an application of the secure memory access logic of FIG. 16 according to at least one embodiment of the present disclosure. In some embodiments, the computing device 1600 may establish an environment 1700 during operation (e.g., native and/or virtual runtime or "execution" environments). The various modules depicted in the example environment 1700 may be embodied as hardware, firmware, software, or a combination thereof. In the environment 1700, the user space application 1634 (or the privileged system component 1642, e.g., in loading a user space application 1634) may, from time to time, during the operation of the computing device 1600, issue a memory allocation 1702. The memory allocation 1702 may be translated (e.g., compiled or interpreted), as needed, by the memory allocation logic 1646 of the privileged system component 1642 before being passed on to the processor 1602. In the processor 1602, the address encoding logic 1652 is executed in response to the memory allocation 1702 (e.g., in place of a conventional "malloc" instruction/function call). Whereas a conventional malloc instruction simply allocates memory and returns an (unsecured) pointer, the address encoding logic 1652 encodes an indirect address 1704, including metadata 1705 (e.g., the range permission information, size (power), memory allocation size, type, location, ownership, version, tag, privilege level, crypto context ID or key, or any combination thereof, etc.), as described herein, and returns an encoded indirect address 1706. The metadata may be embedded in the indirect address or pointer (e.g., a standard 64-bit register or enlarged register such as 128 bits or 256 bits to fit more metadata) in a plaintext format, embedded within another operand that is provided to the pointer encryption/decryption instructions and data access instructions, stored in a control register, stored in a table in memory, or provided via any combination thereof. For example, the size (power) metadata and tag value may be embedded in the pointer and the crypto context ID may be stored in a control register.

Similarly, the user space application 1634 or the privileged system component 1642 may issue a memory store 1711 from time to time, which may be handled by the processor 1602 as a processor instruction that reads from a register 1612 (or other storage unit) and writes to memory 1622 or cache using indirect address 1614 (e.g., a STORE, MOV instruction). Using the STORE instruction as an example, the memory store instruction logic 1670 stores data only after successfully executing address decoding logic 1662 to decode the encoded indirect address 1706 and also successfully executing data encrypting logic 1674 based on a data tweak and secret data key 1616(2) to encrypt the data to be stored at a memory location pointed to by the indirect address 1704. Successful execution of address decoding logic 1662 is based on successful execution of address decrypting logic 1664, which uses an address tweak and secret address key 1616(1) to decrypt the encrypted address slice of the encoded indirect address 1706.

Similarly, the user space application 1634 or the privileged system component 1642 may issue a memory load 1720 from time to time, which may be handled by the processor 1602 as a processor instruction that reads from memory 1622 and writes to a register 1612 using an indirect address 1614 (e.g., a LOAD, MOV instruction). Using the LOAD instruction as an example, the memory retrieval instruction logic 1680 performs the memory access only after successfully executing the address decoding logic 1662 to decode the encoded indirect address 1706. Successful execution of address decoding logic 1662 is based on successful execution of address decrypting logic 1664, which uses an address tweak and secret address key 1616(1) to decrypt the encrypted address slice of the encoded indirect address 1706. Once the indirect address 1704 is returned and memory 1622 is accessed to load data from the memory location pointed to by the indirect address 1704, the loaded data may be decrypted by executing the data decrypting logic 1684 based on a data tweak and secret data key 1616(2). Successful execution of data decrypting logic 1684 depends on whether the portions of the indirect address used to create a data tweak to decrypt the data, and the additional metadata (if any) used to create the data tweak, correspond to the original allocation of the memory location pointed to by the indirect address.

While the address decoding logic 1662 is shown as a separate module from memory store instruction logic 1670 and memory retrieval instruction logic 1680 in FIG. 17, it should be understood that the address decoding logic 1662 can be incorporated into the instruction logic 1670 and/or 1680 or can be embodied as a separate set of instructions. Further, it should be understood that the address decoding logic 1662 can be incorporated into or referenced by other types of instructions, alternatively or in addition to the LOAD, STORE, and MOV instructions (e.g., arithmetic instructions with memory operands, call, JMP, etc.). For example, control transfer instructions such as call and JMP can load the encoded pointer address for the code to execute into the processor's program counter register (e.g., instruction pointer) (e.g., the RIP, where RIP is the instruction pointer register in 64-bit code). The instruction pointer register can then be queried by a program and as a result, the current program counter address will be the encoded form (offset to the current program counter location).

If the address decoding logic 1662 successfully decodes the encoded indirect address 1706, which includes the address decrypting logic 1664 successfully decrypting the encrypted address slice in the encoded indirect address, the original indirect address 1704 is returned to the privileged system component 1642 and the memory access is completed, or program execution begins at the new program counter location (in the case of control flow changes). If the encoded indirect address 1706 does not successfully decode, a fault is raised. Based on the successful completion or failure of memory store 1711, an appropriate verification or fault signal 1713 is returned to the user space application 1634. Similarly, based on the successful completion or failure of memory load 1720, an appropriate verification or fault signal 1722 is returned to the user space application 1634.

Figure 18A:
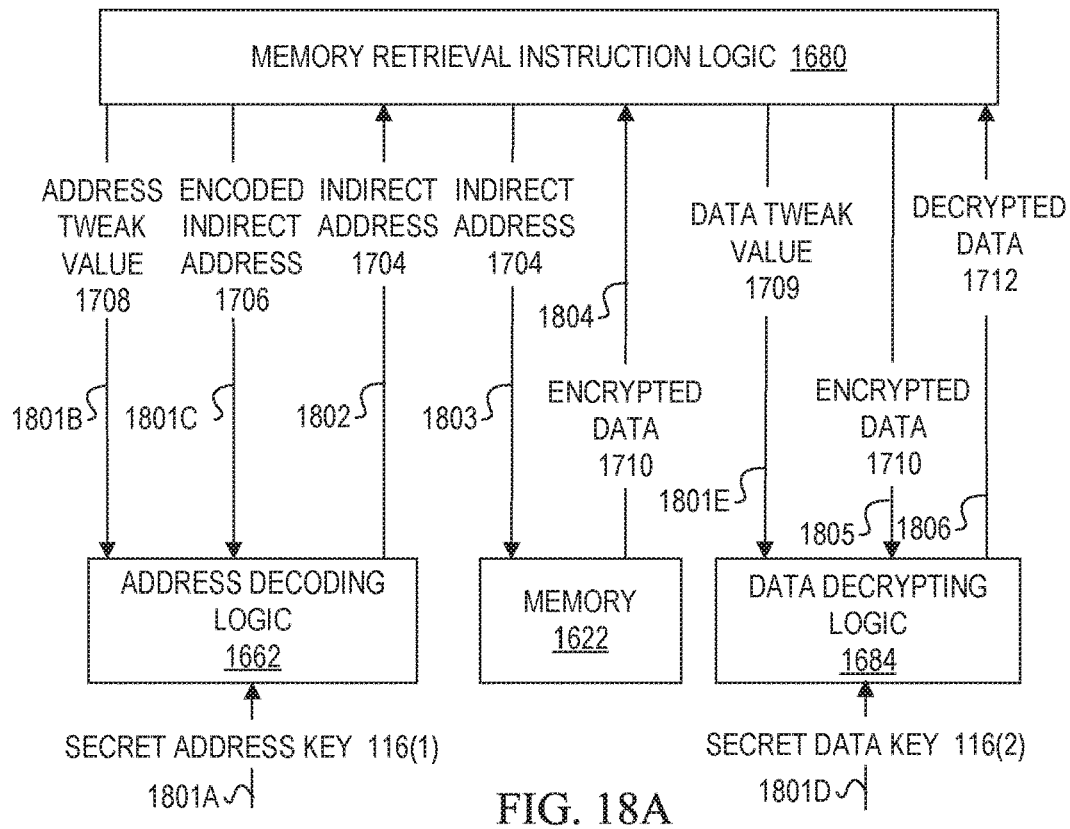
FIG. 18A is a simplified sequence diagram illustrating an application of memory retrieval instruction logic according to at least one embodiment.

FIG. 18A is a simplified sequence diagram illustrating a sequence of operations associated with the memory retrieval instruction logic 1680 shown in FIG. 17. A memory load is initiated by memory retrieval instruction logic 1680 based on the encoded indirect address 1706. Address decoding logic 1662 obtains the secret address key 1616(1) at 1801A and an address tweak 1708 at 1801B. The secret address key 1616(1) and the address tweak 1708 are used by the address decoding logic 1662 to decode the encoded indirect address 1706 at 1801C. If the encoded indirect address 1706 includes an encrypted address slice of the memory address, then address decoding logic 1662 can decrypt the encrypted address slice in the encoded indirect address 1706. If the encoded indirect address 1706 is successfully decoded by address decoding logic 1662, then the decoded indirect address 1704 is output at 1802.

Data decrypting logic 1684 obtains the secret data key 1616(2) at 1801D and a data tweak 1709 at 1801E, which are used by the data decrypting logic 1684 to decrypt encrypted data 1710 at 1805. Data tweak 1709 is derived from encoded indirect address 1704 in various possible embodiments as will be further described herein. It should be noted that, in at least some embodiments, data decrypting logic 1684 may begin its decryption algorithm prior to receiving encrypted data 1710 at 1805, and in parallel with address decoding logic 1662. In this embodiment, a counter mode block cipher, for example, may perform an encryption operation based on the data tweak 1709 and the secret data key 1616(2) to generate a keystream, which can be used once the encrypted data 1710 is received.

At 1803, memory retrieval instruction logic 1680 accesses memory 1622 based on the indirect address 1704 that was output at 1802 by address decoding logic 1662. At 1804, the encrypted data 1710 is retrieved (e.g., load, read, move, etc.) from memory 1622. At 1805, the encrypted data 1710 is provided to data decrypting logic 1684, which can use the already-generated keystream to decrypt the encrypted data 1710 (e.g., by performing an exclusive OR (XOR) function). If the encrypted data 1710 is successfully decrypted by data decrypting logic 1684, then decrypted data 1712 is output at 1806.

Figure 18B:
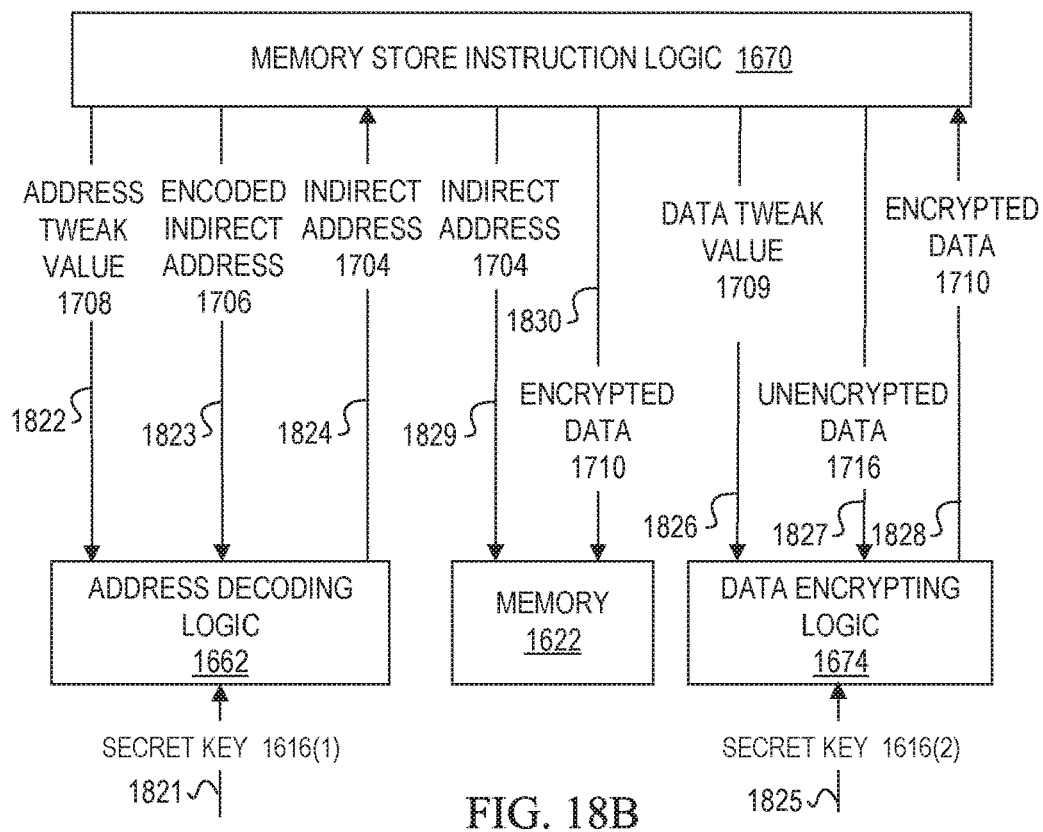
FIG. 18B is a simplified sequence diagram illustrating an application of a memory store instruction logic according to at least one embodiment.

FIG. 18B is a simplified sequence diagram illustrating a sequence of operations associated with the memory store instruction logic 1670 shown in FIG. 17. A memory store is initiated by memory store instruction logic 1670 based on the encoded indirect address 1706. Address decoding logic 1662 obtains the secret address key 1616(1) at 1821 and the address tweak 1708 at 1822. The secret address key 1616(1) and the address tweak 1708 are used by the address decoding logic 1662 to decode the encoded indirect address 1706 at 1823. If the encoded indirect address 1706 includes an encrypted address slice of the memory address, then address decoding logic 1662 can decrypt the encrypted address slice in the encoded indirect address 1706. If the encoded indirect address 1706 is successfully decoded by address decoding logic 1662, then the decoded indirect address 1704 is output at 1824.

Data encrypting logic 1674 obtains the secret data key 1616(2) at 1825 and the data tweak 1709 at 1826, which are used by the data encrypting logic 1674 to encrypt unencrypted data 1716 at 1827. Data tweak 1709 is derived from encoded indirect address 1704 in various possible embodiments as will be further described herein. If the unencrypted data 1716 is successfully encrypted by data encrypting logic 1674, then the encrypted data 1710 is output at 1828. At 1829, memory store instruction logic 1670 accesses memory 1622 based on the indirect address 1704, and at 1830, the encrypted data 1710 is stored in the memory 1622. It should be noted that address decoding logic 1662 and data encrypting logic 1674 may be performed in parallel, partially in parallel, in sequence, or in any other order or timing. Some embodiments may use the unencrypted portion of an address (partial address) to lookup a translation lookaside buffer (TLB) to see if a matching portion of the address is present in a TLB entry, proceeding with that TLB address mapping while the encrypted portion of the address decoding/decryption completes. However, encrypted data 1710 is not stored in memory 1622 until both address decoding logic 1662 and data encrypting logic 1674 have been successfully performed.

Figure 19:
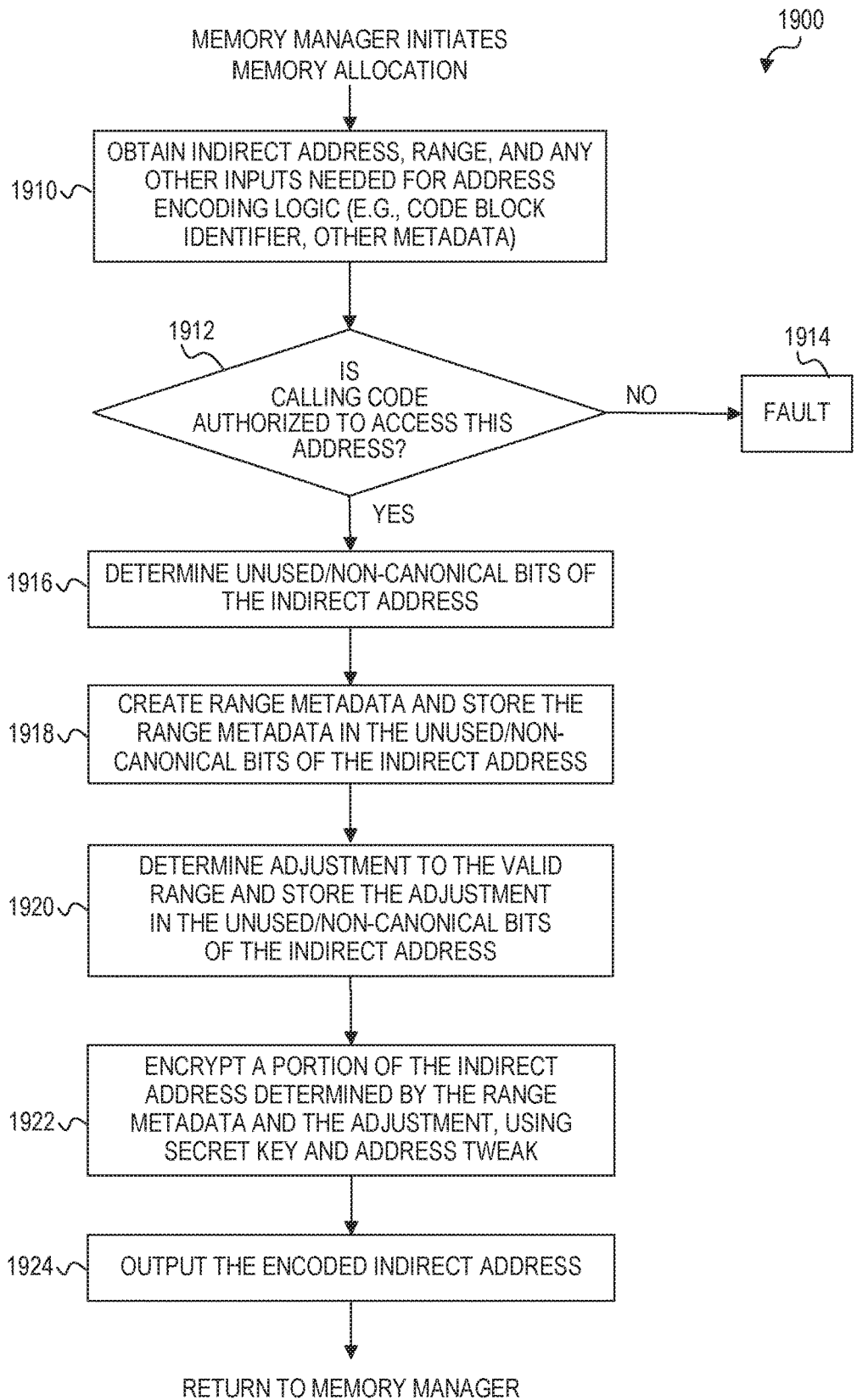
FIG. 19 is a simplified flow diagram of at least one embodiment of a process for providing security for an indirect address as disclosed herein, which may be executed by the computing device of FIG. 16.

Referring now to FIG. 19, an example process 1900 for securing an indirect address is shown. Portions of the process 1900 may be executed by hardware, firmware, and/or software of the computing device 1600 (e.g., by the processor 1602 executing the address encoding logic 1652). The process 1900 begins in response to a memory allocation (e.g., by a memory manager module). In block 1910, the computing device 1600 obtains the indirect address, address range, and other inputs needed to encode the indirect address (e.g., a code block identifier, instruction pointer, and/or metadata for tweaks, as described herein). In block 1912, the computing device 1600 determines whether the calling code (e.g., the code initiating the memory allocation) is authorized to access the indirect address received in block 1910 (e.g., indirect address 1704). To do this, the computing device 1600 may perform an access control check by verifying the instruction pointer or caller privilege level information for the calling code, which may be obtained from, for example, a heap manager of the memory manager module 1644. If the computing device 1600 determines that the calling code is not authorized to access the indirect address, a fault is raised (1914). If the computing device 1600 determines that the calling code is authorized to access the indirect address, the computing device 1600 proceeds to block 1916. In block 1916, the computing device 1600 determines the unused (e.g., non-canonical) address bits of the indirect address to perform the address range encoding or other metadata encoding (e.g., size (power) metadata, tag value, etc.). To do this, the computing device 1600 may simply use the higher (e.g., most significant) unused/non-canonical bits of the indirect address. It should be noted that the encoded addresses do not need to be architecturally non-canonical. Rather, the unused/non-canonical addresses can simply be a range of memory set aside by, for example, the privileged system component 1642, to enable the address encoding as disclosed herein.

In block 1918, the computing device 1600 creates the metadata (e.g., valid range and/or permission data) and stores the metadata in the unused/non-canonical bits of the indirect address selected in block 1916. Illustratively, the metadata indicates an upper limit on the size of the buffer pointed to by the indirect address. To create the metadata, the computing device 1600 converts the indirect address values to a center location in which the most significant canonical address bits do not change for the valid memory range. In some embodiments, the range metadata includes an "exponent" to determine the 2's power of the memory range size (effectively determining the number of mutable and immutable address bits). In some cases, an "adjustment" is used to force values to the end of the 2's power range as described below. In other embodiments, the adjustment may be used to force the buffer to the beginning of the 2's power range when buffer "underflow" needs to be addressed (as opposed to buffer "overflow"). Using the exponent metadata, any 2's power memory range can be defined (e.g., 2, 4, 8, 16 . . . 2^64).

The following is a simple example of range metadata encoding. The addresses 0000b-0011b fit the range 0-3 where the upper two bits do not change. However, if a pointer is modified to go to the index 4, one of the upper bits will change. Accordingly, the valid range metadata can be encoded as [2] (for the upper two bits to encode a range of 4) and the valid range metadata can be stored in the higher non-canonical bits, e.g., "[2] 00xxb." In this example, the exponent would be 2 bits in size (e.g., values [1-4]), to cover the 4 bit addresses used in the example. Table 3 below illustrates a number of additional, simplified examples.

TABLE 3

Address encoding examples

| Real address range | Size | Encoded address | Comment |
|---|---|---|---|
| 1001b-1100b | 4 bytes | [2] {3} 11xx | Adjust +3 to fit all in 11xxb |
| 1001b-1101b | 5 bytes | [3] {1} 1xxx | Adjust +1 to end of range |
| 1110b-1111b | 2 bytes | [1] {0} 111x | Fits in lowest power of 2 |
| 1101b-1110b | 2 bytes | [1] {1} 111x | Adjust +1 to fit all in 111xb |
| 0000b-1111b | 16 bytes | [4] {0} xxxx | Full range |
| 1010b-1010b | 1 byte | [0] {0} 1010 | Exact match |
| 1011b-1101b | 3 bytes | [2] {2} 11xx | Adjust +2 to end of range |

In Table 3, the encoded address is represented using a format that is similar to a floating point format. In the encoded addresses in the third column of Table 3, the number in brackets, e.g., [2], is the exponent or valid range metadata; the number in braces, e.g., {3}, is the adjustment value, and the address to the right of the adjustment value indicates the unused/non-canonical bits in which the valid range metadata and adjustment value are stored. In block 1920, the computing device 1600 determines the adjustment (or "offset") to be applied to the valid range, and stores the adjustment value in the unused/non-canonical bits of the indirect address. In some embodiments, the adjustment is used to force the encoded range to the end of a 2's power boundary. This sets a very specific upper bound on the buffer size. In this way, an encoded version of the original (not encoded) valid address range can be created. The encoded version can be designed such that the least number of upper bits will change over the valid range (e.g., so that encryption of the upper bits will detect/amplify modifications to the encoded address on decryption). The encoding is reversible, such that the original intended valid address range is returned as long as it is modified within the range. In the example above, the range 0-3 decimal (0000b-0011b binary) can be encoded as [2] {0} 00xxb (where "xx" means those bits can take any value for the range: 00, 01, 10, 11). In another example, the range 1-4 decimal (0001b-0100b) can be encoded as [2] {−1} 00xxb (where the adjustment is subtracted in order to keep the upper bits constant). Alternatively, the same range 1-4 decimal (0001b-0100b), can be encoded as [2] {3} 01xxb (this time adding an adjustment of 3 in order to keep the upper bits constant). With either representation, the encoded version decodes back to the original address range 1-4. In still another example, if the buffer size is 4 KB, a 10-bit adjustment value with a resolution of 4 bytes can be used.

Other embodiments may use a signed adjustment value (e.g., 2's compliment) where the buffer may be either adjusted to the beginning or end of the 2's power boundary depending on the sign (+/−) of the adjustment. Such embodiments can provide protection from either buffer overflow or underflow situations depending on the adjustment sign. In cases where 16 bits are available in unused/non-canonical addresses (e.g., in current 64-bit processors), 10 of the available bits can be used for the adjustment and the remaining 6 bits can be used for the valid range metadata (e.g., exponent value/2's power). If the exponent value reaches a range beyond a 4 KB page, the adjustment can expand by a 2's multiplier to allow adjustments of large buffers within even larger power of 2 ranges (noting that in some embodiments, 4096 bytes are fully covered with a 10-bit adjustment value allowing the adjustment to "adjust" a buffer to end with the very last 4 byte word in a 4 KB page before the upper (2's power) bits will change). Such an adjustment (e.g., incremented by 1) will adjust the buffer location 4 bytes at a time. Any other choice of initial adjustment size and word size is possible in other embodiments. In another example, if the exponent has a value of 13, then the adjustment value can be multiplied by 2 so that the adjustment can still encompass the full 2's power range (in this case, two 4 KB pages, if adjusting by 8 bytes at a time), and so on (e.g., an exponent value of 14 means the adjustment value is multiplied by 4, and an exponent value of 15 means the adjustment value is multiplied by 8 and so on, allowing the adjustment to encompass the full 2 powers range).

In block 1922, the computing device 1600 encrypts a portion of the indirect address, where the portion of the indirect address to be encrypted is determined by the valid range metadata (e.g., exponent/2's power) and the adjustment value. The valid range metadata determines the number of the most significant address bits of the encoded address that are to be encrypted (e.g., down to a minimum number so some address bits will always be encrypted). In some embodiments, the adjustment value is encrypted as well (e.g., to create a reasonable block size for a block cipher). In some embodiments, the most significant bits of the used bits/canonical address identified in the valid range metadata are encrypted with a secret address key (e.g., the secret address key 1616(1)), using the valid range metadata (which may or may not include the adjustment value) as an address tweak. In the illustrated embodiments, the valid range metadata (e.g., exponent/2's power) would not be encrypted because the processor uses the valid range metadata plaintext to determine the number of bits to decrypt. However, the valid range metadata (e.g., exponent/two's power) can be used as a tweak in the case of a tweakable block cipher (and thereby affect the encrypted bits). Other data values that may be used as tweaks include, but are not necessarily limited to: data stored in the unused bits of the indirect address, the upper limit on the buffer size, an exponent of a two's power boundary selected as the upper limit on the buffer size, an adjustment value applied to the two's power boundary, a code block identifier, instruction pointer data, permission information encoded in the metadata, version number (useful when reassigning/revoking pointers that were previously assigned to a program, version may be maintained by the processor in a register), and/or other metadata described herein (e.g., plaintext address slice size, memory allocation size, type, location, ownership, tag, privilege level, crypto context ID, or any suitable combination thereof).

As used herein, a "tweak" may refer to, among other things, a second input to a block cipher, in addition to the usual plaintext or ciphertext input and the key (e.g., the secret key 1616(1)-1616(N)). In at least some embodiments, a tweak may compose all or part of an initialization vector (IV) for a block cipher. Encrypting the upper two canonical bits enables the computing device 1600 to detect when the indirect address has been illegally changed, because the encryption algorithm will cause the illegally-changed upper bits to produce a random sequence of bits that are non-deterministic to an adversary, which likely results in a fault when the illegally-changed indirect address is used.

The portion of the indirect address to be encrypted (e.g., the upper used/canonical bits) is encrypted using a cipher mode encryption algorithm, such as a tweakable block cipher, using the valid range metadata and adjustment (e.g., [2] {−1}, in the above example) as a tweak. Some examples of tweakable block ciphers include: XOR-encrypt-XOR (XEX), Liskov, Rivest, and Wagner (LRW), and XEX-based tweaked-codebook mode with ciphertext stealing (XTS). Other bit diffusion methods in which any single bit change in the cipher text results in changes across the entire decrypted plaintext can be used. If desired, alternative embodiments can trade off security for performance by using non-cryptographic methods that still achieve reasonable bit diffusion analogous to a block cipher.

The cipher selected for the encryption can be implemented in hardware, using an algorithm that has a bit-selectable or otherwise variable block size (e.g., any block cipher or similar diffusion algorithm with appropriate block sizes that may constructed to utilize a tweak), or an algorithm that allows a fixed block size with a tweak using the remaining unencrypted bits (e.g., the extra bits outside the fixed block size). In some embodiments, the cipher has sufficient bit diffusion so that any bit change made to the encrypted address bits will equally affect (cascade through) all bit positions when decrypted. This provides the basis for a corrupted address given any change or bounds violation. Using this method, if the adversary attempts to tamper with the metadata (e.g., the exponent or adjustment values, or the encrypted most significant bits) the resulting decoded address will be corrupted. In the 64-bit address space, address corruption will result in a fault with high probability, thus allowing the address corruption (and pointer access or bounds violation) to be caught by the privileged system component 1642 (e.g., an operating system/executive/VMM/alternative mode/debug trace/management processor/subsystem, etc.).

In the example above, if the indirect address/pointer value is incremented beyond 3, modifying the indirect address/pointer in this way will corrupt the upper canonical bits and cause a non-deterministic memory access that cannot be controlled by an adversary. For instance, going beyond a buffer size by one byte will result in a random memory access that will page fault with high probability. This is due to the bit diffusion properties of the cipher to ensure that even one-bit changes will diffuse through all of the most significant bits. As a result of the adjustment, which forces values to the end of the 2's power range, buffer overflows cause corruption of the encrypted address bits.

The cipher tweak can be extended to include a code block identifier to provide access controls over which code blocks (e.g., blocks of the calling code) are permitted to use an indirect address/pointer to access memory. Additionally, instruction pointer (which may be referred to as the "program counter") information or ranges can be encoded as part of the pointer encryption tweak (also referred to herein as "address tweak"). The instruction pointer information can be used to limit the scope of what code can access what data. For example, all code can be arranged within fixed blocks of memory within the 64-bit address space. Code with similar access permissions can be grouped together in the same block or range. The address tweak can include the identifier for the block of memory from which an instruction is executing. In this way, code and data can be associated, and access controlled, such that an adversary coming from a different code block will not be able to access data of the protected block using the encrypted pointers, because the encrypted pointers will not decode properly if the wrong code block identifier is used as an address tweak. Further, when a block of code calls, e.g., malloc, to allocate memory to itself, malloc can return the encrypted address using the calling code's memory block to ensure private access to the allocated memory (so long as the allocated memory isn't freed and then reallocated to another code block). Alternatively, other methods of identifying the calling code can be used in the address tweak, such as protection keys. Still further, the metadata for read/write/execute access that is used by the processor 1602 to control access to memory can be used as part of the address tweak for the encrypted address bits. Additionally, the instruction pointer may itself be represented as an encoded pointer (e.g., range-based). In this case, the metadata and encrypted address bits can be used as part of the "tweak" identifying the code block accessing a data pointer or requesting a memory allocation/assignment. At 1924, the encoded indirect address may be output and control returned to memory manager 1644.

Figure 20:
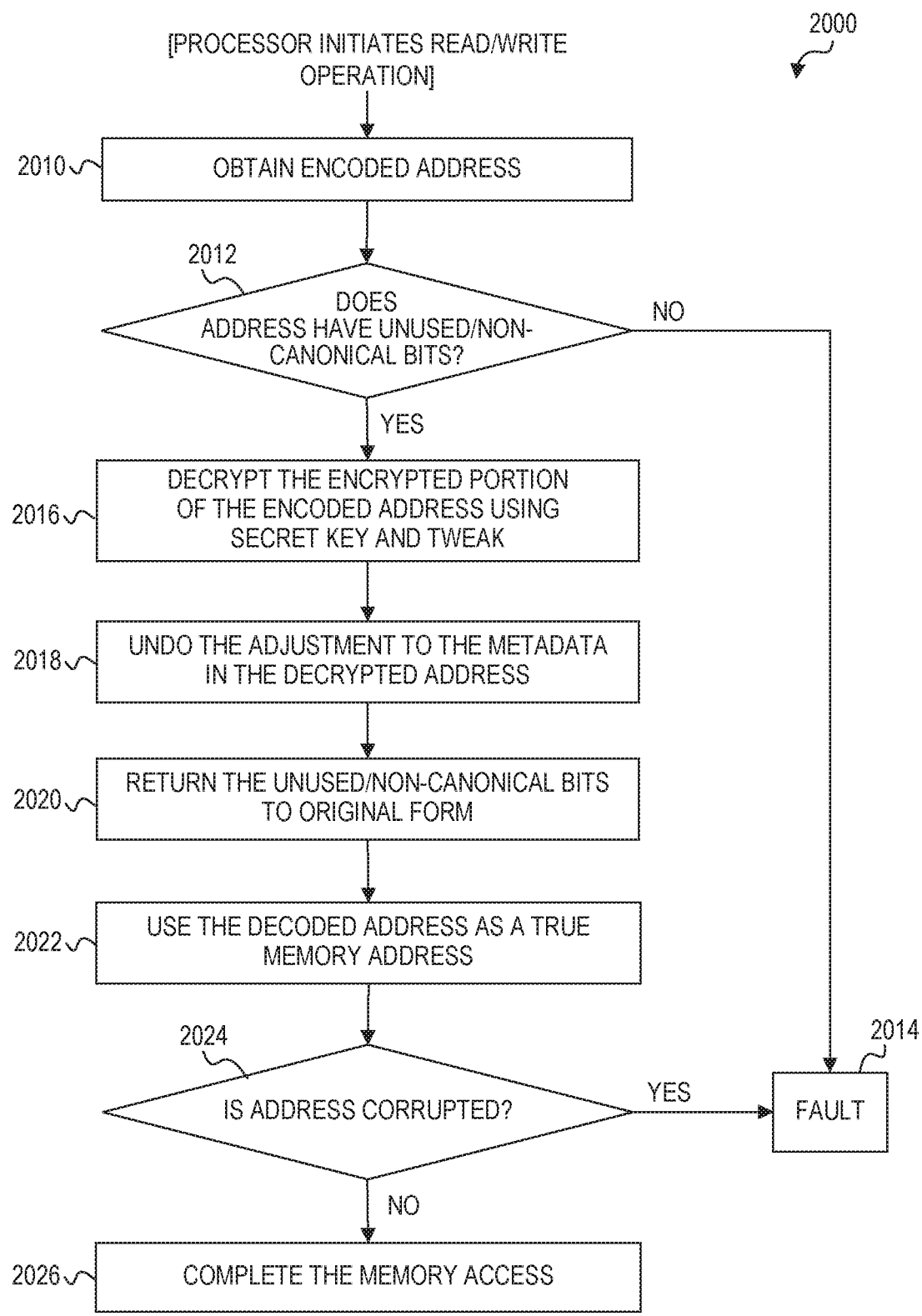
FIG. 20 is a simplified flow diagram of at least one embodiment of a process for verifying a previously secured indirect address as disclosed herein, which may be executed by the computing device of FIG. 16.

Referring now to FIG. 20, an example process 2000 for decoding an indirect address is shown. Portions of the process 2000 may be executed by hardware, firmware, and/or software of the computing device 1600 (e.g., by the processor 1602 executing the secure mov logic and/or the address decoding logic 1662). The process 2000 begins in response to a memory access operation such as a read, write, or execute operation, e.g., a MOV instruction. Of course, different processor architectures may refer to the "MOV" functionality by different names for the instructions or different options/parameters. As such, the disclosed embodiments apply to all types of "MOV" functionality across different architectures, irrespective of the terminology used to refer to such functionality. Further, the MOV instruction is one example, and any instruction that can access memory to read/write data can apply the address encoding and decoding methods disclosed herein.

In block 2010, the computing device 1600 obtains the encoded indirect address (e.g., the encoded address 1706, which may be obtained from a register 1612). In block 2012, the computing device 1600 determines whether the encoded address obtained in block 2010 has unused or non-canonical bits. If the computing device 1600 determines that the encoded address does not have unused/non-canonical bit (e.g., the address doesn't fall within the non-canonical, or otherwise reserved, range of addresses, whether the address range is 32-bit, 64-bit, 128-bit or whatever range an alternate architecture may require), a fault is raised (2014). If the computing device 1600 determines that the encoded address has unused/non-canonical bits (e.g., the address falls with the canonical or reserved address range), the computing device 1600 proceeds to block 2016. In block 2016, the computing device 1600 decrypts the encrypted portion of the encoded address, using the decryption algorithm counterpart of the encryption algorithm used in block 1922 of FIG. 19, and using the same secret key and tweak as used by the encryption algorithm in block 1922 of FIG. 19.

In block 2018, the computing device 1600 "undoes" the adjustment to the range metadata in the decrypted address (e.g., by subtracting the decrypted adjustment value in the unused/non-canonical bits from the full decrypted value of the indirect address). In block 2020, the computing device 1600 returns the decrypted indirect address to its original (e.g., canonical) form by, for example, removing the unused/non-canonical bits.

In block 2022, the computing device 1600 uses the decoded address output by block 2020 as a "true" (e.g., virtual or linear) memory address (e.g., as a pointer). In block 2024, the computing device 1600 determines whether the decoded address used as a memory address/pointer at block 2022 is a corrupted address. If the decoded address is corrupted, a fault is raised (2014). If the decoded address is not corrupted, the computing device 1600 completes the memory access operation successfully, using the decoded address as a memory address/pointer, in block 2026.

In this way, the process 2000 allows the computing device 1600 to verify the range-encoded indirect address and enforce the embedded range check before converting the range-encoded address into a real memory address. Additionally, invalid adjustment values (e.g., adjustment values that go beyond the 2's power range), can be used to determine with some probability when a corruption occurs as well as invalid address values or metadata reserved to detect when corruption occurs. Even if corruption is not detected, the resulting address would not be deterministic (and therefore usable) to an adversary. In addition to the buffer overflow mitigation techniques described above, there are other applications of the pointer address encoding technologies disclosed herein. For example, processor instructions can be restricted by privilege level or caller location authorization (e.g., an instruction pointer block or range of a heap manager). Additional instructions can be added in cases in which the program code itself can control its own pointers and ranges. These instructions may use a larger encoded pointer range as input, and may produce a smaller/equal range pointer (more restrictive) falling within the larger buffer's range if the code executing this instruction belongs to the code block that owns the original (superset) buffer pointer (which can be determined by the instruction pointer). For example, the memory manager module 1644 can allocate the call stack and provide a large range pointer to the call stack (e.g., for the stack pointer). Code segments that are authorized to act on the call stack may then use this processor instruction to encode sub range pointers to buffers implicitly created on the stack. Compilers can automatically augment code to do this as stack operations are performed (local variables created, etc.), thus, protecting even individual data structures or individual variables on the stack. That is, the disclosed techniques enable encoding buffer sizes down to individual variable sizes (e.g., a 32-bit integer can be encoded as a pointer to a buffer of 4 bytes).

Similarly, code blocks that own a pointer can use similar instructions to transfer control/ownership to another/different code block by generating a newly encoded pointer for the target/receiving code block based on the original, e.g., by selecting a smaller buffer size for assignment to another code block. Such an instruction would take as input parameters the resulting buffer size, the original data pointer and an encoded pointer for the targeted code range (that the pointer is being assigned). Such an instruction can decode the input encoded pointer using the instruction pointer of the calling code block as a tweak, reduce the range if the input range is smaller than the input encoded pointer, and use the input encoded pointer to the targeted code block/range as part of the tweak when producing the output encoded pointer (now accessible to the newly assigned code block for the extent of the specified range). Other input parameters could be, for example, additional metadata, such as read/write/execute permissions (possibly as a subset of the original) for the targeted code.

To provide access control, the instruction pointer, or an encoded instruction pointer comprising of a range identified with a similar exponent, adjustment and encrypted indirect address bits, can be used as part of the tweak. The instruction pointer can similarly be encoded as an executable range/buffer of memory where the program is stored. When used as a tweak for the data pointer (e.g., an indirect address 1614), the instruction pointer can control access to data by different pieces of program code. Further, the encoded instruction pointer value can be queried by programs for RIP relative addressing. (e.g., the instruction pointer register can be read by a program and then used to call/jump to relative offsets within the program's valid range, or read/write data within the program's valid range by using the encoded instruction pointer value).

Additionally, data pointers may be created and converted by new processor instructions (or operating system routines), allowing ownership of a data pointer (e.g., an indirect address 1614) to be extended to other code/program ranges. That is, the owner program/code of a data pointer (whose instruction pointer range was used as part of the tweak for the data pointer) can call, e.g., an operating system routine (or processor instruction) that will produce a new data pointer that can be used by another program/code range. In this case, the new instructions/operating system routine will decode the original data pointer that was encoded as described herein and re-encode the range using the new program/code range metadata as the tweak, thereby producing a data pointer that will decode properly when accessed from an instruction pointer operating in the new address range. The new instruction/routine may also take as a parameter a smaller range encoding, thereby allowing the program owning the original data pointer to subset the data buffer size to a smaller region of memory accessible by the new program/code range.

Further, a 64 bit-stack pointer can be encoded as described herein, and as such, should be updated accordingly by the processor 1602 on stack pushes and pops, calls and returns conforming to the allocated range of the stack. After decoding a MOV instruction to the stack pointer, the processor 1602 may choose to cache the decrypted version of the stack pointer for direct memory access efficiency, however, the processor 1602 may continue to track the range condition to assure stack overflows do not occur.

With instruction pointer relative addressing, the program counter register can be read and used to calculate offsets for position independent code (PIC) and data. The instruction pointer can also be encoded such that legacy instruction pointer relative position independent code will still function correctly. In this case, the encoded instruction pointer register may have a range conforming to the extent of the relocated program code and data (including text sections) in memory. In addition to memory accesses, PIC programs may utilize indirect jumps (JMP) and calls based on RIP relative addressing. As such, the JMP and CALL instructions can be modified to handle encoded pointer addresses, converting them into the actual linear memory address similar to the MOV instruction. Instruction pointer relative jumps and calls outside of the pointer's bounds may result in a corrupted target address for the jump/call instruction, which is very likely caught with a fault. The loader can also fix relocatable symbol tables to properly encode the extent of the function pointers for their respective code sections and memory locations. This instruction pointer-range pointer can also be used as a flexible code block/identifier tweak to access control data pointers with their associated code. Additionally, encoded range pointers on the call stack can be encrypted to provide control flow integrity between calls and returns while retaining the range encoding when decrypted on returns. Not all values of the 6-bit exponent metadata are actually used (e.g., with 64-bit addressing). For example, in 64-bit addressing, values that go beyond 48 will collide with the non-canonical bits and therefore will never be utilized. Thus, exponent values above 48/57 can be redefined to indicate that other interpretations of the adjustment region can be defined. It should be noted that the number 57 is based on five-level paging. This interpretation of the high order exponent values allows alternative uses of the unused/non-canonical address bits to coexist with the disclosed address encoding mechanisms. Other embodiments can use these undefined values to selectively determine if the adjustment data is or isn't present. For example, an exponent value beyond 48 can indicate no adjustment is present/needed for the buffer, and only the 2's power is valid, setting the 2's power back to the beginning without adjustments. This approach can enable better utilization of the address space by selectively determining what metadata is required for the encoded addresses, and selectively extending the available address bits into the space previously reserved for the adjustment value.

Example Architectures

Figure 21:
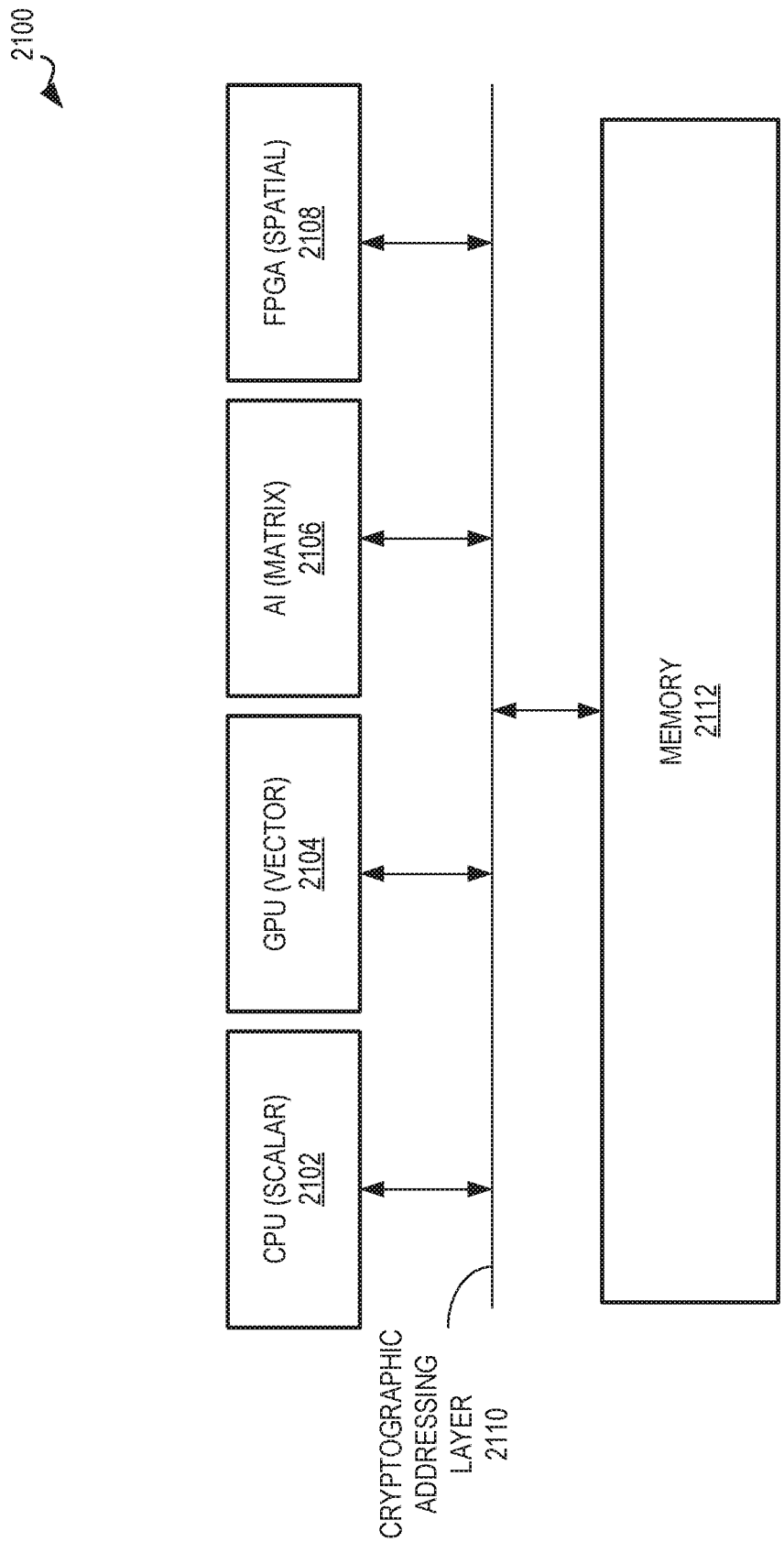
FIG. 21 is a block diagram illustrating an example cryptographic computing environment according to at least one embodiment.

FIG. 21 is a block diagram illustrating an example cryptographic computing environment 2100 according to at least one embodiment. In the example shown, a cryptographic addressing layer 2110 extends across the example compute vectors central processing unit (CPU) 2102, graphical processing unit (GPU) 2104, artificial intelligence (AI) 2106, and field programmable gate array (FPGA) 2108. For example, the CPU 2102 and GPU 2104 may share the same virtual address translation for data stored in memory 2112, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 2112 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 22:
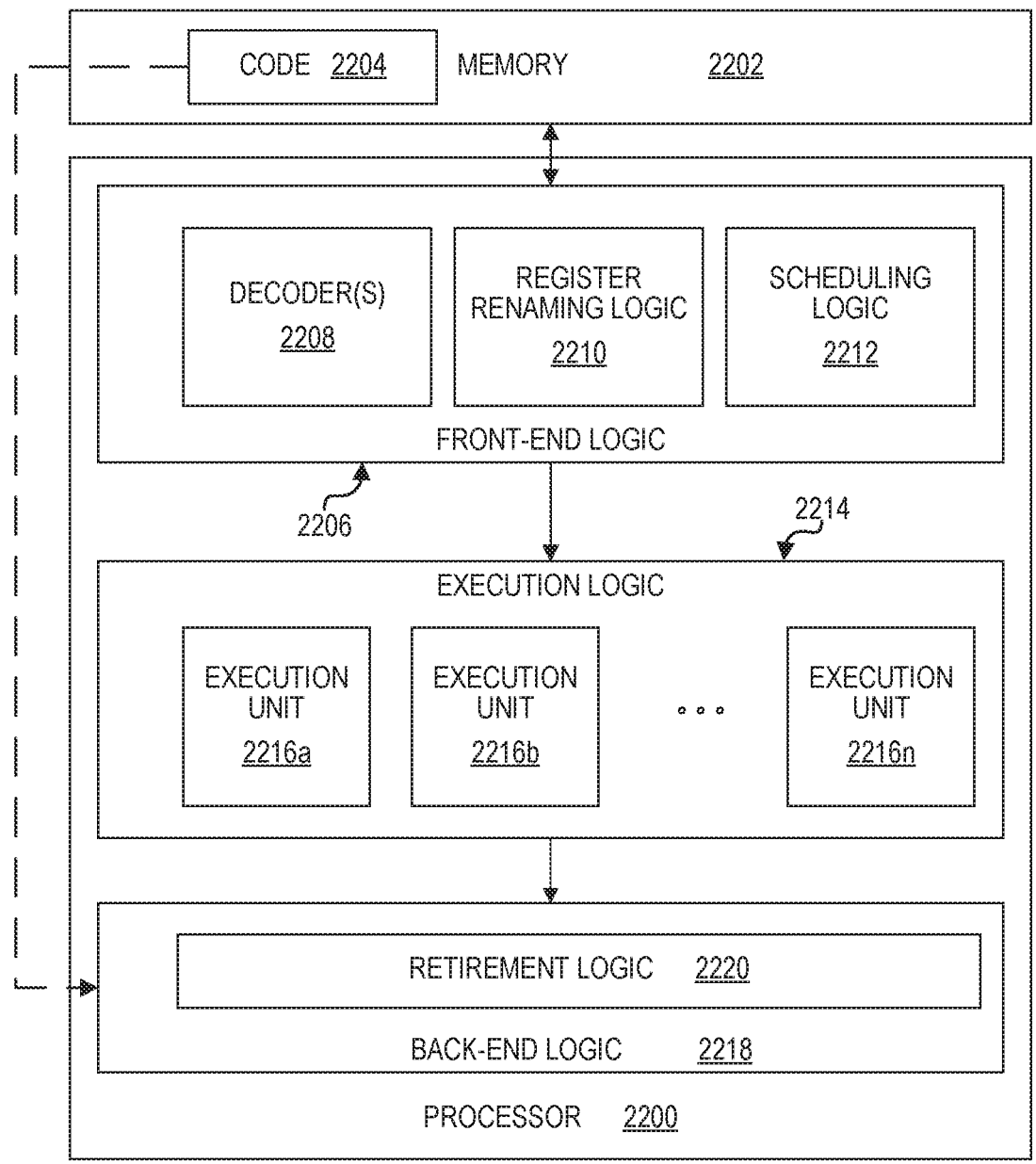
FIG. 22 is a block diagram illustrating an example processor core and memory according to at least one embodiment.
Figure 23A:
FIG. 23A is a block diagram illustrating both an exemplary in-order pipeline and an exemplary register renaming, out-of-order issue/execution pipeline in accordance with certain embodiments.
Figure 23B:
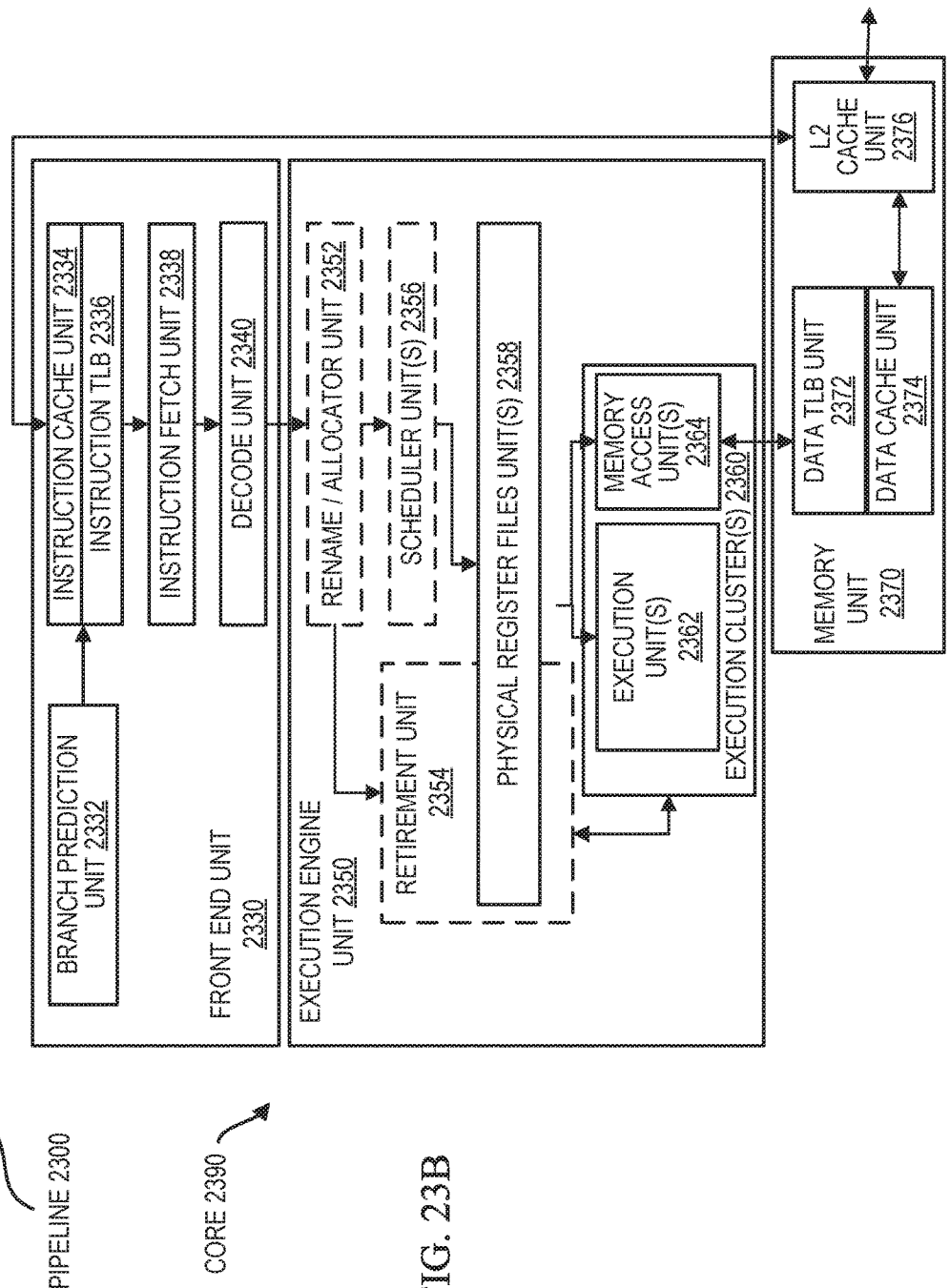
FIG. 23B is a block diagram illustrating both an exemplary embodiment of an in-order architecture core and an exemplary register renaming, out-of-order issue/execution architecture core to be included in a processor in accordance with certain embodiments.
Figure 24:
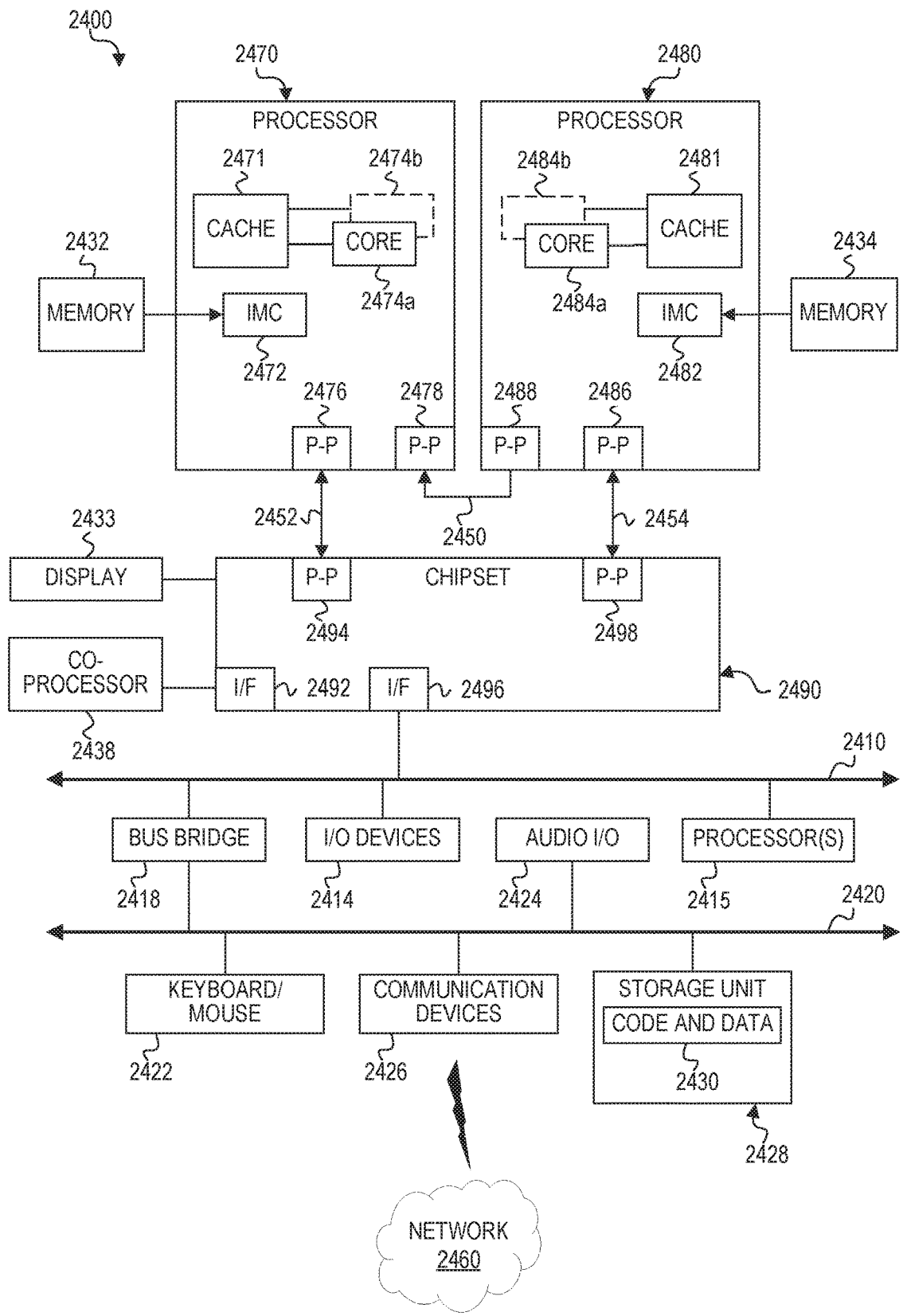
FIG. 24 is a block diagram of an example computer architecture according to at least one embodiment.

FIGS. 22-24 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 22-24.

FIG. 22 is an example illustration of a processor according to an embodiment. Processor 2200 is an example of a type of hardware device that can be used in connection with the implementations shown and described herein (e.g., processor 1602). Processor 2200 may be any type of processor, such as a microprocessor, an embedded processor, a digital signal processor (DSP), a network processor, a multi-core processor, a single core processor, or other device to execute code. Although only one processor 2200 is illustrated in FIG. 22, a processing element may alternatively include more than one of processor 2200 illustrated in FIG. 22. Processor 2200 may be a single-threaded core or, for at least one embodiment, the processor 2200 may be multi-threaded in that it may include more than one hardware thread context (or "logical processor") per core.

FIG. 22 also illustrates a memory 2202 coupled to processor 2200 in accordance with an embodiment. Memory 2202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 2200 can execute any type of instructions associated with algorithms, processes, or operations detailed herein. Generally, processor 2200 can transform an element or an article (e.g., data) from one state or thing to another state or thing.

Code 2204, which may be one or more instructions to be executed by processor 2200, may be stored in memory 2202, or may be stored in software, hardware, firmware, or any suitable combination thereof, or in any other internal or external component, device, element, or object where appropriate and based on particular needs. In one example, processor 2200 can follow a program sequence of instructions indicated by code 2204. Each instruction enters a front-end logic 2206 and is processed by one or more decoders 2208. The decoder may generate, as its output, a micro operation such as a fixed width micro operation in a predefined format, or may generate other instructions, microinstructions, or control signals that reflect the original code instruction. Front-end logic 2206 also includes register renaming logic 2210 and scheduling logic 2212, which generally allocate resources and queue the operation corresponding to the instruction for execution.

Processor 2200 can also include execution logic 2214 having a set of execution units 2216a, 2216b, 2216n, etc. Some embodiments may include a number of execution units dedicated to specific functions or sets of functions. Other embodiments may include only one execution unit or one execution unit that can perform a particular function. Execution logic 2214 performs the operations specified by code instructions.

After completion of execution of the operations specified by the code instructions, back-end logic 2218 can retire the instructions of code 2204. In one embodiment, processor 2200 allows out of order execution but requires in order retirement of instructions. Retirement logic 2220 may take a variety of known forms (e.g., re-order buffers or the like). In this manner, processor 2200 is transformed during execution of code 2204, at least in terms of the output generated by the decoder, hardware registers and tables utilized by register renaming logic 2210, and any registers (not shown) modified by execution logic 2214.

Although not shown in FIG. 22, a processing element may include other elements on a chip with processor 2200. For example, a processing element may include memory control logic along with processor 2200. The processing element may include I/O control logic and/or may include I/O control logic integrated with memory control logic. The processing element may also include one or more caches. In some embodiments, non-volatile memory (such as flash memory or fuses) may also be included on the chip with processor 2200.

FIG. 23A is a block diagram illustrating both an exemplary in-order pipeline and an exemplary register renaming, out-of-order issue/execution pipeline according to one or more embodiments of this disclosure. FIG. 23B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 23A-23B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 23A, a processor pipeline 2300 includes a fetch stage 2302, a length decode stage 2304, a decode stage 2306, an allocation stage 2308, a renaming stage 2310, a schedule (also known as a dispatch or issue) stage 2312, a register read/memory read stage 2314, an execute stage 2316, a write back/memory write stage 2318, an exception handling stage 2322, and a commit stage 2324.

FIG. 23B shows processor core 2390 including a front end unit 2330 coupled to an execution engine unit 2350, and both are coupled to a memory unit 2370. Processor core 2390 and memory unit 2370 are examples of the types of hardware that can be used in connection with the implementations shown and described herein (e.g., processor 102, memory 122). The core 2390 may be a reduced instruction set computing (RISC) core, a complex instruction set computing (CISC) core, a very long instruction word (VLIW) core, or a hybrid or alternative core type. As yet another option, the core 2390 may be a special-purpose core, such as, for example, a network or communication core, compression engine, coprocessor core, general purpose computing graphics processing unit (GPGPU) core, graphics core, or the like. In addition, processor core 2390 and its components represent example architecture that could be used to implement logical processors and their respective components.

The front end unit 2330 includes a branch prediction unit 2332 coupled to an instruction cache unit 2334, which is coupled to an instruction translation lookaside buffer (TLB) unit 2336, which is coupled to an instruction fetch unit 2338, which is coupled to a decode unit 2340. The decode unit 2340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2390 includes a microcode ROM or other medium that stores microcode for certain macroinstructions (e.g., in decode unit 2340 or otherwise within the front end unit 2330). The decode unit 2340 is coupled to a rename/allocator unit 2352 in the execution engine unit 2350.

The execution engine unit 2350 includes the rename/allocator unit 2352 coupled to a retirement unit 2354 and a set of one or more scheduler unit(s) 2356. The scheduler unit(s) 2356 represents any number of different schedulers, including reservations stations, central instruction window, etc. The scheduler unit(s) 2356 is coupled to the physical register file(s) unit(s) 2358. Each of the physical register file(s) units 2358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2358 comprises a vector registers unit, a write mask registers unit, and a scalar registers unit. These register units may provide architectural vector registers, vector mask registers, and general purpose registers (GPRs). In at least some embodiments described herein, register units 2358 are examples of the types of hardware that can be used in connection with the implementations shown and described herein (e.g., registers 112). The physical register file(s) unit(s) 2358 is overlapped by the retirement unit 2354 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 2354 and the physical register file(s) unit(s) 2358 are coupled to the execution cluster(s) 2360. The execution cluster(s) 2360 includes a set of one or more execution units 2362 and a set of one or more memory access units 2364. The execution units 2362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 2362 may also include an address generation unit (e.g., 822) to calculate addresses used by the core to access main memory (e.g., memory unit 2370) and a page miss handler (PMH) (e.g., 826).

The scheduler unit(s) 2356, physical register file(s) unit(s) 2358, and execution cluster(s) 2360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2364). It should also be understood that where separate pipelines are used, one or more of these pipelines may be out-of-order issue/execution and the rest in-order.

The set of memory access units 2364 is coupled to the memory unit 2370, which includes a data TLB unit 2372 coupled to a data cache unit 2374 coupled to a level 2 (L2) cache unit 2376. In one exemplary embodiment, the memory access units 2364 may include a load unit, a store address unit, and a store data unit, each of which is coupled to the data TLB unit 2372 in the memory unit 2370. The instruction cache unit 2334 is further coupled to a level 2 (L2) cache unit 2376 in the memory unit 2370. The L2 cache unit 2376 is coupled to one or more other levels of cache and eventually to a main memory. In addition, a page miss handler (e.g., page miss handler 826) may also be included in core 2390 to look up an address mapping in a page table if no match is found in the data TLB unit 2372.

By way of example, the exemplary register renaming, out-of-order issue/execution core architecture may implement the pipeline 2300 as follows: 1) the instruction fetch 2338 performs the fetch and length decoding stages 2302 and 2304; 2) the decode unit 2340 performs the decode stage 2306; 3) the rename/allocator unit 2352 performs the allocation stage 2308 and renaming stage 2310; 4) the scheduler unit(s) 2356 performs the schedule stage 2312; 5) the physical register file(s) unit(s) 2358 and the memory unit 2370 perform the register read/memory read stage 2314; the execution cluster 2360 perform the execute stage 2316; 6) the memory unit 2370 and the physical register file(s) unit(s) 2358 perform the write back/memory write stage 2318; 7)

various units may be involved in the exception handling stage 2322; and 8) the retirement unit 2354 and the physical register file(s) unit(s) 2358 perform the commit stage 2324.

The core 2390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 2334/2374 and a shared L2 cache unit 2376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 24 illustrates a computing system 2400 that is arranged in a point-to-point (PtP) configuration according to an embodiment. In particular, FIG. 24 shows a system where processors, memory, and input/output devices are interconnected by a number of point-to-point interfaces. Generally, one or more of the computing systems or computing devices described (e.g., computing device 100) herein may be configured in the same or similar manner as computing system 2400.

Processors 2470 and 2480 may be implemented as single core processors 2474a and 2484a or multi-core processors 2474a-2474b and 2484a-2484b. Processors 2470 and 2480 may each include a cache 2471 and 2481 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 2400. Moreover, processors 2470 and 2480 are examples of the types of hardware that can be used in connection with the implementations shown and described herein (e.g., processor 102).

Processors 2470 and 2480 may also each include integrated memory controller logic (MC) 2472 and 2482 to communicate with memory elements 2432 and 2434, which may be portions of main memory locally attached to the respective processors. In alternative embodiments, memory controller logic 2472 and 2482 may be discrete logic separate from processors 2470 and 2480. Memory elements 2432 and/or 2434 may store various data to be used by processors 2470 and 2480 in achieving operations and functionality outlined herein.

Processors 2470 and 2480 may be any type of processor, such as those discussed in connection with other figures. Processors 2470 and 2480 may exchange data via a point-to-point (PtP) interface 2450 using point-to-point interface circuits 2478 and 2488, respectively. Processors 2470 and 2480 may each exchange data with an input/output (I/O) subsystem 2490 via individual point-to-point interfaces 2452 and 2454 using point-to-point interface circuits 2476, 2486, 2494, and 2498. I/O subsystem 2490 may also exchange data with a high-performance graphics circuit 2438 via a high-performance graphics interface 2439, using an interface circuit 2492, which could be a PtP interface circuit. In one embodiment, the high-performance graphics circuit 2438 is a special-purpose processor, such as, for example, a high-throughput MIC processor, a network or communication processor, compression engine, graphics processor, GPGPU, embedded processor, or the like. I/O subsystem 2490 may also communicate with a display 2433 for displaying data that is viewable by a human user. In alternative embodiments, any or all of the PtP links illustrated in FIG. 24 could be implemented as a multi-drop bus rather than a PtP link.

I/O subsystem 2490 may be in communication with a bus 2420 via an interface circuit 2496. Bus 2420 may have one or more devices that communicate over it, such as a bus bridge 2418 and I/O devices 2416. Via a bus 2410, bus bridge 2418 may be in communication with other devices such as a user interface 2412 (such as a keyboard, mouse, touchscreen, or other input devices), communication devices 2426 (such as modems, network interface devices, or other types of communication devices that may communicate through a computer network 2460), audio I/O devices 2414, and/or a data storage device 2428. Data storage device 2428 may store code and data 2430, which may be executed by processors 2470 and/or 2480. In alternative embodiments, any portions of the bus architectures could be implemented with one or more PtP links.

Program code, such as code 2430, may be applied to input instructions to perform the functions described herein and generate output information. The output information may be applied to one or more output devices, in known fashion. For purposes of this application, a processing system may be part of computing system 2400 and includes any system that has a processor, such as, for example; a digital signal processor (DSP), a microcontroller, an application specific integrated circuit (ASIC), or a microprocessor.

The program code (e.g., 2430) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 24 is a schematic illustration of an embodiment of a computing system that may be utilized to implement various embodiments discussed herein. It will be appreciated that various components of the system depicted in FIG. 24 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 25:
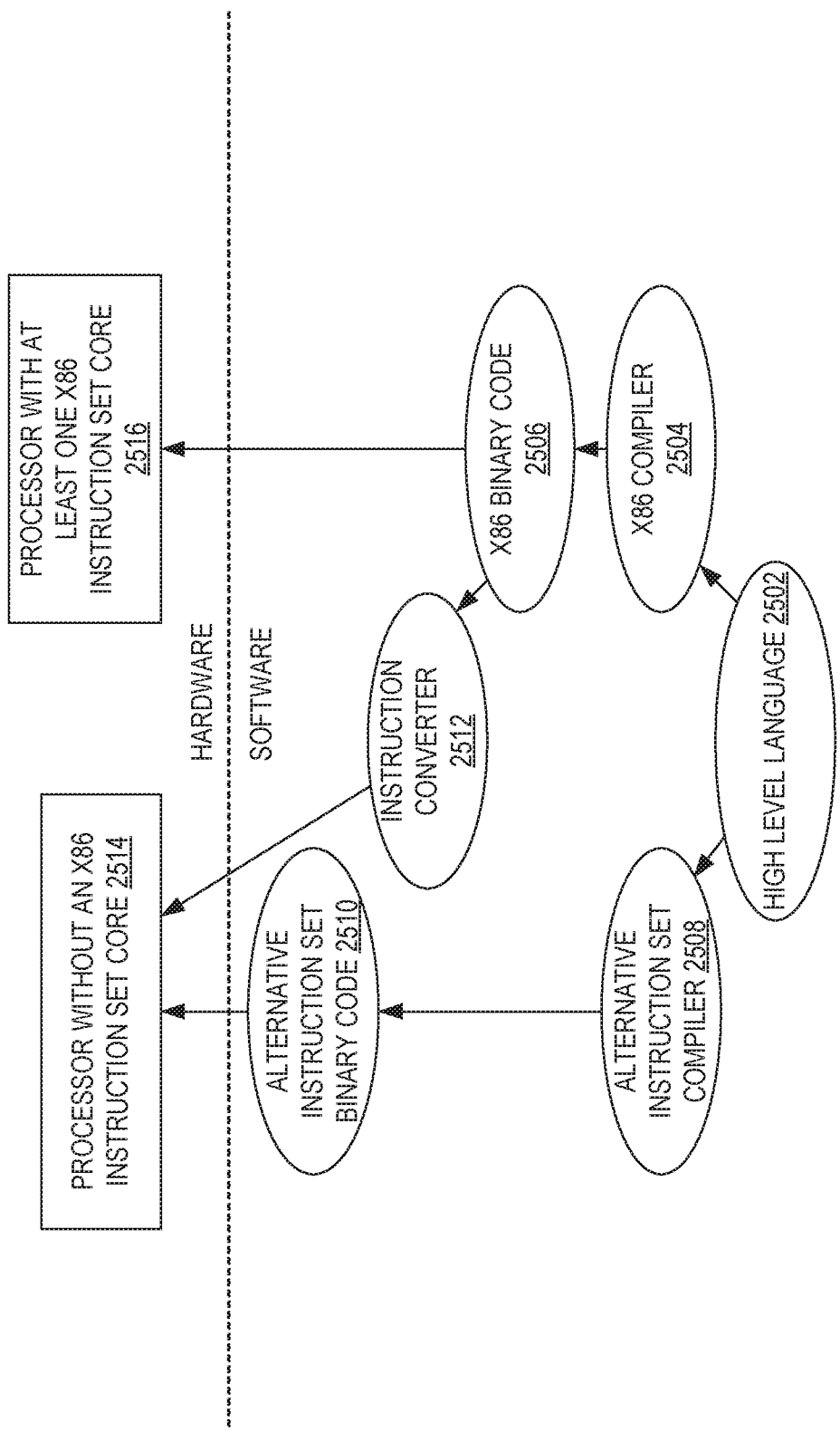
FIG. 25 is a block diagram contrasting the use of a software instruction converter to convert binary instructions in a source instruction set to binary instructions in a target instruction set according to embodiments of the present disclosure.

FIG. 25 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 25 shows a program in a high level language 2502 may be compiled using an x86 compiler 2504 to generate x86 binary code 2506 that may be natively executed by a processor with at least one x86 instruction set core 2516. The processor with at least one x86 instruction set core 2516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2504 represents a compiler that is operable to generate x86 binary code 2506 (e.g., object code) that can, with or without additional linkage processing, be executed on the processor with at least one x86 instruction set core 2516. Similarly, FIG. 25 shows the program in the high level language 2502 may be compiled using an alternative instruction set compiler 2508 to generate alternative instruction set binary code 2510 that may be natively executed by a processor without at least one x86 instruction set core 2514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2512 is used to convert the x86 binary code 2506 into code that may be natively executed by the processor without an x86 instruction set core 2514. This converted code is not likely to be the same as the alternative instruction set binary code 2510 because an instruction converter capable of this is difficult to make; however, the converted code will accomplish the general operation and be made up of instructions from the alternative instruction set. Thus, the instruction converter 2512 represents software, firmware, hardware, or a combination thereof that, through emulation, simulation or any other process, allows a processor or other electronic device that does not have an x86 instruction set processor or core to execute the x86 binary code 2506.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Other Notes and Examples

The following examples pertain to embodiments in accordance with this specification. System, apparatus, method, and machine readable storage medium embodiments can include one or a combination of the following examples:

Example A1 provides a processor that includes a core to execute an instruction, where the core includes a register to store a pointer to a memory location and a tag associated with the pointer. The tag indicates whether the pointer is at least partially immutable. The core also includes circuitry to access the pointer and the tag associated with the pointer, determine whether the tag indicates that the pointer is at least partially immutable. The circuitry is further, based on a determination that the tag indicates the pointer is at least partially immutable, to obtain a memory address of the memory location based on the pointer, use the memory address to access encrypted data at the memory location, and decrypt the encrypted data based on a key and a tweak, where the tweak including one or more bits derived, at least in part, from the pointer.

In Example A2, the subject matter of Example A1 can optionally include where the circuitry is further, based on a determination that the tag indicates the pointer is not immutable, to restrict the memory address of the memory location from being obtained based on the pointer.

In Example A3, the subject matter of Example A1 can optionally include where at least a portion of the memory address is stored in the pointer in a plaintext format.

In Example A4, the subject matter of Example A3 can optionally include where the pointer is an encoded pointer, and the circuitry to obtain the memory address is further to decode the encoded pointer to obtain the memory address.

In Example A5, the subject matter of Example A1 can optionally include where the pointer is cryptographically encoded, and the circuitry to obtain the memory address is further to cryptographically decode the pointer to obtain the memory address.

In Example A6, the subject matter of any one of Examples A1-A5 can optionally include where the pointer is to a base address for a memory location storing one or more instructions for execution.

In Example A7, the subject matter of any one of Examples A1-A5 can optionally include where the circuitry is further to execute an instruction to overwrite the pointer, and clear the tag associated with the pointer based on executing the instruction to overwrite the pointer.

In Example A8, the subject matter of any one of Examples A1-A5 can optionally include where the circuitry is further to execute an instruction to clear all the tag bits in a range of memory.

In Example A9, the subject matter of any one of Examples A1-A5 can optionally include where the circuitry is further to: access an instruction to store the pointer to memory; determine whether the instruction is of a type authorized to store pointers to memory; and execute the instruction based on a determination that the instruction is of the type authorized to store pointers to memory.

In Example A10, the subject matter of any one of Examples A1-A5 can optionally include where the circuitry is further to: access an instruction to modify a word in memory; determine that the word has an associated tag that is set to indicate the word is storing a pointer; determine whether the instruction is of a type authorized to modify pointers; and execute the instruction based on a determination that the instruction is of the type authorized to modify pointers.

In Example A11, the subject matter of any one of Examples A1-A5 can optionally include where the circuitry is further to: access an instruction to copy a set of words stored in memory; determine that a least one word to be copied has an associated tag that is set to indicate the word is storing a pointer; determine whether the instruction is of a type authorized to copy pointers; and execute the instruction based on a determination that the instruction is of the type authorized to copy pointers.

In Example A12, the subject matter of any one of Examples A1-A5 can optionally include where the tweak is further based on a type of the pointer.

In Example A13, the subject matter of any one of Examples A1-A5 can optionally include where the tweak is further based on a stack frame for the memory address.

In Example A14, the subject matter of any one of Examples A1-A5 can optionally include a cache to store a plurality of words and tags associated with the respective words, wherein the core further comprises circuitry to: load a word comprising the pointer from the cache into the register; and propagate the tag associated with the pointer from the cache into the register based on loading the word comprising the pointer.

In Example A15, the subject matter of Example A14 can optionally include where a set of words and a set of tags associated with the set of words are stored in a same cacheline of the cache, the set of tags being inaccessible by software.

In Example A16, the subject matter of Example A14 can optionally include where the cache comprises a first set of ways to store first words and first tags associated with the first words, and a second set of ways to store second words without tags.

In Example A17, the subject matter of Example A16 can optionally include where the core further comprises circuitry to: access a cacheline from memory; determine whether the cacheline includes tagged data; store the cacheline in a way of the first set of ways based on a determination that the cacheline includes tagged data; and store the cacheline in a way of the second set of ways based on a determination that the cacheline does not include tagged data.

In Example A18, the subject matter of any one of Examples A1-A17 can optionally include where the tag comprises 1-bit.

Example M1 provides a method comprising accessing, from a register, a pointer to a memory location and a tag associated with the pointer, wherein the tag indicates whether the pointer is at least partially immutable; determining whether the tag indicates that the pointer is at least partially immutable; and based on a determination that the tag indicates the pointer is at least partially immutable: obtaining a memory address of the memory location based on the pointer; using the memory address to access encrypted data at the memory location; and decrypting the encrypted data based on a key and a tweak, the tweak including one or more bits derived, at least in part, from the pointer.

In Example M2, the subject matter of Example M1 can optionally include restricting, based on a determination that the tag indicates the pointer is not immutable, the memory address of the memory location from being obtained based on the pointer.

In Example M3, the subject matter of Example M1 can optionally include where the pointer is an encoded pointer, and obtaining the memory address further comprises decoding the encoded pointer.

In Example M4, the subject matter of Example M1 can optionally include where the pointer is cryptographically encoded, and obtaining the memory address comprises cryptographically decoding the pointer to obtain the memory address.

In Example M5, the subject matter of Example M1 can optionally include where the pointer is a plaintext format.

In Example M6, the subject matter of any one of Examples M1-M5 can optionally include where the pointer is to a base address for a memory location storing one or more instructions for execution.

In Example M7, the subject matter of any one of Examples M1-M5 can optionally include executing an instruction to overwrite the pointer, and clearing the tag associated with the pointer based on executing the instruction to overwrite the pointer.

In Example M8, the subject matter of any one of Examples M1-M5 can optionally include executing an instruction to clear all the tag bits in a range of memory.

In Example M9, the subject matter of any one of Examples M1-M5 can optionally include: accessing an instruction to store the pointer to memory; determining whether the instruction is of a type authorized to store pointers to memory; and executing the instruction based on a determination that the instruction is of the type authorized to store pointers to memory.

In Example M10, the subject matter of any one of Examples M1-M5 can optionally include: accessing an instruction to modify a word in memory; determining that the word has an associated tag that is set to indicate the word is storing a pointer; determining whether the instruction is of a type authorized to modify pointers; and executing the instruction based on a determination that the instruction is of the type authorized to modify pointers.

In Example M11, the subject matter of any one of Examples M1-M5 can optionally include: accessing an instruction to copy a set of words stored in memory; determining that a least one word to be copied has an associated tag that is set to indicate the word is storing a pointer; determining whether the instruction is of a type authorized to copy pointers; and executing the instruction based on a determination that the instruction is of the type authorized to copy pointers.

In Example M12, the subject matter of any one of Examples M1-M5 can optionally include where the tweak is further based on a type of the pointer.

In Example M13, the subject matter of any one of Examples M1-M5 can optionally include where the tweak is further based on a stack frame for the memory address.

In Example M14, the subject matter of any one of Examples M1-M5 can optionally include loading a word comprising the pointer from a cache into the register and propagating the tag associated with the pointer from the cache into the register based on loading the word comprising the pointer.

In Example M15, the subject matter of Example M14 can optionally include where a set of words and a set of tags associated with the set of words are stored in a same cacheline of the cache, the set of tags being inaccessible by software.

In Example M16, the subject matter of Example M14 can optionally include where the cache comprises a first set of ways to store first words and first tags associated with the first words, and a second set of ways to store second words without tags.

In Example M17, the subject matter of Example M16 can optionally include: accessing a cacheline from memory; determining whether the cacheline includes tagged data; storing the cacheline in a way of the first set of ways based on a determination that the cacheline includes tagged data; and storing the cacheline in a way of the second set of ways based on a determination that the cacheline does not include tagged data.

In Example M18, the subject matter of any one of Examples M1-M17 can optionally include where the tag comprises 1-bit.

Example C1 provides one or more computer-readable media with code stored thereon, where the code is executable to cause a machine to: access, from a register, a pointer to a memory location and a tag associated with the pointer, wherein the tag indicates whether the pointer is at least partially immutable; determine whether the tag indicates that the pointer is at least partially immutable; and based on a determination that the tag indicates the pointer is at least partially immutable: obtain a memory address of the memory location based on the pointer; use the memory address to access encrypted data at the memory location; and decrypt the encrypted data based on a key and a tweak, the tweak including one or more bits derived, at least in part, from the pointer.

In Example C2, the subject matter of Example C1 can optionally include where the code is further executable to cause the machine to restrict, based on a determination that the tag indicates the pointer is not immutable, the memory address of the memory location from being obtained based on the pointer.

In Example C3, the subject matter of Example C1 can optionally include where the pointer is an encoded pointer, and the code to obtain the memory address is to decode the encoded pointer to obtain the memory address.

In Example C4, the subject matter of Example C1 can optionally include where the pointer is cryptographically encoded, and the code to decode the encoded pointer to obtain the memory address is to cryptographically decode the pointer to obtain the memory address.

In Example Si, a system comprises means for accessing, from a register, a pointer to a memory location and a tag associated with the pointer, wherein the tag indicates whether the pointer is at least partially immutable; and means for performing a set of operations based on a determination that the tag indicates the pointer is at least partially immutable, the set of operations comprising: obtaining a memory address of the memory location based on the pointer; using the memory address to access encrypted data at the memory location; and decrypting the encrypted data based on a key and a tweak, the tweak including one or more bits derived, at least in part, from the pointer.

Example X1 provides an apparatus comprising means for performing the method of any one of Examples M1-M18.

In Example X2, the subject matter of Example X1 can optionally include where the means for performing the method comprise at least one processor and at least one memory element.

In Example X3, the subject matter of Example X2 can optionally include where the at least one memory element comprises machine-readable instructions that when executed, cause the apparatus to perform the method of any one of Examples M1-M18.

In Example X4, the subject matter of any one of Examples X1-X3 can optionally include where the apparatus is one of a computing system or a system-on-a-chip.

Example Y1 provides at least one machine readable storage medium comprising instructions, where the instructions when executed realize an apparatus or implement a method as provided in any one of Examples A1-A18 or M1-M18.

What is claimed is:

1. A processor comprising:
a core to execute an instruction, the core including:
a register to store a pointer to a memory location and a tag associated with the pointer, wherein the tag is to indicate whether the pointer is at least partially immutable; and
circuitry to:
access the pointer and the tag associated with the pointer;
determine whether the tag indicates that the pointer is at least partially immutable; and
based on a determination that the tag indicates the pointer is at least partially immutable:
obtain a memory address of the memory location based on the pointer;
use the memory address to access encrypted data at the memory location; and
decrypt the encrypted data based on a key and a tweak, the tweak including one or more bits based, at least in part, on the pointer; and
based on a determination that the tag indicates the pointer is not immutable, to restrict the memory address of the memory location from being obtained based on the pointer.

2. The processor of claim 1, wherein at least a portion of the memory address is stored in the pointer in a plaintext format.

3. The processor of claim 2, wherein the pointer is an encoded pointer, and the circuitry to obtain the memory address is further to decode the encoded pointer to obtain the memory address.

4. The processor of claim 1, wherein the pointer is cryptographically encoded, and the circuitry to obtain the memory address is further to cryptographically decode the pointer to obtain the memory address.

5. The processor of claim 1, wherein the pointer is to a base address for a memory location storing one or more instructions for execution.

6. The processor of claim 1, wherein the circuitry is further to execute an instruction to overwrite the pointer, and clear the tag associated with the pointer based on executing the instruction to overwrite the pointer.

7. The processor of claim 1, wherein the circuitry is further to execute an instruction to clear all tag bits in a range of memory.

8. The processor of claim 1, wherein the circuitry is further to:
access an instruction to store the pointer to memory;
determine whether the instruction is of a type authorized to store pointers to memory; and
execute the instruction based on a determination that the instruction is of the type authorized to store pointers to memory.

9. The processor of claim 1, wherein the circuitry is further to:
access an instruction to modify a word in memory;
determine that the word has an associated tag that is set to indicate the word is storing a pointer;
determine whether the instruction is of a type authorized to modify pointers; and
execute the instruction based on a determination that the instruction is of the type authorized to modify pointers.

10. The processor of claim 1, wherein the circuitry is further to:
access an instruction to copy a set of words stored in memory;
determine that a least one word to be copied has an associated tag that is set to indicate the word is storing a pointer;
determine whether the instruction is of a type authorized to copy pointers; and
execute the instruction based on a determination that the instruction is of the type authorized to copy pointers.

11. The processor of claim 1, wherein the tweak is further based on a type of the pointer.

12. The processor of claim 1, wherein the tweak is further based on a stack frame for the memory address.

13. The processor of claim 1, further comprising a cache to store a plurality of words and tags associated with the respective words, wherein the core further comprises circuitry to:
load a word comprising the pointer from the cache into the register; and
propagate the tag associated with the pointer from the cache into the register based on loading the word comprising the pointer.

14. The processor of claim 13, wherein a set of words and a set of tags associated with the set of words are stored in a same cacheline of the cache, the set of tags being inaccessible by software.

15. The processor of claim 13, wherein the cache comprises a first set of ways to store first words and first tags associated with the first words, and a second set of ways to store second words without tags.

16. The processor of claim 15, wherein the core further comprises circuitry to:
access a cacheline from memory;
determine whether the cacheline includes tagged data;
store the cacheline in a way of the first set of ways based on a determination that the cacheline includes tagged data; and
store the cacheline in a way of the second set of ways based on a determination that the cacheline does not include tagged data.

17. The processor of claim 1, wherein the tag comprises 1-bit.

18. A method comprising:
accessing, from a register, a pointer to a memory location and a tag associated with the pointer, wherein the tag indicates whether the pointer is at least partially immutable;
determining whether the tag indicates that the pointer is at least partially immutable; and
based on a determination that the tag indicates the pointer is at least partially immutable:
obtaining a memory address of the memory location based on the pointer;
using the memory address to access encrypted data at the memory location; and
decrypting the encrypted data based on a key and a tweak, the tweak including one or more bits derived, at least in part, from the pointer; and
based on a determination that the tag indicates the pointer is not immutable, restricting the memory address of the memory location from being obtained based on the pointer.

19. The method of claim 18, wherein the pointer is an encoded pointer, and obtaining the memory address further comprises decoding the encoded pointer.

20. One or more non-transitory computer-readable media with code stored thereon, where the code is executable to cause a machine to:
access, from a register, a pointer to a memory location and a tag associated with the pointer, wherein the tag indicates whether the pointer is at least partially immutable;
determine whether the tag indicates that the pointer is at least partially immutable; and
based on a determination that the tag indicates the pointer is at least partially immutable:
obtain a memory address of the memory location based on the pointer;
use the memory address to access encrypted data at the memory location; and
decrypt the encrypted data based on a key and a tweak, the tweak including one or more bits derived, at least in part, from the pointer; and
based on a determination that the tag indicates the pointer is not immutable, restrict the memory address of the memory location from being obtained based on the pointer.

21. The one or more computer-readable media of claim 20, wherein the pointer is an encoded pointer, and the code to obtain the memory address is to decode the encoded pointer to obtain the memory address.

22. The one or more computer-readable media of claim 21, wherein the pointer is cryptographically encoded, and the code to decode the encoded pointer to obtain the memory address is to cryptographically decode the pointer to obtain the memory address.

* * * * *